United States Patent [19]
Beretta

[11] Patent Number: 5,311,212
[45] Date of Patent: May 10, 1994

[54] FUNCTIONAL COLOR SELECTION SYSTEM

[75] Inventor: Giordano B. Beretta, Palo Alto, Calif.

[73] Assignee: Xerox Corporation, Stamford, Conn.

[21] Appl. No.: 102,129

[22] Filed: Aug. 4, 1993

Related U.S. Application Data

[63] Continuation of Ser. No. 677,682, Mar. 29, 1991, abandoned.

[51] Int. Cl.$^5$ ............................................. G09G 1/28
[52] U.S. Cl. .................................... 345/150; 345/199
[58] Field of Search ...................... 345/150, 154, 199; 358/520

[56] References Cited

U.S. PATENT DOCUMENTS

| | | | |
|---|---|---|---|
| 4,721,951 | 1/1988 | Holler | 340/701 |
| 4,794,382 | 12/1988 | Lai et al. | 340/703 |
| 4,907,075 | 3/1990 | Braudaway | 358/75 |
| 4,970,699 | 11/1990 | Bucker et al. | 340/701 |
| 5,063,644 | 11/1991 | Batson et al. | 340/701 |
| 5,067,098 | 11/1991 | Moellering et al. | 340/701 |
| 5,103,407 | 4/1992 | Gabor | 395/131 |

FOREIGN PATENT DOCUMENTS 0313796  9/1988  European Pat. Off. ...... G06F 3/023

OTHER PUBLICATIONS

N. Jacobsen and W. Bender, "Strategies for Selecting a Fixed Palette of Colors," *SPIE Proc. Series, Human Vision, Visual Processing, and Digital Display*, vol. 1077, pp. 333-341, 1989.

T. M. Lippert and H. L. Snyder, "Unitary Suprathreshold Color-Difference Metrics of Legibility for CRT Raster Imagery," Human Factors Laboratory, Va. Polytechnic Institute and State University, Blacksburg, Va. 24061, Technical Report HFL/ONR 86-3, Sep., 1986.

Merrifield, R. M. and Silverstein, L. D., "The Development and Evaluation of Color Systems for Airborne Applications: Fundamental Visual, Perceptual, and Display Systems Considerations," Naval Air Development Center, Feb., 1986, Report No. NADC-86011-60, (Source: NTIS, Va.).

Hedin, C. E., and Derefeldt, G., "Palette-A color selection aid for VDU images", *Perceiving, Measuring, and Using Color, Proceedings of SPIE*, Santa Clara, Calif., Feb. 1990, vol. 1250, pp. 165-176.

McEndarfer, Edward M., *An Interactive System for the Study and Teaching of Color Theory*, Ph.D Dissertation, University of Kansas, 1989, available from UMI, Ann Arbor, Mich. Order No. 9024188.

Xerox Color Encoding Standard, Chapter 2, Chapter 3, Chapter 6, Sections 6-1 through 6-3, Appendices, A, B, and C, Xerox Systems Institute, Xerox Corporation, Sunnyvale, Calif., XNSS 289005, May 1990.

(List continued on next page.)

*Primary Examiner*—Ulysses Weldon
*Assistant Examiner*—Amare Mengistu
*Attorney, Agent, or Firm*—Judith C. Bares

[57] ABSTRACT

A functional color selection system is provided for automatically generating a palette of coordinated, harmonious, and aesthetically pleasing colors from symmetrically manipulating colorimetrically specified colors in a perceptually uniform color space. The color selections system operates in a calibrated color display gamut using device independent color specifications based on internationally recognized color specification systems. A simple-to-use interface is provided for a user to select a key color on which the palette is to be based, and from the key color to select analogous and complement harmony colors. The user may also select chroma and lightness variations of the key, analogous, and complement harmony colors, and these colors will be computed at predetermined equally spaced intervals from those colors in the uniform color space. Colors are generated according to known color theories for selecting harmonious colors. The coordinated color palette selected may be saved in a palette memory for subsequent reuse in a wide variety of color presentation systems.

31 Claims, 11 Drawing Sheets

OTHER PUBLICATIONS

Meier, Barbara J., "ACE: A Color Expert System for User Interface Design", Proceedings of the ACM:SIGGRAPH Symposium on User Interface Software, Banff, Alberta, Canada, Oct. 1988, pp. 117-128.

De Corte, W., "Finding Appropriate Colors for Color Displays", *Color Research and Application*, vol. 11, No. 1, Spring 1986, pp. 56-61.

Hunt, R. W. G., *Measuring Colour*, Ellis Horwood Limited, Chichester, England, 1987 (reprinted in 1989), Chapter 3, Sections 3-1 through 3-10, pp. 53-69.

Meyer, G. W., and D. P. Greenberg, "Perceptual Color Spaces for Computer Graphics", in *Color and the Computer*, H. J. Durrett, ed., Academic Press, 1987, pp. 83-100.

Hunter, R. S. and R. W. Harold, *The Measurement of Appearance*, 2nd Ed., John Wiley & Sons, Inc., 1987, Chapters 7,8, and 9. pp. 95-165.

Swinehart, D. C., P. T. Zellweger, R. J. Beach, and R. B. Hagmann, "A Structural View of the Cedar Programming Environment", *ACM Transactions on Programming Languages and Systems*, vol. 8, No. 4, Oct. 1986, pp. 419-490.

Teitelman, W., "A Tour Through Cedar", *IEEE Software*, Apr. 1984, vol. 1, No. 2, pp. 44-73.

Beretta, G. B., "Selecting Colors for Representing VLSI Layout", Xerox Palo Alto Research Center, 1988, *Technical Report* EDL-88-7. pp. 2-6.

Guitard, R. and C. Ware, "A Color Sequence Editor", *ACM Transactions on Graphics*, vol. 9, No. 3, Jul. 1990, pp. 338-341.

FUNCTIONAL COLOR SELECTION SYSTEM

The present patent application is a continuation of U.S. patent application Ser. No. 07/677,682, filed on Mar. 29, 1991, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to color selection systems for use with computer based color presentation programs, and more particularly, to a color theory based tool for automatically producing coordinated and harmonious palettes of colors, thereby reducing the time and skill that are needed for users to select aesthetically pleasing functional color combinations for images.

BACKGROUND OF THE INVENTION

Color is playing an increasingly important role in computer graphics. Broader affordability and availability of computer controlled systems with color processing capabilities will promote wider acceptance and use of color in document-intensive industries or document-intensive functional areas of enterprises. As a result, there is a steadily increasing use of computer based color presentation programs by computer users with little or no training in color science and in the aesthetic and technical uses of color. By computer based color presentation programs is meant a wide range of computer based graphics illustrators, page layout programs, graphics editors, business graphics programs and modern spreadsheet programs, publishing systems, image retouching systems, and other similar color presentation programs for using color on computers.

These users are often dissatisfied with the aesthetics of the final product produced by the color tools that are available for existing color presentation systems. There are several reasons for this disappointment. Users of existing computer illustrators, for example, usually first define the shapes of the objects in their graphical compositions through the use of a suitable graphics editor. For coloring these compositions, users then customarily employ color sample sets to pick the colors for their compositions, color by color, without any interactive feedback from the computer beyond whatever conclusions the users are able to draw from their personal reactions to the coloring of their compositions. Known color selection systems typically allow users to select only one color at a time, and users seldom are able to focus on the relationship among the colors. These color selection systems ignore well-known principles of color perception theory that human perception of color is influenced by the effect of adjacent colors, the surround against which a color is viewed, and the illumination under which a color is viewed.

In addition, existing color selection systems often utilize a device dependent color classification model, providing color descriptor classifications, or dimensions, that correspond to the underlying color models that control associated physical devices. Such device dependent color classification models include the additive red, green, and blue (RGB) phosphor color model used to physically generate colors on a color monitor, and the subtractive cyan, magenta, and yellow, plus black (CYMK) color model used to put colored dyes, inks, or toners on paper. In addition, models based on mathematically transforming RGB signals to hue, saturation, and value (HSV) signals have also been used. Color selection systems based on these device dependent color models operate in color spaces that treat color differences and changes in incremental steps along dimensions which are useful to control the physical devices. For example, lookup tables give the users of these existing systems convenient access to the RBG signal values that produce the selected colors on their monitors, thereby facilitating entering the signal specifications for the selected colors into the data files for their composition.

A prior art color selection system utilizing HSV color space is disclosed in Holler, U.S. Pat. No. 4,721,951, entitled, "Method and Apparatus for Color Selection and Production". An apparatus and method are disclosed wherein a color is selected on the basis of one color characteristic system for implementation in another color characteristic system. Color selection is made from the color characteristic system of hue, saturation, and value (referenced as brightness) (HSV) in the preferred embodiment, and is performed interactively with the operator individually selecting hue, saturation and brightness levels from displays which illustrate the effects of changing each of these characteristics. The displays are comprised of a display bar for each of the hue, saturation and brightness color characteristics, with the selected value or level for each characteristic being shown by a vertical black line, or slide marker, which the operator may move to a selected position. Selected hue, saturation, and brightness color characteristics and the current color selected are illustrated on the display and are immediately updated whenever changes of the H, S, or V occur, in a manner that facilitates a rapid and interactive selection process. The selected values of H, S, and V are converted through the use of appropriate transforms to values of R, G, and B in the red, green, and blue color classification system for display in the current color display.

Device dependent color space models, such as the RGB model or HSV color model, are not necessarily related to how humans visually perceive color, and in such systems it may be difficult for a user to approximate how much change in one dimension is needed to produce a desired change in the color, requiring considerable trial and error to achieve a desired color selection.

A perceptually uniform color space which more closely approximates how humans perceive colors and color differences facilitates color specification tasks. In particular, standardized color notation systems for use in perceptually uniform color spaces have been developed by an international color standards group, Commission Internationale de l'Eclairage (the "CIE"). CIE color specification employs "tristimulus values" to specify colors and to establish device independent color spaces. In 1976, the CIE recommended the use of two approximately uniform color spaces, the CIE 1976 (L*u*v*) or the CIELUV color space, and the CIE 1976 (L*a*b*) or the CIELAB color space.

Generally, preference for using one or the other CIE uniform color space is based mainly on convenience of use in particular industrial applications. CIELUV space is often used to capture the color appearance of additive color mixtures, such as those on color display monitors, and as such is used as a standard color space by the television and video industries. CIELAB space is often used to capture the color appearance of subtractive color mixtures, and as such is a standard color descriptor for the paint and dye industries, and is the primary uniform color space used for printed color evaluation. CIE color spaces are widely accepted because measured colors can readily be expressed in these CIE recommended coordinate systems by means of simple mathematical transformations. The functional color selection system of the present invention operates in the CIELAB space, and relevant aspects of the CIE system for specifying colors in the CIELAB color space are discussed in more detail below. However, it is intended that the functional color selection system of the present invention may be implemented in any of the currently defined perceptually uniform color spaces, such as the CIELUV space, the Munsell color space, and the OSA Uniform Color Scales, or in a future newly defined perceptually uniform color space.

Further complicating the color selection process is the effect of color usage on color selection. Colored images can be partitioned into two classes: (1) those that contain so-called "reference colors", and (2) those that utilize "functional colors". Reference colors are colors of naturally occurring objects in the human perceptual world, such as colors of skin, grass, and the sky. On the other hand, functional colors serve a purely symbolic function because these colors are not intended to symbolize objects found in nature. Examples of functional colors are the colors used in thematic maps and in business graphics. Thus, functional color palettes preferably are composed of coordinated harmonious colors to provide color combinations that aesthetically appeal to the ordinary observer. Typically, selecting functional colors for an application requires an understanding of, or at least an appreciation of, how colors combine to form an aesthetically pleasing image. Selecting reference colors requires a somewhat different approach because the goal is to closely match them to colors perceived in nature, thereby facilitating the identification of objects in the computer generated image.

The prior art also discloses a system for using a perceptually uniform color space model for color selection. Taylor et. al., in EP 0 313 796 A3, entitled, "Computer display color control and selection system", disclose an interface system for use in selecting and controlling colors in graphics images generated by a computer system. The interface comprises a mechanism and method for displaying a graphical representation of hue, chroma, and lightness combinations available based on a color appearance type color -pace and associated mechanism. The interface includes a method for selecting any of the combinations of hue, chroma, and lightness which are graphically displayed as available for use. The graphical representation includes a graph of the range of hues in one dimension and a second graph of the range of chroma and value combinations in two dimensions. The preferred embodiment of the interface makes use of a specially defined HVC color space for graphically displaying, representing, and selecting hue, chroma, and value combinations for a color with a high degree of perceptual uniformity. The preferred embodiment of the system includes a mechanism for operating the interface in three different modes, providing functions corresponding to picture editing, color map editing, and continuous shading.

Other prior art color selection systems perform automatic color selection. Braudaway, G., in U.S. Pat. No. 4,907,075, entitled, "Method for Selecting Colors" discloses a method for selecting a limited number of presentation colors from a larger palette to provide digitization of a color image. A three-dimensional color histogram of the image is generated, having axes corresponding to red, green, and blue, and a first color is selected based upon the color occurring most frequently in the image. Subsequent colors are selected by choosing one at a time those colors having the highest weighted frequency of occurrence. Final color selection may be made according to a disclosed cluster analysis method for minimizing image entropy.

Lai et al., U.S. Pat. No. 4,794,382, entitled "Image Retouching", disclose an image retouching method and apparatus in which an operator using a color monitor may selectively alter colors of an original, scanned image displayed on the monitor prior to printing the image using a two stage process. An operator displays on a monitor a first range of colors, adjacent colors differing from each other by more than a predetermined amount, and then selects one of the displayed colors. The selection in turn causes a second range of colors centered on the selected color to be displayed, the adjacent colors of the second range differing from each other by less than the predetermined amount. The operator then selects from this second range of colors a tint which is to be the selected tint. The operator may selectively change the intensity or other property of one or both of the first and second range of colors as desired in respected predetermined steps. In the preferred embodiment, the characteristics by which each color is quantified are printing color components, cyan, magenta, yellow, and optionally black such that all colors displayed on the monitor are printable using conventional printing inks.

Guitard and Ware, "A Color Sequence Editoir" published in ACM Transactions on Graphics, Vol. 9, No. 3 (July 1990) at pp. 338–341, disclose a color sequence editing tool to enable the rapid editing of the contents of a color lookup table (LUT). An editing window consists of three plotting areas containing Hue, Saturation, and Value plots and a color sequence feedback area. The horizontal coordinate in a plotting area corresponds to an entry in the LUT; the vertical coordinates give values of Hue, Saturation, and Value, respectively. Each plotting area is actually 256 pixels wide and can be considered as 256 slider bars controlling 256 LUT entries. To edit the color sequence, the user moves the cursor to the desired plotting area and draws or "plots" a curve. This replaces the plot previously drawn and causes a real-time change in the corresponding LUT entries.

Meier, B., in "ACE: A Color Expert System for User Interface Design", *Proceedings of the ACM SIGGRAPH Symposium on User Interface Software* (October 1988) discloses a production expert system designed to select colors for user interface design. Guidelines, heuristics, and rules of thumb from literature relating to the effective use of color in computer displays were synthesized into a set of strategic and tactical prescriptive rules for color selection, including tactical information for color selection and information related to the relational constraints imposed between a color selection and its function in the user interface. The set of colors selected consisted of ten perceptually different hues, fifteen "brightnesses" between black and white for each hue, and three saturations for each hue/brightness combination, yielding a total of 450 different colors available for selection, 150 of which were shades of gray.

De Corte, W., in "Finding Appropriate Colors for Color Displays" in *Color Research and Application*, Vol. 11, No. 1, Spring 1986, pp. 56–61, discloses a methodology and supporting algorithm to determine high-contrast sets of colors for use on a color CRT under varying conditions of illumination. The method generates colors which are highly contrasting and ergonomically optimal, given the number of colors, N, one wants to display. The color selection algorithm attempts to maximize the minimal between-color distance for a set of N points in the perceptually uniform CIELUV color space in such a way that the resulting colors remain within the gamut of colors which can be displayed by the terminal while meeting constraints derived from research in human vision and human factors.

Beretta, G. B., the named inventor herein, in *Selecting Colors for Representing VLSI Layout*, Xerox Palo Alto Research Center, Technical Report EDL-88-7, 1988, pp. 2–6, discloses a method for selecting discriminable colors for use in designing a VLSI layout using a computer-assisted design (CAD) graphics system. The method divides the layers of the VLSI circuit into functional classes and applies color theory rules to the selection of colors for each layer. Then, colors to be selected are manipulated in CIELAB space in order to more easily determine and uniformly distribute discriminable colors.

The ideal computer-aided color selection system should provide a general purpose, visual color selection mechanism for organizing color in a way that makes it easy to understand color elements and relationships, and which makes preliminary aesthetic determinations for subsequent review and modification by the user. Such a system should also provide an efficient method for choosing from among the millions of colors a color monitor may theoretically be capable of generating and displaying, thereby making color selection and manipulation intuitively predictable and manageable even for the novice color user. Existing systems, even those based on a perceptually uniform color model, generally do not provide such assistance.

Therefore, an interactive color selection system is needed for providing increased color selection assistance to users of a wide variety of color presentation systems for the selection of functional colors. Moreover, it is important to have a relatively simple user interface for this color selection system so that users can apply it to the color selection tasks they are facing, without having to understand or master features of the system that are irrelevant to those tasks.

SUMMARY OF THE INVENTION

In accordance with the present invention there is provided a functional color selection system for automatically generating a palette of coordinated, harmonious, and aesthetically pleasing colors from symmetrically manipulating calorimetrically specified colors in a perceptually uniform color space. Input means receive signals from a user requesting color selection functions. Color selection means, cooperatively associated with the input means, automatically generate at least one coordinated color from a key color. The key color is selected by the user from a plurality of key colors and is represented as a set of colorimetric coordinates in a uniform color space. At least one coordinated color is generated according to one rule of a set of color theory selection rules applied to the key color in the uniform color space. Display means provide the user with a palette of coordinated colors; and memory means provides for storing the palette of coordinated colors. In accordance with another aspect of the present invention, there is provided a system for automatically generating a palette of coordinated colors. Input means receive signals from a user requesting color selections. Color selection means, cooperatively associated with the input means, automatically generate a plurality of coordinated colors from a key color. The key color is selected by the user from a plurality of key colors and is represented as a set of cylindrical colorimetric coordinates in a uniform color space having hue-angle, lightness, and chroma coordinates. The plurality of coordinated colors is generated according to a set of color theory selection rules applied to the key color in the uniform color space. The plurality of coordinated colors include a plurality of analogous harmony hue colors, first and second triadic complement hue colors, or a direct complement color, a plurality of lightness variation colors, and a plurality of chroma variation colors. The analogous harmony hue colors are selected by varying the hue-angle coordinate of the key color by an angle in the range of 10 to 30 degrees greater than and less than the hue-angle of the key color. The direct complement hue color is selected by varying the hue-angle of the key color by 180 degrees. The first and second triadic complement hue colors are selected by varying the hue-angle of the key color by plus and minus 120 degrees. The plurality of lightness and chroma variation colors may be selected for each of the key colors, the plurality of analogous harmony hue colors, the direct complement hue color, and the first and second triadic complement hue colors. The plurality of lightness variation colors are selected by varying the lightness coordinates of each lightness variation color according to a quantity related to the position of the selected coordinated color in the uniform color space. The plurality of chroma variation colors are selected by varying the chroma coordinates of each lightness variation color according to a quantity related to the position of the selected coordinated color in the uniform color space. Display means, cooperatively associated with and responsive to the color selection means, provide the user with a view of the selected palette of coordinated colors as colors are selected. Memory means, cooperatively associated with the color selection means, store the palette of coordinated colors for later use by an associated color presentation system, or for further use by the color selection system.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to an illustrated embodiment, it is to be understood that there is no intent to limit it to that embodiment. On the contrary, the aim is to cover all modifications, alternatives and equivalents falling within the spirit and scope of the invention as defined by the appended claims.

A. The Uniform CIELAB Color Space

The preferred embodiment of the functional color selection system of the present invention operates in a perceptually uniform color space which facilitates color specification tasks. In particular, as will be explained in more detail shortly, the illustrated embodiment of the functional color selection system automatically selects palettes of harmonious and aesthetically pleasing colors by directly manipulating colors represented in the CIE 1976 (L*a*b*) (hereafter referred to as "CIELAB space" or "LAB space"). CIELAB space is a perceptually uniform color space in which the numerical magnitude of a color difference bears a direct relationship to a perceived color appearance difference. CIELAB space is an opponent-type color space, based on the opponent-color theory used to describe or model human color vision. In a system of this type, colors are mutually exclusive; for example, a color cannot be red and green at the same time, or yellow and blue at the same time, but a color can be described as red and blue, as in the case, for example, of purple.

Figure 1A:
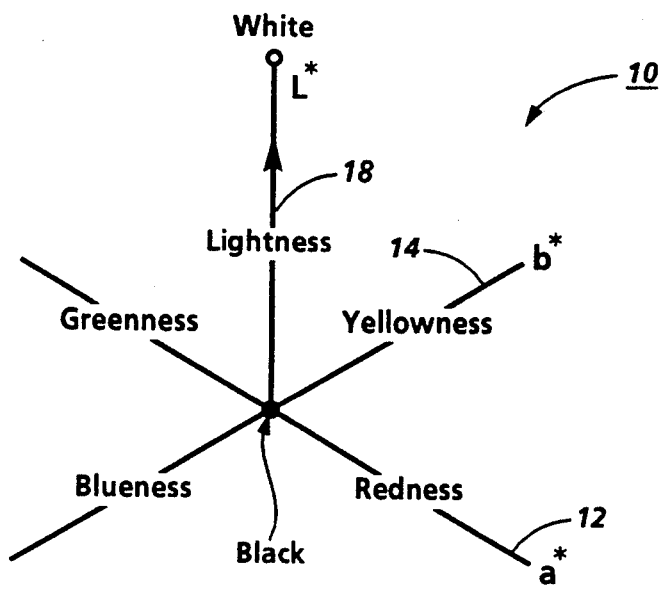
FIGS. 1A and 1B illustrate the uniform CIE 1976 (L*a*b*) color space, in which functional color selection according to the present invention may be performed, in three-dimensional rectangular coordinates and cylindrical coordinates, respectively.

FIG. 1A illustrates a three-dimensional rectangular coordinate view of opponent-type CIELAB color space 10. Two opponent coordinate axes 12 and 14, represented by a* (a-star) and b* (b-star), respectively, describe the chromatic attributes of color. The a* axis 12 represents the red-green coordinate, while the b* axis 14 represents yellow-blue. Positive values of a* denote red colors, while negative values denote green colors. Similarly positive values of b* represent yellows and negative values signify blues. The a* and b* coordinates are correlated to the postulated corresponding perceptual channels in the human visual system.

The L* (L star) coordinate defines the perceptual correlate of a color's "psychometric lightness". Lightness is defined as the attribute of a visual sensation according to which the area in which the visual stimulus is presented appears to emit more or less light in proportion to that emitted by a similarly illuminated area perceived as a "white" stimulus. Lightness is thus an attribute of visual sensation that has meaning only for related visual stimuli, and may be referred to as "relative brightness". L* is in the range of 0 to 100. The central L* axis 18 of the CIELAB color space lies perpendicular to the a*, b* plane and achromatic or neutral colors (black, grey, and white) lie on the L* axis at the point where a* and b* intersect (a*=0, b*=0).

Colors specified as tristimulus values X, Y, and Z are located in rectangular CIELAB space according to the formulas in Equations (1) through (3):

$$L^* = 116 \left( \frac{Y}{Y_n} \right)^{1/3} - 16 \tag{1}$$

$$a^* = 500 \left[ \left( \frac{X}{X_n} \right)^{1/3} - \left( \frac{Y}{Y_n} \right)^{1/3} \right] \tag{2}$$

$$b^* = 200 \left[ \left( \frac{Y}{Y_n} \right)^{1/3} - \left( \frac{Z}{Z_n} \right)^{1/3} \right] \tag{3}$$

with the constraint that $X/X_n$, $Y/Y_n$, $Z/Z_n > 0.01$. The terms $X_n$, $Y_n$, $Z_n$ are the tristimulus values for the reference white for a selected standard illuminant and observer, with $Y_n$ equal to 100. Those skilled in the art will appreciate that additional formulas are available for the case where $X/X_n$, $Y/Y_n$, $Z/Z_n < 0.01$; these formulas may be found in the references included below.

Figure 1B:
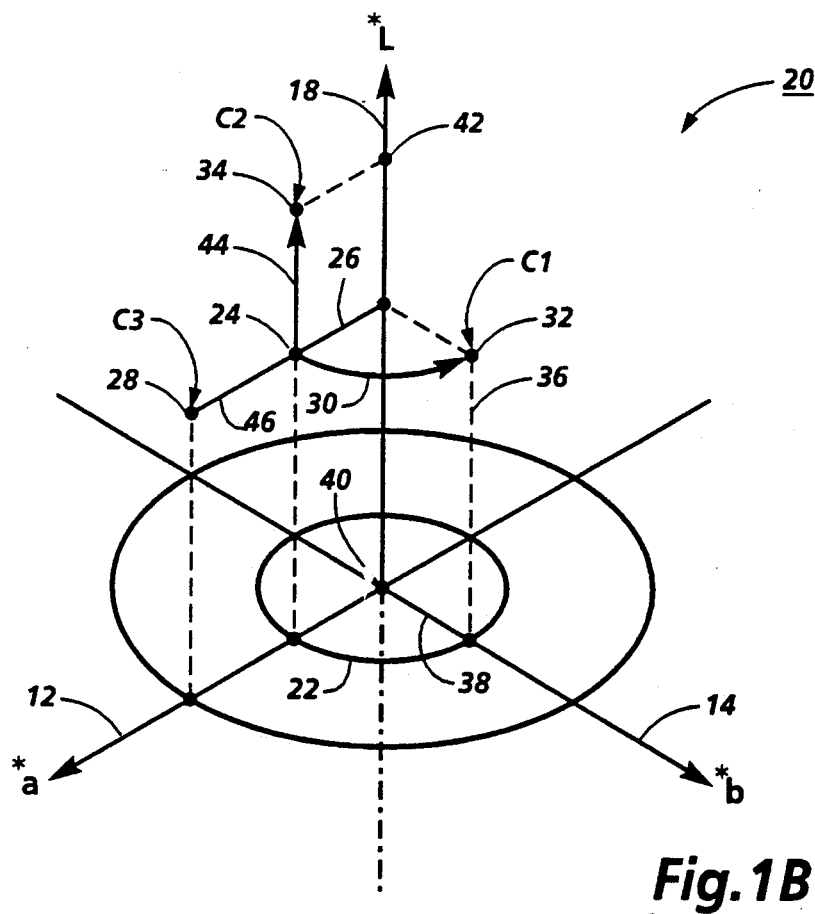

As those skilled in the art are also aware, mathematical manipulations of colors described in L*, a*, b* rectangular coordinate CIELAB space may be accomplished in cylindrical coordinates. Cylindrical coordinates permit identification and manipulation of the perceptual correlates of "hue" and "chroma". Turning now to FIG. 1B, there is illustrated a three-dimensional view of cylindrical coordinate CIELAB space 20. Hue is defined as the attribute of visual sensation which has given rise to color names such as blue, green, yellow, purple, and so on. Hue is defined in cylindrical CIELAB space as "hue-angle" which designates a hue numerically by an angle ranging from 0.0 to 360.0 degrees, with hues evenly distributed around the L* axis 18 from the positive a* axis 12, illustrated by circle 22, and with red corresponding to hue=0.0 degrees, as shown at point 24. Hue-angle 30 in FIG. 1B, an angle of 90 degrees is shown from point 24 to point 32. "Colorfulness" or "vividness" is the attribute of visual sensation according to which an area appears to exhibit more or less of its hue. Chroma is an object's colorfulness or vividness judged in proportion to the brightness of a reference white, or with reference to a similarly illuminated area. Chroma in cylindrical CIELAB space radiates out perpendicularly from the central L* axis 18, as shown along line 26 through points 24 and 28. Thus, the chroma of a color may be viewed as the distance away from the achromatic, or gray, central L* axis 18 for a given lightness (L* level) and hue-angle, and is orthogonal to both the hue-angle and lightness.

The formulas for computing the hue and chroma correlates are given in Equations (4) and (5), and the third coordinate, L*, is given above in Equation (1):

$$h_{ab} = \tan^{-1}\left( \frac{b^*}{a^*} \right) \tag{4}$$

$$C^*_{ab} = [(a^*)^2 + (b^*)^2]^{1/2} \tag{5}$$

in Equation (4), the quadrant of the resulting angle depends on the particular combination of positive or negative signs of a* and b*.

With continued reference to FIG. 1B, colors C1 at point 32 and C2 at point 34 are each defined in this view of CIELAB space by their hue, lightness, and chroma coordinates. The hue of first color C1 at point 32 is defined by hue-angle 30 from the positive a* axis 12. The lightness of color C1 is defined as the distance along L* axis 18, in the range from 0 to 100, along line 36. The chroma of C1 is defined as the measure of the radial distance, along line 38 directed radially outward from L* axis 18. Similarly, second color C2 at point 34 is defined by a hue-angle of 0 degrees because it lies along the positive a* axis 12. The chroma of color C2 at point 34 is the same as that of color C1, defined along line 26, and lying on circle 22. The lightness of color C2 at point 34 is defined as the distance along L* axis 18 from point 40 to point 42. It can be seen further from FIG. 1B that color C1 32 differs from color C2 34 by the change in hue-angle 22, and by the change in lightness shown from point 24 to 34 along line 44. Color C3 at point 28 differs in chroma from both colors C1 32 and C2 34 by an amount equal to the distance along line 46 from points 24 to 28.

In the illustrated embodiment of the functional color selection system of the present invention, harmonious colors are generated by symmetrically manipulating colors represented in CIELAB space by changing their lightness, hue, and chroma coordinates according to color theory rules. Because the color space is perceptually uniform, such manipulations result in discriminable and uniform changes in the resulting perceived colors. Thus, the user is provided with easily understood feedback with respect to the perceptual discrimination that is afforded by the different members of a palette of colors.

Additional information, not provided above, relevant to defining color in the CIE system, for utilizing CIE color spaces for displaying and modifying colors in graphics applications, and for defining additional standard mathematical transformations between tristimulus values and coordinates in CIE color spaces, may be found in several well-known colorimetry and color science texts and publications. Specific attention is directed to the following references: Hunt, R. W. G., *Measuring Colour*, Ellis Horwood Limited, Chichester, England, 1987 (reprinted in 1989) Chapter 3, Sections 3-1 through 3-10, pp. 53-69; Meyer, G. W., and D. P. Greenberg, "Perceptual Color Spaces for Computer Graphics", in *Color and the Computer*, H. J. Durrett, ed., Academic Press, 1987, pp. 83-100; and Hunter, R. S., Harold, R. W., eds., *The Measurement of Appearance*, 2nd Ed., John Wiley & Sons, 1987, Chapters 7, 8, and 9, pp. 95-165.

B. The Functional Color Selection System Environment

1. The Systems Environment

Figure 2:
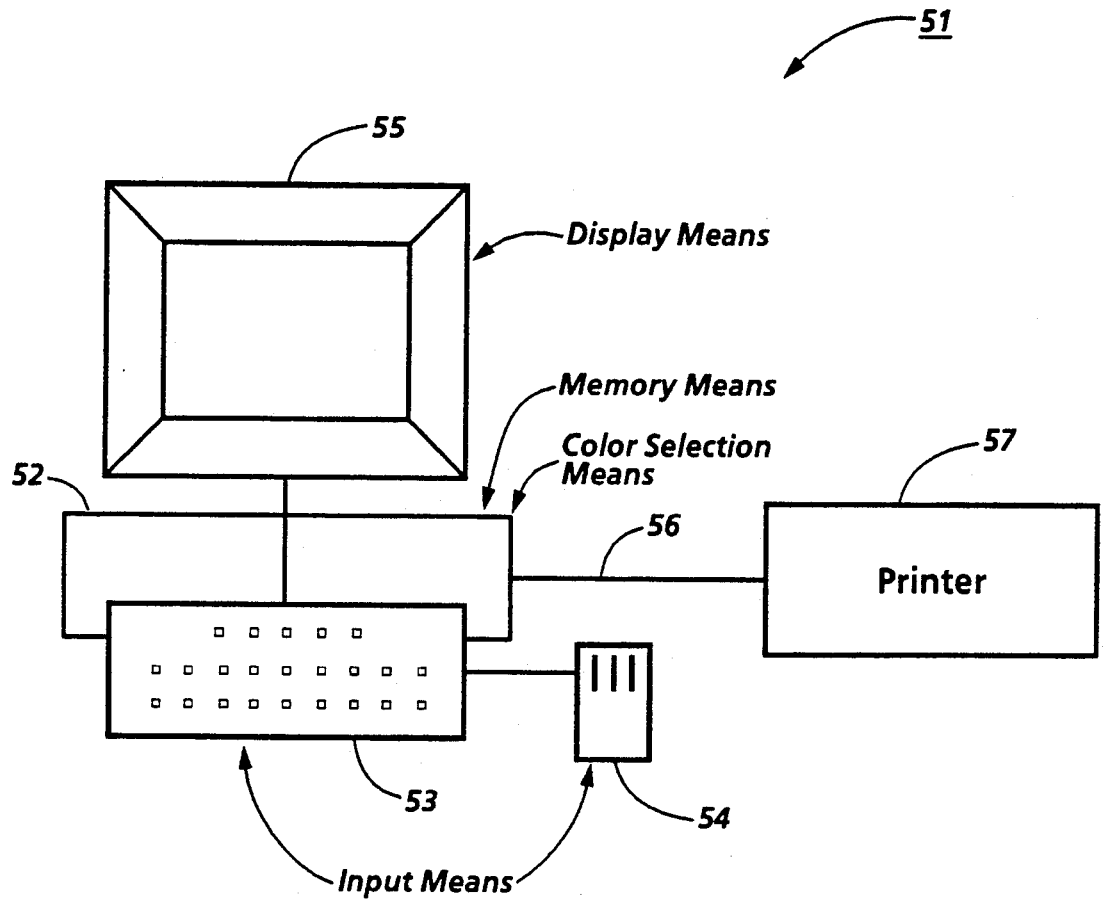
FIG. 2 is a schematic block diagram illustrating a computer system suitable for implementing the present invention.

Turning now to FIG. 2, there is a more or less conventional computer workstation 51 that has a processor 52 for processing user inputs received from a keyboard 53 and a "mouse" or similar user operated pointing device 54, together with a color monitor 55 for displaying the images that are created by such processing. In keeping with standard practices, the processor 52 has a memory system (not shown) comprising a main or primary memory for storing active programs and data files and a secondary memory for storing other programs and data files. Furthermore, the processor 52 is interfaced, as at 56, with a local or remote color printer 57.

Figure 3:
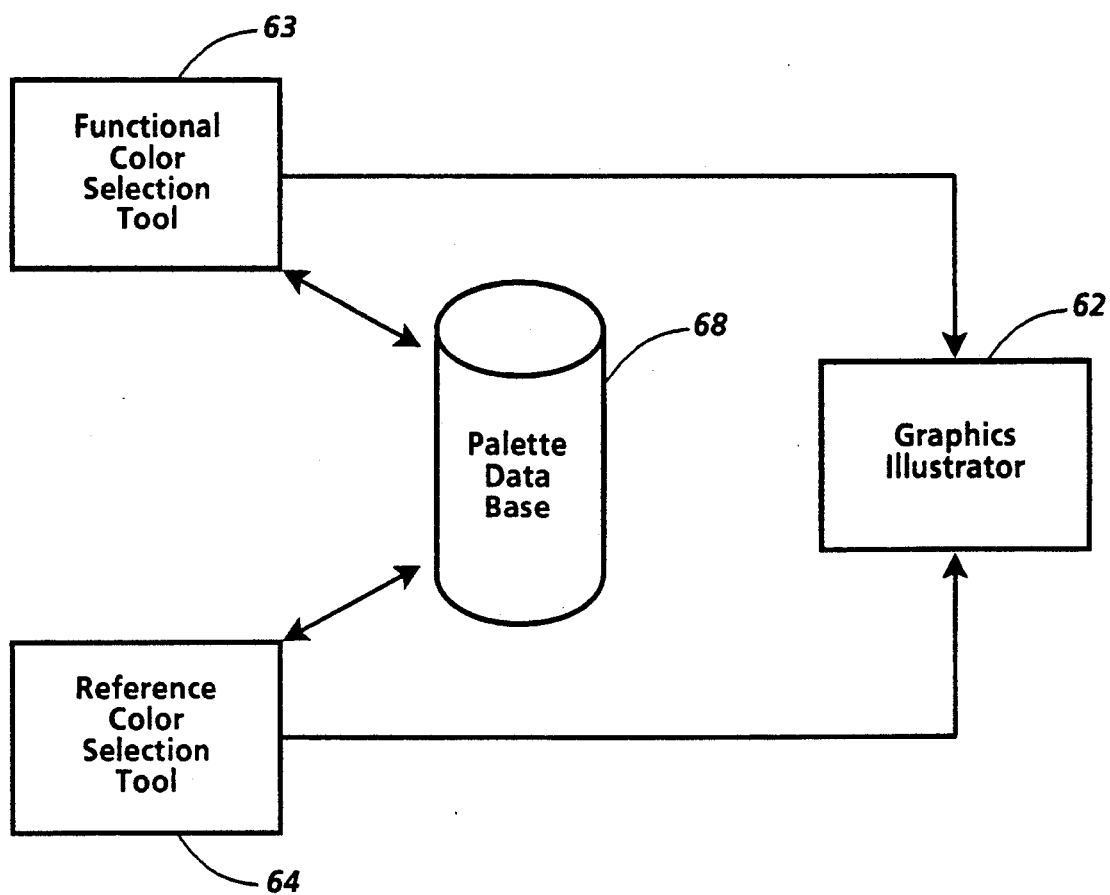
FIG. 3 FIG. 3A is a functional system block diagram illustrating the major system components of the functional color selection system of the present invention; is a schematic block diagram illustrating the software environment in which the functional color selection system of the present invention may operate.

Turning now to FIG. 3, there is illustrated a color graphics software environment operable through workstation 51 in which the functional color selection system 63 of the present invention may operate. A color presentation program, in this case a graphics illustrator 62, enables the user to create and manipulate graphical objects to produce graphical compositions. The illustrator 62 is interfaced with the functional color selection system 63 and with a reference color selection system 64 for allowing the user to interactively select functional colors and reference colors, respectively, for such compositions.

Some users may find it too cumbersome to design a palette of colors for every illustration. Moreover, for sophisticated applications where the choice of the colors is crucial to the design, the creation of color palettes might be assigned to a specially trained person. Therefore, a color palette database 68 is provided for storing any user created palettes that the user decides to save, as well as any other palettes that might be made available for use. Thus, palettes of functional and reference colors already created may be retrieved or copied from, as well as stored in, palette data base 68.

In keeping with this invention, the color selection systems 63 and 64 are independent programs that are invoked selectively by the user, thereby reducing the complexity of the user interface through which the user interacts with these systems. Further information regarding the reference color selection system may be found in a concurrently filed, commonly assigned United States patent application entitled "Reference Color Selection System", Ser. No. 677,706.

2. The Computer Implementation of the Illustrated Embodiment

A current embodiment of the functional color selection system of the present invention has been implemented on a Sun Microsystems SPARCstation computer in a research software application program, known as ProtoPalette. This implementation was written in the Cedar programming environment, a Xerox proprietary research software environment, utilizing the Cedar programming language. Appendix A (©1989, Unpublished Work, Xerox Corporation) provides a source code listing for this implementation. Information regarding the Cedar programming environment may be found in D. Swinehart et al., "A Structural View of the Cedar Programming Environment, *ACM Transactions on Programming Languages and Systems*, Vol. 8, No. 4, October 1986, pp. 419-490, (hereafter, "Swinehart, 'Cedar'") incorporated herein by reference. Additional information about the Cedar programming environment may also be found in Teitelman, W., "A Tour Through Cedar", *IEEE Software*, Vol. 1, No. 2, April 1984, pp. 44-73, also incorporated herein by reference.

It is intended that the functional color selection system 63 of the present invention may be implemented in a variety of hardware and software environments providing suitable and equivalent window management and graphics software support functions. Those skilled in the art will recognize, for example, that functional color selection system 63 may be implemented in a wide range of computing environments. In personal computer environments, the system may be implemented by using low-level assembly language routines for window management and graphics functions, or by using appropriate window "toolboxes" which provide pre-written window management and graphics functions. Similarly, the system may be implemented in larger computing environments supporting more powerful graphics functions. Source code in the attached source code listing of Appendix A references Cedar environment applications software support tools which manage the window environment, the graphics display output, and the coordination of the user's requests and responses when selecting colors using the functional color selection system 63. A brief functional explanation of this environment will demonstrate the system's portability.

Figure 3A:
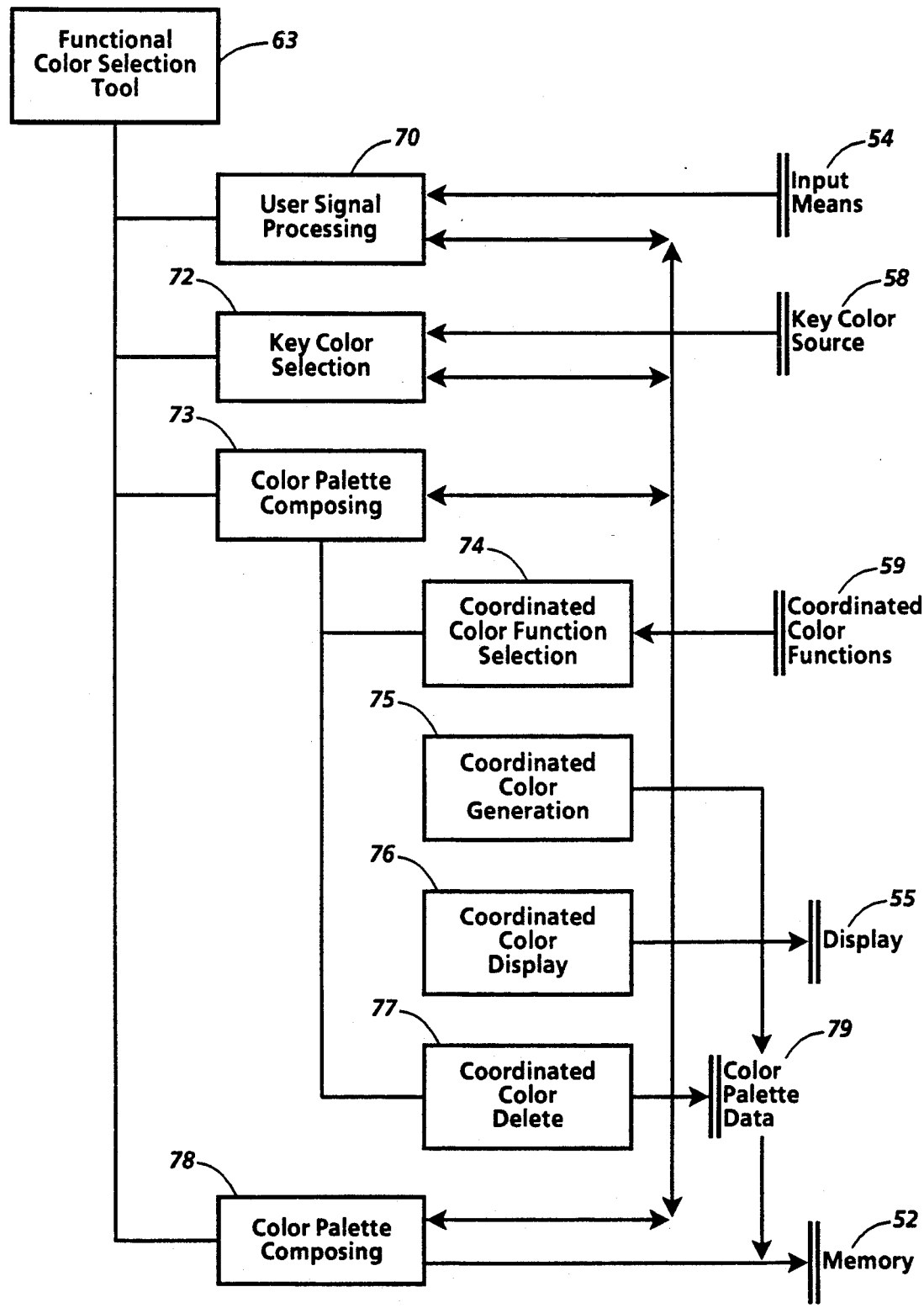

The underlying structure of the Cedar programming environment is a collection of components that are arranged in hierarchical layers according to the concept of an open operating system architecture. Cedar's open operating system concept supports a well-integrated, interactive environment because lower level modules remain directly available to higher level, or "client" programs. The functional color selection system of the present invention is a client of Cedar's "Viewers" and "Imager" applications software support tools, described in more detail below. Functional color selection system 63 is the application client program which contains the software for defining the color space, calibrated monitor gamut, and color selection processes for selecting the palette of coordinated colors. FIG. 3A illustrates a system block diagram for the application client program implemented in the illustrated embodiment, illustrating the major system and software components of the functional color selection system of the present invention.

A high-level software window management environment known as "Viewers" provides the necessary window management control for the functional color selection system. Viewers allows programmers and programs to create, destroy, move, and realize individual rectangular viewing areas on workstation display 55 (FIG. 2) called "viewers" which correspond to "windows" in other systems. Each viewer is a rectangular region whose position and size is managed by the Viewers software tool, but whose contents are determined by the color selection client application which creates the viewer. Cedar viewers are implemented by a client program as a set of viewer classes defined by the interface specification known as "Viewer Classes.Viewer" of the Viewers software. Client application programs, such as the functional color selection system, create new viewer instances in a particular class by calling the "ViewerOps.CreateViewer[className]" specification. A viewer class implementation provides operations to initialize a viewer, to save its contents, to destroy a viewer, to paint its contents on the display, and so on, and each member of a specific viewer class shares these same behaviors. The "ViewerClasses.Viewer" record also defines data fields, such as size information and display coordinates, that are common to all viewer classes. A client program uses a "clientData" field in the "ViewerClasses.Viewer" record to store implementation-dependent instance data.

User input devices include certain standard supported devices in the Cedar environment, including a mouse 54 and a keyboard 53 (FIG. 2). User input is managed and coordinated by Viewers through terminal processor support software which produces a single serial buffer of time-stamped input events from supported input devices, or interprets users' actions through Terminal Input Processor (TIP) tables. For each event, or event sequence, a TIP table entry specifies a sequence of action tokens that represent the semantics of the event.

The Cedar programming environment also provides a high-level, device independent graphics software environment known as Imager for producing and displaying high-quality, two-dimensional imaging of text, line art, and scanned images. The Imager handles all display output for the Viewers window manager software tool, as well as for other graphical illustrator programs implemented in the Cedar environment. The Imager supports the presentation of a variety of image material: text in various fonts, lines and curves of various thicknesses, strokes or enclosed outlines, sampled images, and various color models, including the Xerox Color Encoding Standard color model (described in more detail below). Image transformations can scale rotate, translate, and clip images through simple specifications. The device independent design permits images to be rendered on a variety of devices, some of which include full-color displays, color-mapped displays, and black-and-white displays.

C. The Operation of the Functional Color Selection System

Turning now to a more detailed description of the operation of the functional color selection system 63, it is to be understood that its purpose is to assist the user in assembling a coordinated palette of functional colors by restricting the palette to colors that are aesthetically pleasing according to certain color theory rules when used in combination with each other. The resulting palette is defined in device independent color specifications such as those provided by the CIE, and is further transformed into device dependent color specifications for display on the user's monitor, or for storage in palette data base 68 (FIG. 3) depending on the subsequent use of the color palette.

FIG. 3A illustrates the major system and software components of the functional color selection system 63. A user signal processing component 70, interacting with input means 54, controls the user's key color selection processing in box 72, the coordinated color function selection component in box 74, and processing for the storing of the color palette data structure in box 78 in memory 52. Selection of the coordinated color function in box 74, from source 59, initiates the processing component in box 75 for generation of the coordinated color according to the selected function, and in box 76 for the display of the coordinated color on display means 55.

1. The Calibrated Monitor Gamut

In the preferred embodiment of the present invention, the device independent color specifications are defined using the Xerox Color Encoding Standard (XCES), although it is to be understood that any recognized device independent color specification may be used, such as the ISO ODA Color Addendum. Xerox Corporation has defined and specified a device independent color specification, derived rom CIE color specifications and color science principles, for providing uniform and consistent color specifications to allow accurate color reproduction in the interchange between document processing applications. The XCES specifies standard color models that devices which subscribe to the XCES should use for representing color in interchange applications, thus providing a common color language description between color computer display and printing applications. One of the standard XCES color models, the XEROX/CIELAB model, hereinafter called the "CIELAB model", specifies color in terms of the red, green, and blue tristimulus values of the standard primaries, calibrated so that equal tristimulus values define a stimulus with the same chromaticity as standard white, which is selected to be the $D_{50}$ illuminant. Further information regarding the Xerox Color Encoding Standard, the CIELAB color model, and the transformation of device dependent color specifications into the CIELAB color model may be found in the publication, *Xerox Color Encoding Standard*, Chapter 2, Chapter 3, Chapter 6, Sections 6-1 through 6-3, and the Appendices A, B, and C, published by Xerox Corporation, Xerox Systems Institute, Sunnyvale, Calif. (XNSS 289005, May 1990) (hereafter referred to as "Xerox CES"), and incorporated by reference herein.

A calibrated color monitor gamut is defined according to the XCES standard monitor in the CIELAB color model. All color manipulations are performed in the calibrated monitor gamut. The gamut of the monitor on which the user is working must be colorimetrically measured and those measurements defined for the functional color selection software. Device dependent color specifications of the form needed to display selected colors on the particular monitor being used, generally RGB signals, are then mathematically calculated as needed, according to well known formulas, such as those provided in the aforementioned Xerox CES, in Section 2, and Appendix C. Those skilled in the art will appreciate that any device independent perceptually uniform color space, such as, for example, the CIELUV color space, may be used as the model in which to manipulate the color selection methodology to be described below in more detail.

2. Specifying the Key Color

Figure 4:
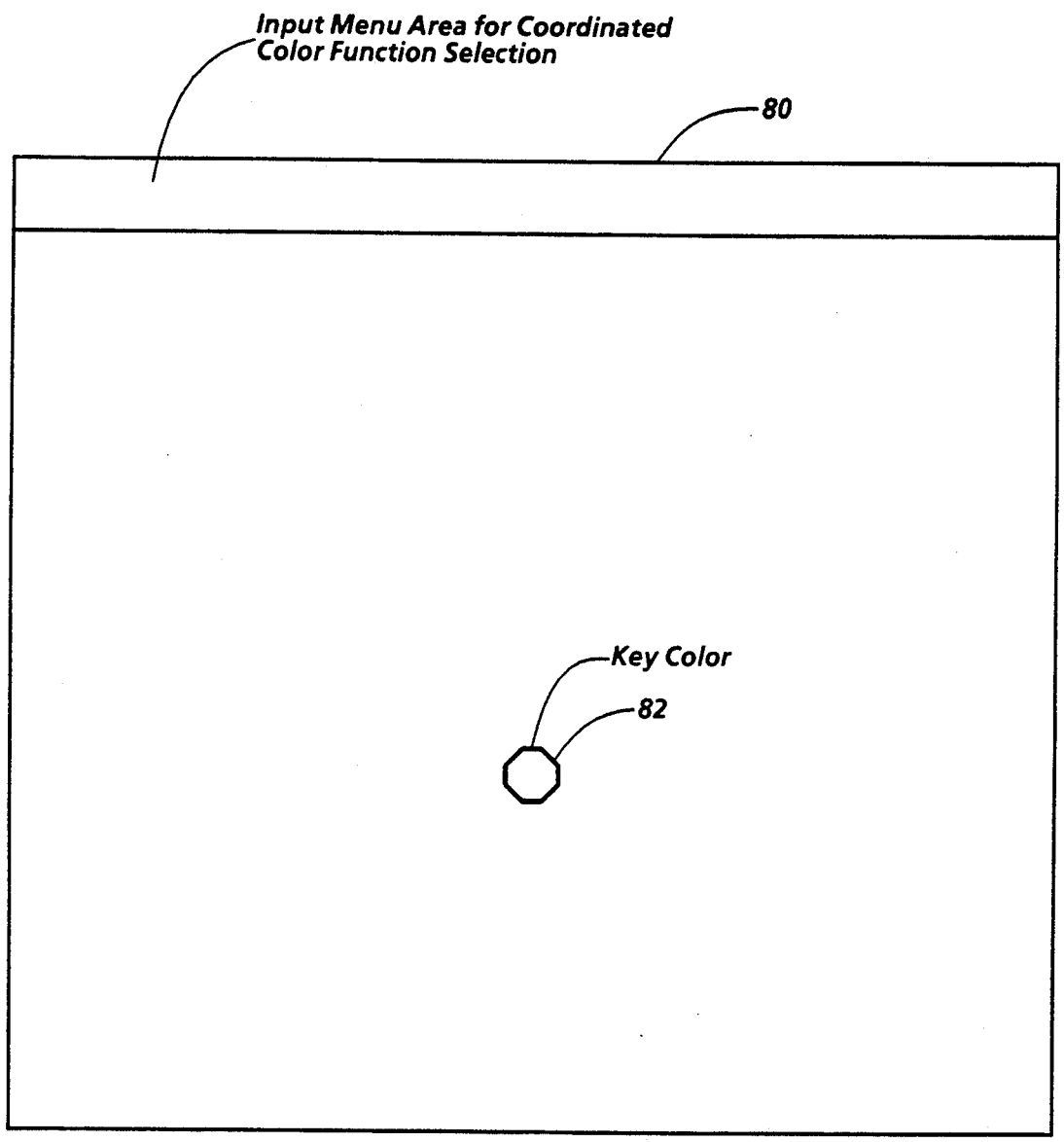
FIGS. 4, 5, 6, 7, 8, and 9 illustrate a sequence of display screens according to an illustrated embodiment of the present invention.
Figure 10:
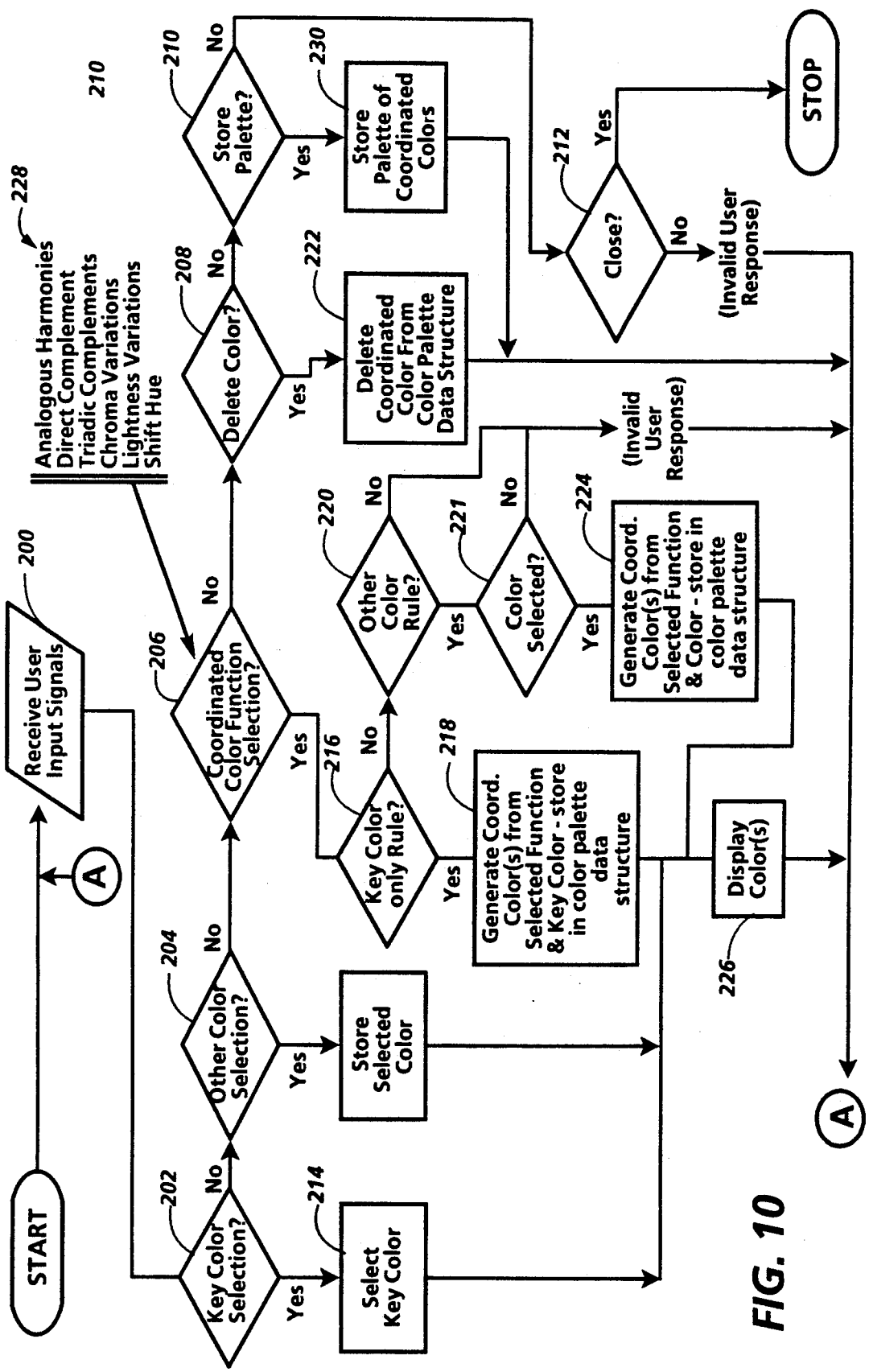
FIG. 10 is a flow chart illustrating one embodiment of the overall process flow for generating a palette of coordinated colors according to the present invention.

FIGS. 4, 5, 6, and 7 illustrate a representative sequence of screen displays a user would see in response to selecting colors according to the functions provided in the functional color selection system. FIG. 10 illustrates one embodiment of the overall process flow for generating a palette of coordinated colors. Boxes 200, 202, 204, 206, 208, 210, and 212 generally illustrate the user signal processing for requesting color selections. In response to a system prompt, or by selecting a command with mouse 54 (FIG. 2), the user first specifies, in box 214 (FIG. 10), a single "key color". The key color is the one on which the user wants to base his palette. The key color is then displayed, in box 226 FIG. 4 illustrates screen 80 in which selected key color 82 is displayed in an octagonal color patch on a medium gray background to give the user an opportunity to examine it and respecify it if desired.

In the illustrated embodiment, the key color is one of a plurality of predefined colors, having universal recognition qualities selected and colorimetrically specified according to research by Boynton and Smallman. See Boynton, R. M., and Smallman, H. S., "Segregation of Basic Colors in an Information Display ", *Applied Vision* 1989 *Technical Digest Series,* Vol. 16 (Conference Edition, Jul. 1989), pp. 164-167. TABLE 1 lists the key colors and their luminance and chromaticity (Y, x, y) values provided in the illustrated embodiment:

TABLE 1

| KEY COLOR | Y | x | y |
| --- | --- | --- | --- |
| RED | 9.72 | 0.5341 | 0.3191 |
| GREEN | 17.26 | 0.3092 | 0.5189 |
| YELLOW | 67.72 | 0.4584 | 0.4962 |
| BLUE | 8.11 | 0.1819 | 0.1965 |
| ORANGE | 33.72 | 0.5387 | 0.4045 |
| PURPLE | 4.43 | 0.2999 | 0.2032 |
| PINK | 47.19 | 0.3653 | 0.3090 |

TABLE 1-continued

| KEY COLOR | Y | x | y |
| --- | --- | --- | --- |
| BROWN | 8.42 | 0.4749 | 0.3982 |

3. Selecting Analogous Harmonies

Depending on the number of related object classes in the illustration for which the user is creating a palette, the use will need a small number of harmonizing colors. Once key color 82 has been selected, the user may command the tool 63 in box 206 (FIG. 10) to generate one or more "analogous harmony" colors from the key color. In response to this command in box 218, the color selection system 63 increments the hue-angle of the key color twice by 30 degrees to generate two analogous harmony colors. Similarly, the color selection system 63 decrements the hue-angle of the key color twice by 30 degrees to generate two additional analogous harmony colors. These harmonious colors are symmetries in the uniform color space.

Figure 5:
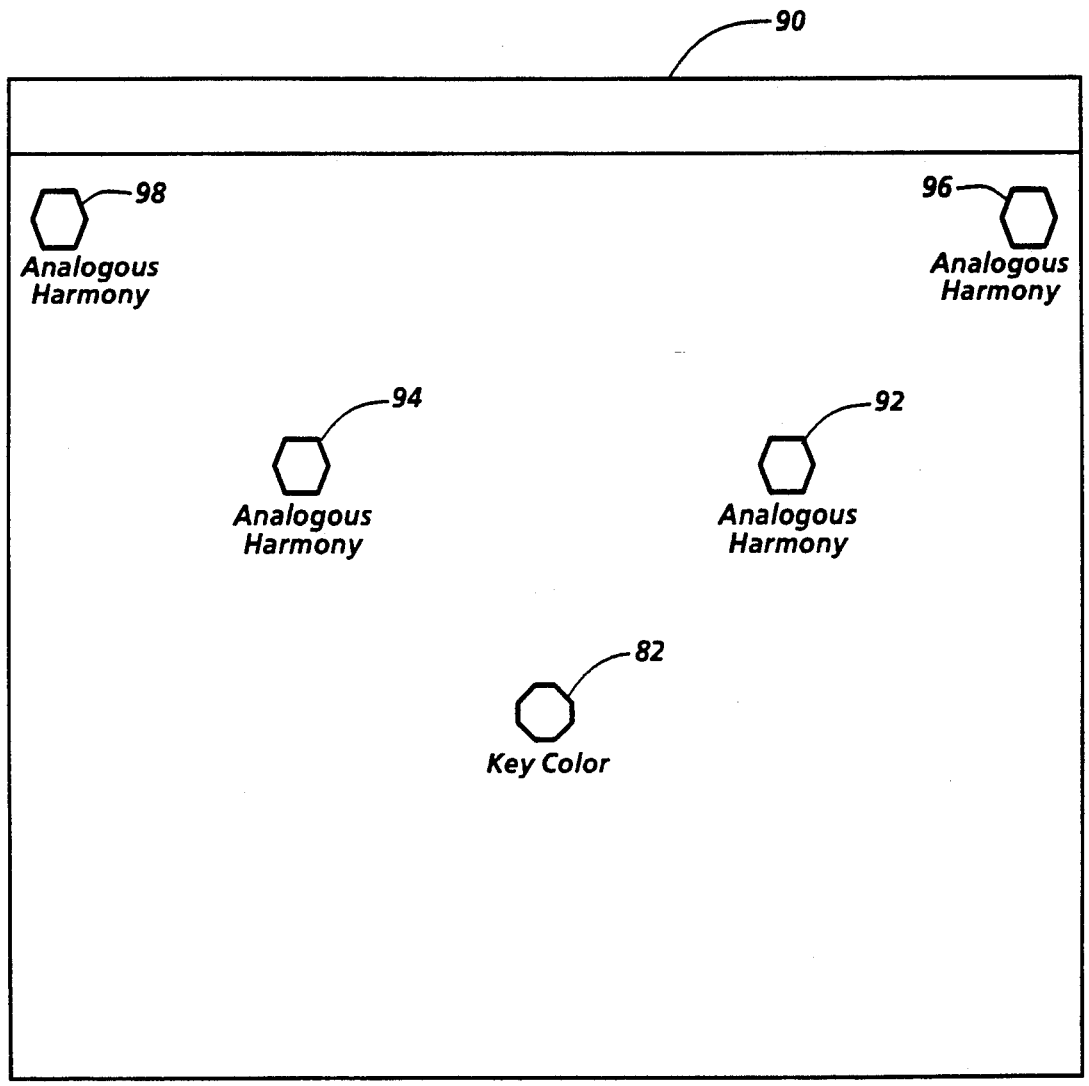

As an example of the generation of the analogous harmonies, a palette composed of the key color 82 and four analogous harmony colors, displayed in the hexagonally shaped color patches, is illustrated in FIG. 5 on screen 90. Analogous harmony colors 92 and 94 are located in the perceptually uniform LAB space at +30 degrees and −30 degrees, respectively, from the hue-angle of the key color. Analogous harmony colors 96 and 98 are located in the perceptually uniform LAB space at +60 degrees and −60 degrees, respectively, from the hue-angle of the key color.

For certain very light colors, such as, for example, key color yellow, if the original chroma and lightness values for yellow were retained when computing analogous harmony colors, no such colors would exist in the calibrated monitor gamut. For this reason, lightness and chroma may also be recomputed for certain key colors, to bring them within the boundary of the calibrated monitor gamut. Any suitable known gamut clipping algorithm may be applied to accomplish this result. In the illustrated embodiment, for the analogous harmony color specified with the incremented or decremented hue-angle, it is first determined whether the new analogous harmony color is in the calibrated monitor gamut by computing the difference between the chroma value of the analogous harmony color and the chroma value for the gamut at the given lightness level, at the incremented or decremented hue-angle. Then, if the color is within the gamut at the specified chroma, no chroma clipping is performed. If the analogous harmony color is not within the gamut at the specified chroma, the lightness difference is computed between the lightness value of the analogous harmony color and t'ie lightness value for the gamut at the incremented or decremented hue-angle, and the smaller value of the change in chroma and the change in lightness is used to clip the color to the calibrated monitor gamut.

4. Selecting Contrasting Harmonies

Figure 6:
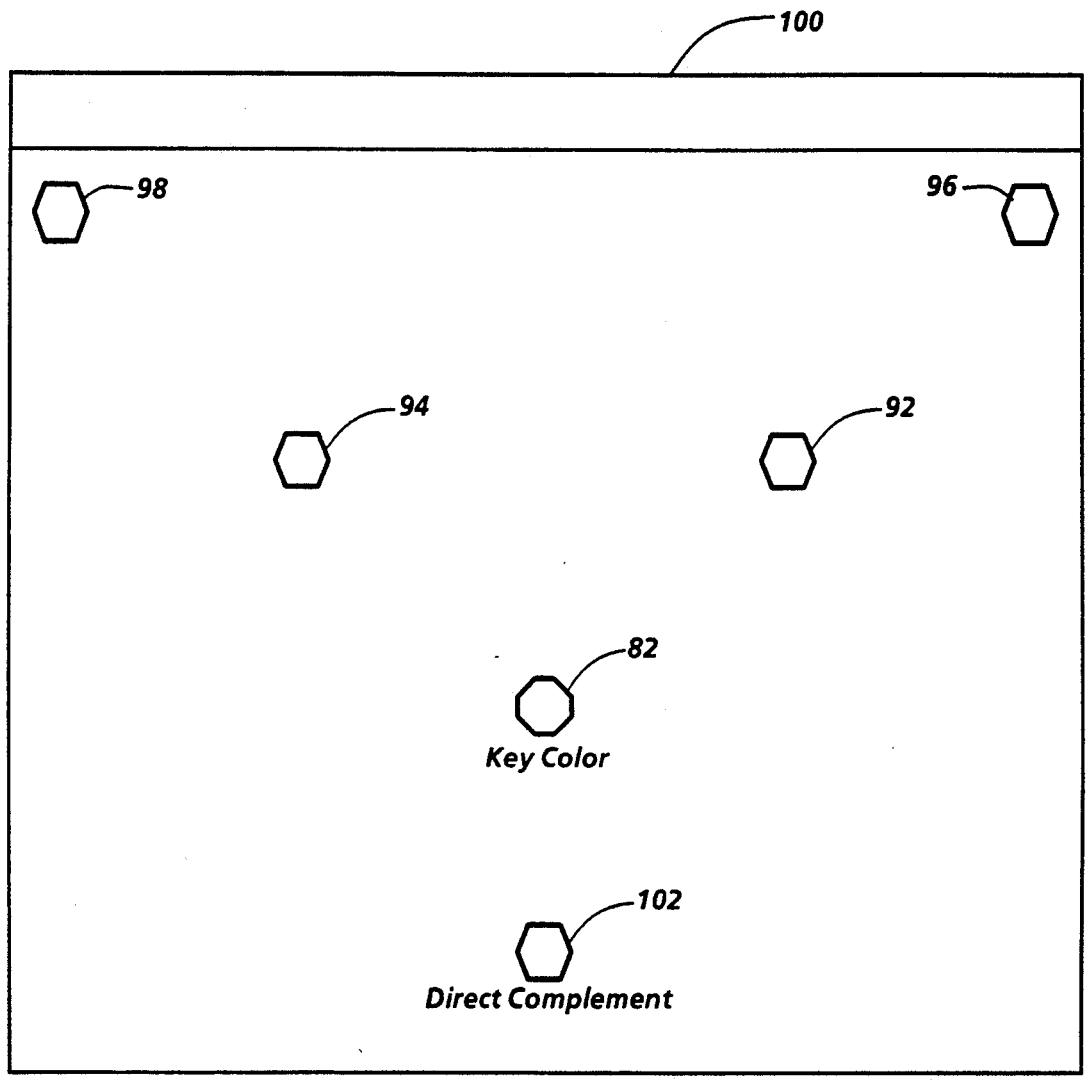

Turning now to FIG. 6, there is illustrated screen 100 which displays for the user contrasting harmony color 102. In response to the user request in box 206 (FIG. 10), to select a direct complement, or contrasting harmony, of key color 82, functional color selection system 63, in box 218, increments or decrements the hue-angle of the key color by 180 degrees, thereby generating its direct complement.

Figure 7:
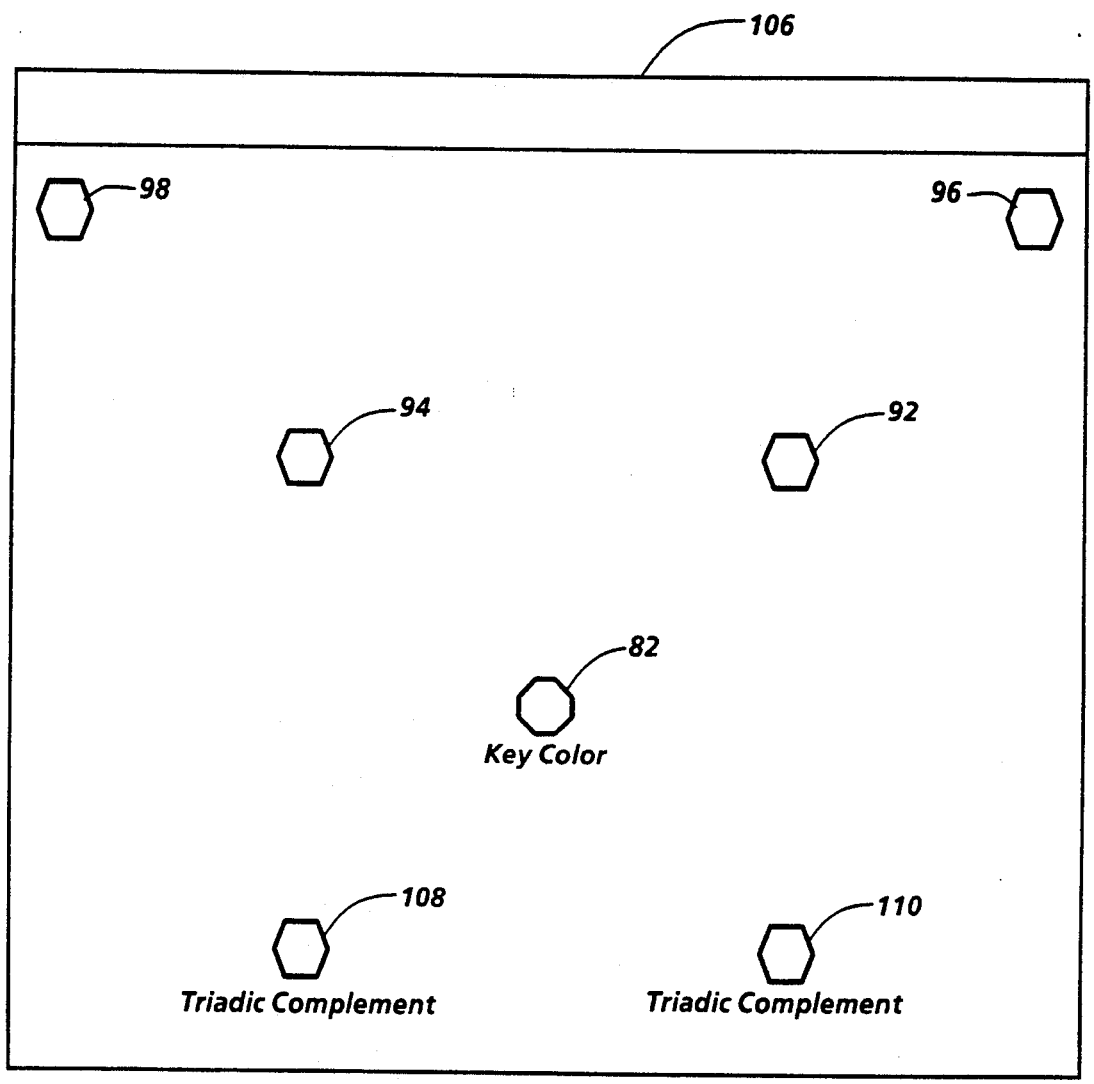

Alternatively, the user may request two contrasting harmony colors, or "triadic complement" colors. Functional color selection system 63 increments and decrements the hue-angle of the key color by +120 degrees and −120 degrees generating its triadic complements. FIG. 7 illustrates screen 106 showing triadic complements 108 and 110, displayed as hexagonally shaped color swatches, for key color 82.

For computing the analogous harmony as well as the direct or triadic complement colors, a single oblique plane in LAB space is arbitrarily chosen to pass through the key color and a point on the L* axis called the "pivot". The pivot is chosen so that extreme lightness values are possible for the key color. For example, if the key color is yellow with coordinates (L, C, H)=(90, 41, 99), L*=70 would be a good pivot point, producing a direct complement of (50, 39, 279), when accounting for the lightness and chroma gamut clipping process described earlier.

5. Selecting Lightness and Chroma Variation Colors

Figure 8:
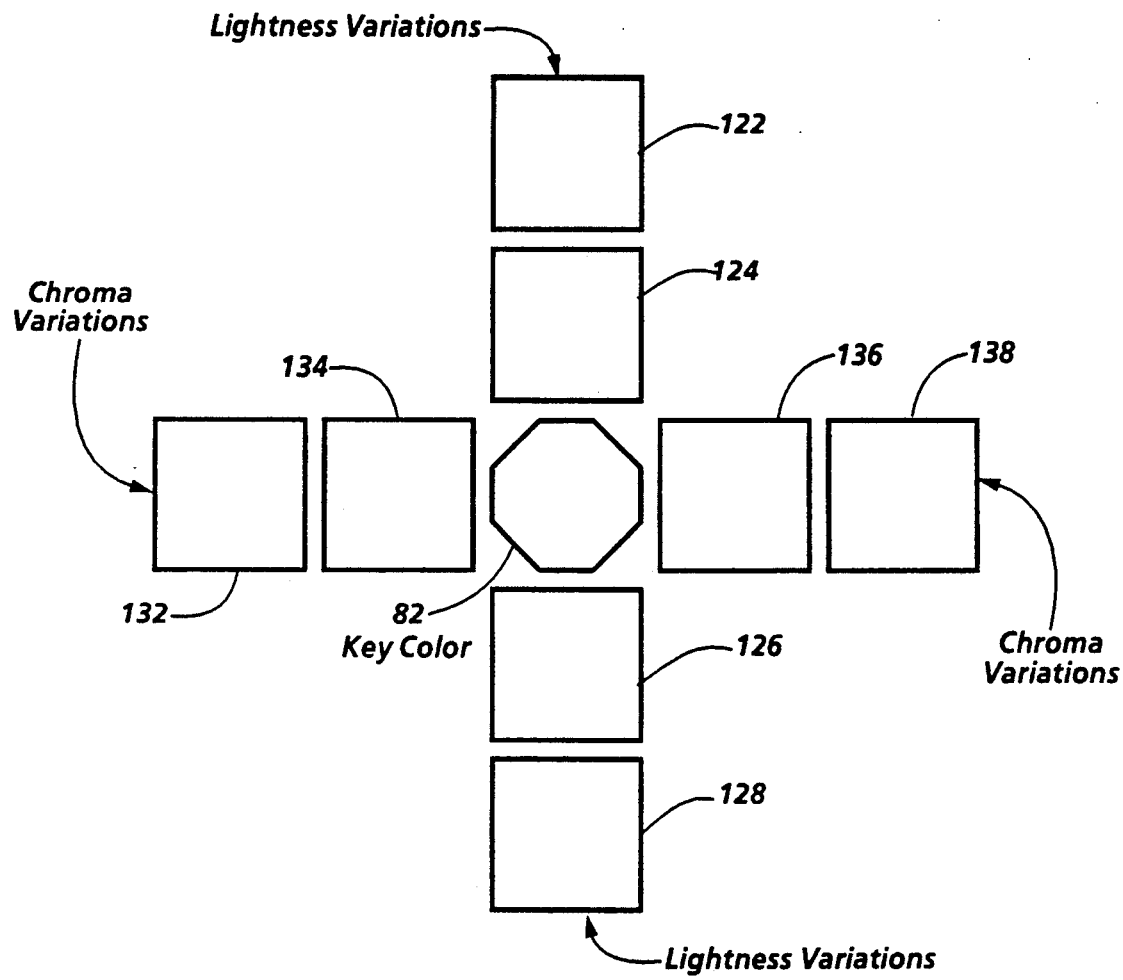

For compositional or artistic reasons, it is usually necessary to obtain "nuances" for a color. Nuances are computed variations in lightness or chroma while maintaining a constant hue-angle. For example, functional color selection system 63 enables the user to independently vary the chromas of the different hues a palette contains, so that these chroma variations may be employed to add depth perception to an illustration. FIG. 8 illustrates how the lightness and chroma variations are visually arranged for the user on the screen for key color 82. Both lightness and chroma variations are illustrated as square color patches, arranged linearly around key color 82. Lightness variations are arranged in a vertical line around key color 82, with two colors 122 and 124, lighter and above key color 82, and two colors 126 and 128 darker and below key color 82. Chroma variations are arranged in a horizontal line around key color 82. Remembering that chroma represents the vividness or dullness of a color, two less vivid, more gray colors 132 and 134 are arranged to the left of key color 82, and two more vivid colors 136 and 138 are arranged to the right of key color 82.

As shown generally in FIG. 10 in the process flow following from box 206, lightness and chroma variations may be produced for the key color, the analogous harmony colors, and the direct or triadic complement colors. To produce lightness variations for a given palette color with lightness of L*, the system computes the intersection of the calibrated monitor gamut parallel to the given lightness level and divides the obtained segment into a number of equal intervals to produce a scale. In the illustrated embodiment, four such intervals are created, thereby producing four lightness variations, as shown in FIG. 8, two colors greater than and two color less than, the lightness level L* of the selected palette color.

Chroma variations are also determined using the pivot point for the key color. A line segment from the pivot point through the selected color to the edge of the calibrated monitor gamut provides the interval for scaling the chroma. The line segment is divided into a number of equal intervals to produce a scale. In the illustrated embodiment, four such intervals are created, thereby producing four chroma variations, as shown in FIG. 8.

In the symmetry of the perceptually uniform color space, the determination of lightness and chroma nuances is directly linked with the hue-angle used to generate analogous harmony colors. The hue-angle of 30 degrees for incrementing and decrementing the key color hue-angle to generate analogous harmony colors is a fixed angle in the illustrated embodiment. The hue-angle change value of 30 degrees has been determined to provide analogous harmony colors and their associated chroma and lightness nuance colors having reasonable and perceived discriminability in the calibrated monitor gamut, especially in the blue range of colors, where perception of colors is most difficult. However, this hue-angle need not be a fixed, non-varying amount, and could be provided as a user-controlled angle. A suggested range of 15 to 30 degrees would most probably provide a harmonious palette of colors with reasonable and perceived discriminability in the user's monitor gamut and on most hardcopy color devices, if these devices are not calibrated. Smaller angles may also be suitable for the user's purpose, if discriminability of lightness and chroma nuances are not necessary for the user's application.

6. Shifting the Hue, and Storing the Generated Palette of Colors

Figure 9:
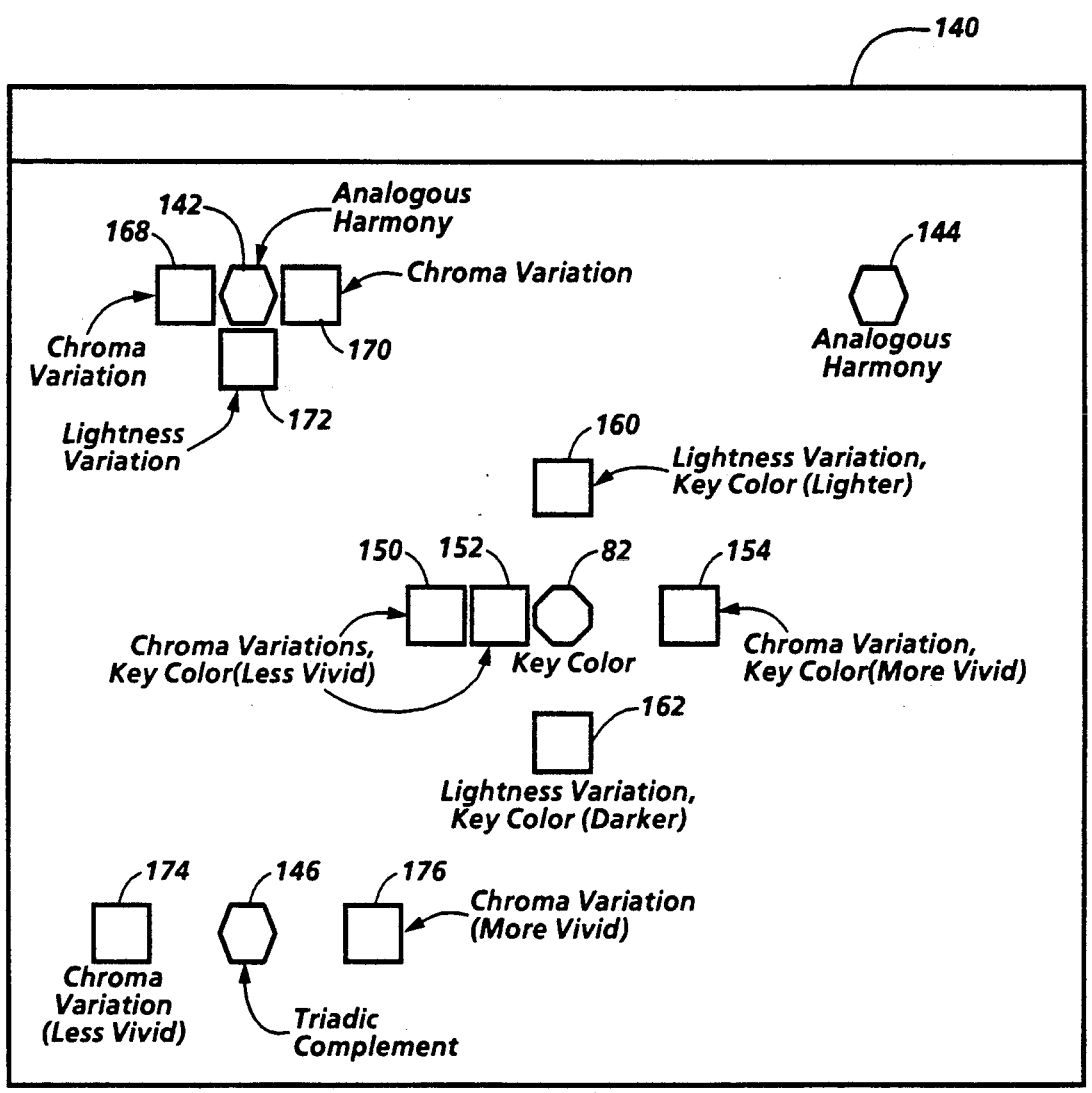

The functional color selection system 63 of the present invention employs a conventional array or table data structure for accumulating the device independent color specifications for each color added to the palette. As shown in FIG. 10, in boxes 208 and 222, colors not needed for a particular illustration may be deleted by the user from the palette prior to exporting the palette to an associated color presentation system such as the graphics illustrator 62 of FIG. 3, or to the palette data base 68, as shown in boxes 210 and 230 not needed. The illustrated embodiment provides a mouse function for deleting unwanted colors from the palette. The deleted colors in the palette are flagged as invalid colors in the palette data structure. FIG. 9 illustrates screen 140 in which a sample palette of fourteen colors has been selected with a key color 82, two analogous harmony colors 142 and 144, and one of the two triadic complements 146 (the other triadic complement has been deleted). Also shown are selected chroma nuances 150, 152, and 154, and lightness nuances, 160, and 162, for key color 82, selected chroma nuances 168 and 170, and lightness nuance 172 for analogous harmony 142, and chroma nuances 174 and 176 for triadic complement 146. It is of course clear from the foregoing descriptions for the functional color selection system that many variations of coordinated and harmonious palettes may be constructed in this manner.

When a final palette has been assembled, or at any intermediate point while selecting colors for the palette, the user may vary the hue of the entire palette by a fixed amount to view the harmonious palette in different hues. In the illustrated embodiment, and as shown in FIG. 10, boxes 206 and 228, the user selects a menu command called "shifted hue" with a mouse button from the screen displaying the palette. A left mouse button selection results in varying the hue-angle of the key color in increments of a constant angle, for example, 15 degrees. A right mouse button selection results in varying the hue-angle of the key color in decrements of the same constant angle. This results in all colors in the palette being recomputed as specified above so that all analogous and contrasting harmonies and their associated nuances are consistent with the now-modified key color. As with the hue-angle used to generate the analogous harmony colors, the shifted hue-angle need not be fixed at 15 degrees. For aesthetically pleasing results it is suggested that the shifted hue-angle be proportional to the hue-angle used to generate the analogous harmony colors. In the illustrated embodiment, the shifted hue-angle is one-half the hue-angle used to generate the analogous harmony colors.

CONCLUSION

In view of the foregoing, it now will be seen that the present invention provides means for facilitating the selection of aesthetically pleasing functional colors for computer color presentation systems. The color selection system of this invention is sufficiently straightforward to enable users who have little, if any, background knowledge or skill in color coordination to create complete palettes of harmonious or complementary colors for use in their illustrations.

APPENDIX A

*ProtoPalette.Mesa*
*Copyright ■ 1989 by Xerox Corporation. All rights reserved.*

*The procedures to build color palettes.*

DIRECTORY
    ImagerColorES USING [CIELAB];

ProtoPalette: CEDAR DEFINITIONS ~ BEGIN

CIELAB: TYPE ~ ImagerColorES.CIELAB;    -- *RECORD [lStar, aStar, bStar: REAL]:*
  LCH: TYPE ~ RECORD [lStar, c, h: REAL];    -- *Lab in cylindrical coordinates*
  LAB: TYPE ~ REF CIELAB ← NIL;

values: INTEGER ~ 2;    chromata: INTEGER ~ 2;  -- *in each direction of the color*
  ValueAndChroma: TYPE ~ [-(values+chromata) .. chromata+values];
  IsoHueVariation: TYPE ~ ARRAY ValueAndChroma OF LAB;
  Hue: TYPE ~ [-3 .. 4];
    centerHue: INTEGER ~ 0;
    analoguousHarmonies: TYPE ~ [-2 .. 2];
    leftTriadicComplement: INTEGER ~ -3;
    rightTriadicComplement: INTEGER ~ 3;
    directComplement: INTEGER ~ 4;
  Harmony: TYPE ~ ARRAY Hue OF IsoHueVariation;

Palette: TYPE ~ REF PaletteRep;
  PaletteRep: TYPE ~ RECORD [keyColor: ATOM, colors: Harmony, lock: BOOL ← FALSE];

notInitialized: SIGNAL;

CreatePalette: PROC [keyColor: ATOM ← $default] RETURNS [p: Palette];

ValidKeyColor: PROC [keyColor: ATOM] RETURNS [BOOL];

CopyPalette: PUBLIC PROC [p: Palette] RETURNS [pp: Palette];
  *Make full physical copy.*

RotateNegative: PROC [p: Palette] RETURNS [pp: Palette];
  *The whole palette is rotated. Returns new element for undo.*

RotatePositive: PROC [p: Palette] RETURNS [pp: Palette];
  *The whole palette is rotated. Returns new element for undo.*

MakeAnaloguousHarmony: PROC [p: Palette] RETURNS [pp: Palette];
  *Returns new element for undo.*

DeleteAnaloguousHarmony: PROC [p: Palette] RETURNS [pp: Palette];
  *Returns new element for undo.*

MakeDirectComplement: PROC [p: Palette] RETURNS [pp: Palette];
  *Returns new element for undo.*

DeleteDirectComplement: PROC [p: Palette] RETURNS [pp: Palette];
  *Returns new element for undo.*

MakeTriadicComplements: PROC [p: Palette] RETURNS [pp: Palette];
  *Returns new element for undo.*

DeleteTriadicComplements: PROC [p: Palette] RETURNS [pp: Palette];
  *Returns new element for undo.*

VaryValue: PROC [p: Palette, v: IsoHueVariation] RETURNS [vv: IsoHueVariation];
  *Chroma and hue are kept constant, while the lightness is changed.*
  *Returns new element for undo*

RestrictValue: PROC [p: Palette, v: IsoHueVariation] RETURNS [vv: IsoHueVariation];

VaryChroma: PROC [p: Palette, v: IsoHueVariation] RETURNS [vv: IsoHueVariation];
  *Value and hue are kept constant, while the chroma is changed.*
  *Returns new element for undo*

RestrictChroma: PROC [p: Palette, v: IsoHueVariation] RETURNS [vv: IsoHueVariation];

Cartesian: PROC [lch: LCH] RETURNS [LAB];
  *Transforms from cylindrical to carthesian CIELAB coordinates.*

Cylindrical: PROC [lab: LAB] RETURNS [LCH];
  *Transforms from carthesian to cylindrical CIELAB coordinates.*

ClipLightness: PROC [color: CIELAB] RETURNS [CIELAB]
  *Clips a color by constraining only the lightness.*

END.  -- *ProtoPalette*

DIRECTORY
    ProtoPalette.
    Imager USING [VEC],
    ImagerColorES USING [ABChroma, CIELABFromXYZ, CIELUV, HSVFromRGB,
            IlluminantChange, RGB, RGBFromHSV, Tristimulus, XeroxRGBFromXYZ, XYZ,
            XYZFromCIELAB, XYZFromCIELUV, XYZFromXeroxRGB],
    IntChainedHashTable USING [Create, Fetch, Insert, Key, Replace, Table],
    Real USING [Ceiling, Float, Floor, Round],
    RealFns USING [ArcTanDeg, CosDeg, SinDeg, SqRt],
    RefTab USING [Create, Fetch, Ref, Store];

ProtoPaletteImpl: CEDAR PROGRAM

IMPORTS ImagerColorES, IntChainedHashTable, Real, RealFns, RefTab

EXPORTS ProtoPalette ~ BEGIN    OPEN ProtoPalette, Real, RealFns;

VEC: TYPE ~ Imager.VEC; VEC3: TYPE ~ RECORD [x, y, z: REAL];
   XYZ: TYPE ~ ImagerColorES.XYZ;

break: SIGNAL ~ CODE;             -- *for debugging*
   notInitialized: PUBLIC SIGNAL ~ CODE;
   debug: BOOL ← FALSE;   published: BOOL ← FALSE;     -- *which gamut*
   precision: ATOM ← $low;   centerChroma: ATOM ← $middle;

Value: TYPE ~ [-values .. values];   Chroma: TYPE ~ [-chromata .. chromata];
   KeyColor: TYPE ~ REF KeyColorRep;
   KeyColorRep: TYPE ~ RECORD [name: ATOM, lch: LCH, lab: LAB, pivot: REAL];
   keyColorTable: RefTab.Ref ← RefTab.Create [];
   hues: REAL ← 12;        hueStep: REAL ← 360.0 / hues;

Basic Operations

CreatePalette: PUBLIC PROC [keyColor: ATOM ← $default] RETURNS [p: Palette] ~ BEGIN
      *The key hue is an angle.*
      reference: KeyColor ~ KeyColorData [keyColor];
      color: LCH ~ CenterColor [reference.lch.h, reference];
      p ← NEW [PaletteRep];   p.lock ← TRUE;
      p.keyColor ← keyColor;   p.colors[centerHue][0] ← Cartesian [color];
      p.lock ← FALSE
      END;    -- *CreatePalette*

CopyPalette: PUBLIC PROC [p: Palette] RETURNS [pp: Palette] ~ BEGIN
      *Make full physical copy.*

IF (p = NIL) THEN notInitialized;
      IF p.lock THEN break;    p.lock ← TRUE;
      pp ← NEW [PaletteRep];   pp.lock ← TRUE;
      FOR i: Hue IN Hue DO
          FOR j: ValueAndChroma IN ValueAndChroma DO
             IF (p.colors[i][j] # NIL) THEN pp.colors[i][j] ← NEW [CIELAB ← p.colors[i][j]↑]
            ENDLOOP
          ENDLOOP;
      pp.keyColor ← p.keyColor;      p.lock ← pp.lock ← FALSE
      END;    -- *CopyPalette*

Cartesian: PUBLIC PROC [lch: LCH] RETURNS [LAB] ~ BEGIN
      *Transforms from cylindrical to cartesian CIELAB coordinates.*
      RETURN [NEW [CIELAB ← [lch.lStar, lch.c * CosDeg [lch.h], lch.c * SinDeg [lch.h]]]]
      END;    -- *Cartesian*

Cylindrical: PUBLIC PROC [lab: LAB] RETURNS [LCH] ~ BEGIN
      *Transforms from cartesian to cylindrical CIELAB coordinates.*

```
lch: LCH ← [lab.lStar, SqRt [lab.aStar*lab.aStar+lab.bStar*lab.bStar], ArcTanDeg
    [lab.bStar, lab.aStar]];
IF (lch.h < 0) THEN lch.h ← lch.h + 360;
RETURN [lch]
END;   -- Cylindrical ValueStep: PROC [v: ValueAndChroma] RETURNS [Value] ~ BEGIN
    Decodes value out of valueAndChroma index.
    IF (v > chromata) THEN RETURN [v - chromata];
    IF (v < -chromata) THEN RETURN [v + chromata];
    RETURN [0]
    END;   -- ValueStep ChromaStep: PROC [c: ValueAndChroma] RETURNS [Value] ~ BEGIN
    Decodes chroma out of valueAndChroma index.
    IF (c < -chromata) OR (c > chromata) THEN RETURN [0];
    RETURN [c]
    END;   -- ChromaStep
```

Colorimetry

*The number of edges in the slices is much too high. This is to allow experimentation. In a production version the gamut need to be known only for the hues actually occurring in the palette, which is 12 instead of 40. The number of slices is critical and should not be reduced, as vivid light colors would be reported to fall outside the gamut.*

```
Pentagon: TYPE ~ ARRAY [1 .. 5] OF VEC;
Icosagon: TYPE ~ ARRAY [1 .. 20] OF VEC;
Eicosiena: TYPE ~ ARRAY [0 .. 20] OF VEC;
Sarantagon: TYPE ~ ARRAY [1 .. 40] OF VEC;
Segment: TYPE ~ RECORD [a, b: VEC];
gamut: ARRAY [1 .. 9] OF Pentagon;
gamut20: ARRAY [1 .. 9] OF Icosagon;
fineGamut: ARRAY [1 .. 19] OF Sarantagon;
meridian: ARRAY [1 .. 40] OF Eicosiena;

unknownValue: INT ~ -1;
valueCache: IntChainedHashTable.Table ← IntChainedHashTable.Create [unknownValue,
    149];
ValueExtrema: TYPE ~ REF ValueExtremaRep;
ValueExtremaRep: TYPE ~ RECORD [min, max: REAL ← unknownValue];

MaxChroma: PROC [color: LCH] RETURNS [REAL] ~ BEGIN
    Intersects a ray at angle = hue with the gamut slice for the specified lightness
    MaxDistance: PROC [p: VEC, h: Pentagon] RETURNS [q: VEC] ~ BEGIN
        q = p if p ⊆ h
        q = L(p, h.center) ∩ π(h) otherwise
        i: BOOL;          probe: Segment ~ [a: [0, 0], b: p];
```

```
FOR s: [1 .. 5] IN (1 .. 5] DO
    [i, q] ← Intersect [probe, [h[s-1], h[s]]];
    IF i THEN RETURN
ENDLOOP;
[i, q] ← Intersect [probe, [h[5], h[1]]];        IF NOT i THEN ERROR;
RETURN [q]
END;    -- MaxDistance
```

MaxDistance40: PROC [p: VEC, h: Sarantagon] RETURNS [q: VEC] ~ BEGIN
$q = p$ if $p \subseteq h$
$q = L(p, h.center) \cap \pi(h)$ otherwise
```
i: BOOL;         probe: Segment ~ [a: [0, 0], b: p];
FOR s: [1 .. 40] IN (1 .. 40] DO
    [i, q] ← Intersect [probe, [h[s-1], h[s]]];
    IF i THEN RETURN
ENDLOOP;
[i, q] ← Intersect [probe, [h[40], h[1]]];       IF NOT i THEN ERROR;
RETURN [q]
END;    -- MaxDistance40
```

SELECT precision FROM
   $high => BEGIN
      *Assume that the gamut is regularly sampled, i.e., there is a meridian every 40° and a circle of latitude every 5 jnd. Determine the patch in which the point lies, project it in a plane through 3 of the patch's vertices, and interpolate in this quadrilaterum. The quadrilaterum is not necessarely convex. Because of wrinkling, the quadrilaterum is not on a tangential plane.*

```
origin: VEC ~ [0, 0];       ray: Segment;
hi: REAL ~ color.h/9.0;     vi: REAL ~ color.lStar/5.0;
hue1: INTEGER ← Floor [hi];     hue2: INTEGER ← Ceiling [hi];
value1: INTEGER ~ Floor [vi];   value2: INTEGER ~ Ceiling [vi];
```
*Four corners and edges looking from the outside.*
```
sw, se, ne, nw, s, e, n, w, max: VEC;          s3, e3, n3, w3: VEC3;
ok, okS, okE, okN, okW: BOOL ← TRUE;
IF (hue1 = 0) THEN hue1 ← 40;   IF (hue2 = 41) THEN hue2 ← 1;
```
*Find the patch on the gamut containing the true value.*
```
IF (value1 = 0) THEN {sw ← se ← origin} ELSE
    {sw ← fineGamut[value1][hue1];  se ← fineGamut[value1][hue2]};
IF (value2 = 100) THEN {sw ← se ← origin} ELSE
    {ne ← fineGamut[value2][hue2];  nw ← fineGamut[value2][hue1]};
```
*Think of being in the tangential plane of the gamut in which the patch lies.*
*We intersect a ray of given hue angle with the northern and southern edges to find a north-south segment. Think of looking down from infinite lightness.*
```
ray ← [origin, [500*CosDeg[color.h], 500*SinDeg[color.h]]];
[okS, s] ← Intersect [ray, [sw, se]];
[okN, n] ← Intersect [ray, [nw, ne]];
```
*Now we do the same thing with the eastern and western edges and find the endpoints of the west-east segment. Think of looking to a cross-section of the gamut along the meridian of given hue.*
*First, change the coordinate system.*
```
sw.x ← SqRt [sw.x*sw.x+sw.y*sw.y];      sw.y ← Floor [color.lStar];
se.x ← SqRt [se.x*se.x+se.y*se.y];  se.y ← sw.y;
nw.x ← SqRt [nw.x*nw.x+nw.y*nw.y];      nw.y ← Ceiling [color.lStar];
```

```
        ne.x ← SqRt [ne.x*ne.x + ne.y*ne.y];        ne.y ← nw.y;
        ray ← [[0, color.lStar], [500, color.lStar]];
        [okE, e] ← Intersect [ray, [se, ne]];
        [okW, w] ← Intersect [ray, [sw, nw]];
        A consistency test.
        IF NOT (okS AND okN AND okE AND okW) THEN break;
      ; Now we can instersect the two segments (north-south and west-east) to find the
        maximum.
        To do this we have to project the rectangle on the tangential plane. We approximate
        the tangential plane by the plane passing through tree of the points: although in some
        cases this is completely bogus because the gamut surface is wrinkled.
        s3 ← [s.x, s.y, value1];    n3 ← [n.x, n.y, value2];
        w3 ← [w.x*CosDeg[hue1], w.x*SinDeg[hue1], w.y];
        e3 ← [e.x*CosDeg[hue2], e.x*SinDeg[hue2], e.y];
        s ← ...; n ← ...; w ← ...; e ← ...;
        [ok, max] ← Intersect [[s, n], [e, w]];
        IF NOT ok THEN break;
        RETURN [SqRt [max.x*max.x + max.y*max.y]]
        END;
    $medium => BEGIN
        Assume that the gamut is regularly sampled only in one direction, namely that there is
        a circle of latitude every 5 jnd but there are no meridians.
        ray: VEC ~ [500*CosDeg[color.h], 500*SinDeg[color.h]];
        latitude: INTEGER ~ MAX [MIN [Round [color.lStar/5.0], 19], 1];
        cartesian: VEC;
        cartesian ← IF published THEN MaxDistance [ray, gamut[latitude]] ELSE
                MaxDistance40 [ray, fineGamut[latitude]];
        RETURN [SqRt [cartesian.x*cartesian.x + cartesian.y*cartesian.y]]
        END;
    $low => BEGIN
        Assume that the gamut is regularly sampled, i.e., there is a meridian every 40° and a
        circle of latitude every 5 jnd. Find the closest coordinate in the sampled gamut.
        pos: VEC;
        latitude: INTEGER ~ MAX [MIN [Round [color.lStar/5.0], 19], 1];
        meridian: CARDINAL ← Round [color.h/9.0]; IF meridian = 0 THEN meridian ← 40;
        pos ← fineGamut[latitude][meridian];    RETURN [SqRt [pos.x*pos.x +
                pos.y*pos.y]]
        END;
    ENDCASE => ERROR;
    END; -- MaxChroma MaxLightness: PROC [color: LCH] RETURNS [REAL] ~ BEGIN
    Brute force approach. Lots of room for improvement.
    probe: LCH;     key: INT ~ Round [color.lStar] + 100 * Round [color.c];
    minMax: ValueExtrema ← NARROW [valueCache.Fetch[key].value];
    IF (minMax # NIL) AND (minMax.max # unknownValue) THEN RETURN [minMax.max];
    This procedure is usually called before the chroma is adjusted for the gamut.
    color.c ← MAX [MIN [color.c, MaxChroma [color] - 10], 0];    probe ← color;
    FOR l: [1 .. 19] DECREASING IN [1 .. 19] DO
        probe.lStar ← l * 5;
```

```
    IF (MaxChroma [probe] >= color.c) THEN BEGIN
        IF (minMax # NIL) THEN BEGIN
            minMax.max ← probe.lStar + 2.5;
            IF NOT valueCache.Replace [key, minMax] THEN ERROR
            END
        ELSE BEGIN
            minMax ← NEW [ValueExtremaRep];     minMax.max ← probe.lStar + 2.5;
            IF NOT valueCache.Insert [key, minMax] THEN ERROR
            END;
        RETURN [minMax.max]
        END
    ENDLOOP;
    break;   RETURN [color.lStar]
    END;   -- MaxLightness MinLightness: PROC [color: LCH] RETURNS [REAL] ~ BEGIN
    Brute force approach. Lots of room for improvement.
    probe: LCH;      key: INT ~ Round [color.lStar] + 100 * Round [color.c];
    minMax: ValueExtrema ← NARROW [valueCache.Fetch[key].value];
    IF (minMax # NIL) AND (minMax.min # unknownValue) THEN RETURN [minMax.min];
    This procedure is usually called before the chroma is adjusted for the gamut.
    color.c ← MAX [MIN [color.c, MaxChroma [color] - 10], 0];     probe ← color;
    FOR I: [1 .. 19] IN [1 .. 19] DO
        probe.lStar ← I * 5;
        IF (MaxChroma [probe] >= color.c) THEN BEGIN
            IF (minMax # NIL) THEN BEGIN
                minMax.min ← probe.lStar - 2.5;
                IF NOT valueCache.Replace [key, minMax] THEN ERROR
                END
            ELSE BEGIN
                minMax ← NEW [ValueExtremaRep];     minMax.min ← probe.lStar - 2.5;
                IF NOT valueCache.Insert [key, minMax] THEN ERROR
                END;
            RETURN [minMax.min]
            END
        ENDLOOP;
    break;   RETURN [color.lStar]
    END;   -- MinLightness ClipLightness: PUBLIC PROC [color: CIELAB] RETURNS [CIELAB] ~ BEGIN
    Clips a color by constraining only the lightness.
    clipped: CIELAB ← color;
    lch: LCH ← [color.lStar, SqRt [color.aStar*color.aStar+color.bStar*color.bStar], ArcTanDeg
            [color.bStar, color.aStar]];
    IF (lch.h < 0) THEN lch.h ← lch.h + 360;
    IF (lch.c < 0.5) THEN RETURN [color];
    clipped.lStar ← MAX [MIN [color.lStar, MaxLightness [lch]], MinLightness [lch]];
    RETURN [clipped]
    END;   -- ClipLightness
```

```
Intersect: PROC [s1, s2: Segment] RETURNS [incidence: BOOL, p: VEC ← [0, 0]] ~ BEGIN
    s1 is the probe, s1.a the center (white) and s1.b the cursor position.
    eps: REAL ~ 1.0/2112.0/2112.0;    -- (* = xmax↑-2 *) error in compiler
    a11, a12, a21, a22, v1, v2, det, cof1, cof2, alpha, beta: REAL;
    eps ← 1.0 / 2112.0 / 2112.0;      -- CONST
    incidence ← FALSE;
    a11 ← s1.b.x - s1.a.x;    a12 ← s2.a.x - s2.b.x;    v1 ← s1.a.x - s2.a.x;
    a21 ← s1.b.y - s1.a.y;    a22 ← s2.a.y - s2.b.y;    v2 ← s1.a.y - s2.a.y;
    cof1 ← a12 * v2 - a22 * v1;        cof2 ← a21 * v1 - a11 * v2;
    det ← a11 * a22 - a12 * a21;
    The pentagon is always convex ⇒ no degeneracies
    IF ABS [det] < eps THEN RETURN;
    alpha ← cof1 / det;        beta ← cof2 / det;
    incidence ← ((alpha>-eps) AND (alpha<=1.0+eps)) AND ((beta>=-eps) AND
            (beta<=1.0+eps));
    IF incidence THEN BEGIN
        p.x ← (1.0-alpha) * s1.a.x + alpha * s1.b.x;
        p.y ← (1.0-alpha) * s1.a.y + alpha * s1.b.y
        END
    END;    -- Intersect InitGamut: PROC ~ BEGIN
    Monitor. Eyeballed from Fig. 6b in Ph.K. Robertson, Visualizing Color Gamuts, IEEE
        Computer Graphics 8, 5.
    Coordinates are u* v*.
    gamut[1] ← [[32, 0], [39, 8], [-11, 12], [-4, -37], [0, -33]];
    FOR i: [1 .. 5] IN [1 .. 5] DO
        gamut[2][i].x ← 2 * gamut[1][i].x;    gamut[2][i].y ← 2 * gamut[1][i].y;
        gamut[3][i].x ← 3 * gamut[1][i].x;    gamut[3][i].y ← 3 * gamut[1][i].y;
        gamut[4][i].x ← 4 * gamut[1][i].x;    gamut[4][i].y ← 4 * gamut[1][i].y
        ENDLOOP;
    gamut[4][4].y ← gamut[4][5].y ← -132;        gamut[4][5].x ← 3;
    gamut[5] ← [[160, 0], [195, 48], [-52, 60], [-28, -122], [43, -125]];
    gamut[6] ← [[103, -95], [158, 52], [-64, 72], [-40, -100], [90, -108]];
    gamut[7] ← [[92, 0], [108, 69], [-75, 84], [-53, -74], [74, -81]];
    gamut[8] ← [[56, 0], [64, 82], [-85, 97], [-67, -46], [49, -54]];
    gamut[9] ← [[25, -28], [31, 98], [-62, 108], [-84, -20], [-79, -20]];
    Transform to a* b*.
    FOR i: [1 .. 9] IN [1 .. 9] DO
        FOR j: [1 .. 5] IN [1 .. 5] DO
            luv: ImagerColorES.CIELUV ~ [i*10, gamut[i][j].x, gamut[i][j].y];
            xyz: XYZ ~ ImagerColorES.XYZFromCIELUV [luv, [0,0,0]];
            lab: CIELAB ~ ImagerColorES.CIELABFromXYZ [xyz, [0,0,0]];
            gamut[i][j] ← [lab.aStar, lab.bStar]
            ENDLOOP
        ENDLOOP
    END;    -- InitGamut
```

InitGamut40: PROC ~ BEGIN
   *Try to find gamut of a SMPTE monitor. Needs more edges because it does not take into consideration the gamut shape.*
   lch: LCH;          rgb: ImagerColorES.RGB;          count: CARDINAL;
   a, b, m, min, max: REAL;
   Rgb: PROC ~ BEGIN
      rgb ← ImagerColorES.XeroxRGBFromXYZ [ImagerColorES.XYZFromCIELAB
         [[lch.lStar, lch.c * CosDeg [lch.h], lch.c * SinDeg [lch.h]], [0, 0, 0]]];
      min ← MIN [rgb.R, rgb.G, rgb.B];   max ← MAX [rgb.R, rgb.G, rgb.B]
   END;   -- Rgb
   FOR i: [1 .. 19] IN [1 .. 19] DO
      lch.lStar ← 5 * i;
      FOR j: [1 .. 40] IN [1 .. 40] DO
         *Estimate chroma.*
         lch.h ← 360.0 / 40.0 * j;   lch.c ← 60;         Rgb[];
         lch.c ← ImagerColorES.ABChroma [ImagerColorES.CIELABFromXYZ
               [ImagerColorES.XYZFromXeroxRGB [ImagerColorES.RGBFromHSV
               [ImagerColorES.HSVFromRGB [rgb]]], [0, 0, 0]]];
         a ← 0;   b ← 2 * lch.c;   m ← lch.c;   count ← 0;
         *Find max using binary search.*
         WHILE (ABS [b - a] > 0.01) DO
            IF (min < 0) OR (max > 1) THEN b ← m
            ELSE BEGIN
               IF (min > 0.0001) AND (max < 0.9999) THEN a ← m
               ELSE EXIT       -- 0 ≤ min ≤ 0.0001 V 0.9999 ≤ max ≤ 1
            END;
            m ← lch.c ← (a + b) / 2.0;       Rgb[];
            count ← count.SUCC;       IF (count > 1000) THEN break
         ENDLOOP;
         fineGamut[i][j] ← [lch.c * CosDeg [lch.h], lch.c * SinDeg [lch.h]]
      ENDLOOP
   ENDLOOP
   END;   -- InitGamut40

D65YxyToLab: PROC [Y, x, y: REAL, white: XYZ] RETURNS [LAB] ~ BEGIN
   RETURN [NEW [CIELAB ← ImagerColorES.CIELABFromXYZ
         [ImagerColorES.IlluminantChange [ImagerColorES.Tristimulus [[Y, x, y]],
         white]]]
   END;   -- D65YxyToLab

Algorithms

CenterColor: PROC [hue: REAL, ref: KeyColor] RETURNS [LCH] ~ BEGIN
   *The center color must be an invariant, otherwise the global operations depend on the previous state.*
   color: LCH;
   color.lStar ← ref.pivot + ((ref.lch.lStar-ref.pivot) * CosDeg [ref.lch.h - hue]);
   color.h ← hue;

*This is the main focus of research. How do we best choose the center colors?*
color.c ← SELECT centerChroma FROM
 $keyColor => ref.lch.c,
 $middle => MaxChroma [color] / 2.0,
 $compromise => MaxChroma [color] / 4.0 + ref.lch.c / 2.0,
 $exceptKey => IF (Round[hue] = Round[ref.lch.h]) THEN ref.lch.c
  ELSE MaxChroma [color] / 2.0,
 ENDCASE => ERROR;
RETURN [color]
END; -- *CenterColor*

LightnessForHue: PROC [step: Value, hue: LCH, ref: KeyColor] RETURNS [REAL] ~ BEGIN
 *Colors are on an inclinated plane.*
 value: REAL ← CenterColor [hue.h, ref].lStar;
 max: REAL ~ MaxLightness [hue]; min: REAL ~ MinLightness [hue];
 *Leave some room for the variants:*
 value ← MIN [MAX [value, min + 5.0], max - 5.0];
 SELECT step FROM
  < 0 => RETURN [value + step * (value - min) / (Float[values] + 1.0)];
  = 0 => RETURN [value];
  ENDCASE => RETURN [value + step * (max - value) / Float[values]]
 END; -- *LightnessForHue*

ChromaForHue: PROC [step: Chroma, hue: LCH, ref: KeyColor] RETURNS [REAL] ~ BEGIN
 *Vivid colors go to gamut boundary, dull colors 1/steps before gray.*
 chroma: REAL ← CenterColor [hue.h, ref].c;
 max: REAL ~ MaxChroma [hue];
 *Leave some room for the variants:*
 chroma ← MIN [MAX [chroma, 5.0], max - 5.0];
 SELECT step FROM
  < 0 => RETURN [chroma * (1.0 + Float [step] / Float [chromata + 1])];
  = 0 => RETURN [chroma];
  ENDCASE => RETURN [chroma + (Float [step] / Float [chromata]) * (max - chroma)]
 END; -- *ChromaForHue*

ChangeHue: PROC [color: LAB, amount: REAL, var: ValueAndChroma, ref: KeyColor]
  RETURNS [LAB] ~ BEGIN
 *Returns a newly allocated element. To make things symmetrical, first the center value must be
 computed (var = 0). ChromaForHue will refer to the center for the lightness and
 LightnessForHue will refer to the center for the chroma.*
 vs: ValueAndChroma ~ ValueStep [var];   cs: ValueAndChroma ~ ChromaStep [var];
 lch: LCH;   newHue: REAL;
 IF (color = NIL) THEN RETURN [NIL];
 newHue ← Cylindrical [color].h;   newHue ← newHue + amount;
 IF (newHue < 0) THEN newHue ← newHue + 360;
 IF (newHue > 360) THEN newHue ← newHue - 360;
 lch ← CenterColor [newHue, ref];
 IF (cs = 0) THEN
  {lch.c ← ChromaForHue [cs, lch, ref]; lch.lStar ← LightnessForHue [vs, lch, ref]}
 ELSE {lch.lStar ← LightnessForHue [vs, lch, ref];   lch.c ← ChromaForHue [cs, lch, ref]};
 RETURN [Cartesian [lch]]
 END; -- *ChangeHue*

VaryValue: PUBLIC PROC [p: Palette, v: IsoHueVariation] RETURNS [vv: IsoHueVariation] ~
    BEGIN
    *Chroma and hue are kept constant, while the lightness is changed. The scale is asymmetric*
    *Returns new element for undo.*
    lch: LCH;       reference: KeyColor;
    IF (p = NIL) OR (v[0] = NIL) THEN notInitialized;
    IF p.lock THEN break;    p.lock ← TRUE;
    reference ← KeyColorData [p.keyColor];   lch ← Cylindrical [v[0]];
    FOR i: ValueAndChroma IN [-(values+chromata) .. -chromata) DO
        vv[i] ← NEW [CIELAB];
        vv[i].lStar ← LightnessForHue [ValueStep [i], lch, reference];
        vv[i].aStar ← v[0].aStar;   vv[i].bStar ← v[0].bStar
        ENDLOOP;
    FOR i: ValueAndChroma IN [-chromata .. chromata] DO vv[i] ← v[i] ENDLOOP;
    FOR i: ValueAndChroma IN (chromata .. chromata+values] DO
        vv[i] ← NEW [CIELAB];
        vv[i].lStar ← LightnessForHue [ValueStep [i], lch, reference];
        vv[i].aStar ← v[0].aStar;   vv[i].bStar ← v[0].bStar
        ENDLOOP;
    p.lock ← FALSE
    END;   -- *VaryValue*

VaryChroma: PUBLIC PROC [p: Palette, v: IsoHueVariation] RETURNS [vv: IsoHueVariation] ~
    BEGIN
    *Value and hue are kept constant, while the chroma is changed.*
    *Returns new element for undo.*
    lch: LCH; reference: KeyColor;
    IF (p = NIL) OR (v[0] = NIL) THEN notInitialized;
    IF p.lock THEN break;    p.lock ← TRUE;
    reference ← KeyColorData [p.keyColor];
    FOR i: ValueAndChroma IN [-(values+chromata) .. -chromata) DO vv[i] ← v[i] ENDLOOP;
    FOR i: ValueAndChroma IN (chromata .. chromata+values] DO vv[i] ← v[i] ENDLOOP;
    vv[0] ← v[0];    lch ← Cylindrical [vv[0]];
    FOR i: ValueAndChroma IN [-chromata .. chromata] DO
        vv[i] ← Cartesian [[lch.lStar, ChromaForHue [ChromaStep [i], lch, reference], lch.h]]
        ENDLOOP;
    p.lock ← FALSE
    END;   -- *VaryChroma*

RotateNegative: PUBLIC PROC [p: Palette] RETURNS [pp: Palette] ~ BEGIN
    *The whole palette is rotated. Returns new element for undo.*
    increment: REAL;
    IF (p = NIL) THEN notInitialized;  IF p.lock THEN break;
    pp ← CopyPalette [p];    p.lock ← pp.lock ← TRUE;
    increment ← -hueStep / 2.0;
    FOR i: Hue IN Hue DO
        FOR j: ValueAndChroma IN ValueAndChroma DO
            pp.colors[i][j] ← ChangeHue [p.colors[i][j], increment, j, KeyColorData [p.keyColor]]
            ENDLOOP;
        ENDLOOP;
    p.lock ← pp.lock ← FALSE
    END;   -- *RotateNegative*

```
RotatePositive: PUBLIC PROC [p: Palette] RETURNS [pp: Palette] ~ BEGIN
    The whole palette is rotated. Returns new element for undo.
    increment: REAL;
    IF (p = NIL) THEN notInitialized; IF p.lock THEN break;
    pp ← CopyPalette [p];    p.lock ← pp.lock ← TRUE;
    increment ← hueStep / 2.0;
    FOR i: Hue IN Hue DO
        FOR j: ValueAndChroma IN ValueAndChroma DO
            pp.colors[i][j] ← ChangeHue [p.colors[i][j], increment, j, KeyColorData [p.keyColor]]
        ENDLOOP
    ENDLOOP;
    p.lock ← pp.lock ← FALSE
    END;   -- RotatePositive MakeAnaloguousHarmony: PUBLIC PROC [p: Palette] RETURNS [pp: Palette] ~ BEGIN
    Returns new element for undo.
    IF (p = NIL) THEN notInitialized; IF p.lock THEN break;
    pp ← CopyPalette [p];    p.lock ← pp.lock ← TRUE;
    FOR i: Hue IN analoguousHarmonies DO
        pp.colors[i][0] ← ChangeHue [pp.colors[centerHue][0], i*hueStep, 0, KeyColorData
            [p.keyColor]];
    ENDLOOP;
    p.lock ← pp.lock ← FALSE
    END;   -- MakeAnaloguousHarmony MakeDirectComplement: PUBLIC PROC [p: Palette] RETURNS [pp: Palette] ~ BEGIN
    Returns new element for undo.
    IF (p = NIL) THEN notInitialized; IF p.lock THEN break;
    pp ← CopyPalette [p];    p.lock ← pp.lock ← TRUE;
    pp.colors[directComplement][0] ← ChangeHue [pp.colors[centerHue][0], 180, 0,
            KeyColorData [p.keyColor]];
    p.lock ← pp.lock ← FALSE
    END;   -- MakeDirectComplement MakeTriadicComplements: PUBLIC PROC [p: Palette] RETURNS [pp: Palette] ~ BEGIN
    Returns new element for undo.
    IF (p = NIL) THEN notInitialized; IF p.lock THEN break;
    pp ← CopyPalette [p];    p.lock ← pp.lock ← TRUE;
    pp.colors[leftTriadicComplement][0] ← ChangeHue [pp.colors[centerHue][0], +120, 0,
            KeyColorData [p.keyColor]];
    pp.colors[rightTriadicComplement][0] ← ChangeHue [pp.colors[centerHue][0], -120, 0,
            KeyColorData [p.keyColor]];
    p.lock ← pp.lock ← FALSE
    END;   -- MakeTriadicComplements DeleteAnaloguousHarmony: PUBLIC PROC [p: Palette] RETURNS [pp: Palette] ~ BEGIN
    IF (p = NIL) THEN notInitialized; IF p.lock THEN break;
    pp ← CopyPalette [p];    p.lock ← pp.lock ← TRUE;
```

```
FOR i: Hue IN analoguousHarmonies DO
    IF (i = centerHue) THEN LOOP;
    FOR j: ValueAndChroma IN ValueAndChroma DO
        pp.colors[i][j] ← NIL
        ENDLOOP
    ENDLOOP;
p.lock ← pp.lock ← FALSE
END;    -- DeleteAnaloguousHarmony
```

```
DeleteDirectComplement: PUBLIC PROC [p: Palette] RETURNS [pp: Palette] ~ BEGIN
    IF (p = NIL) THEN notInitialized;   IF p.lock THEN break;
    pp ← CopyPalette [p];    p.lock ← pp.lock ← TRUE;
    FOR j: ValueAndChroma IN ValueAndChroma DO
        pp.colors[directComplement][j] ← NIL
        ENDLOOP;
    p.lock ← pp.lock ← FALSE
END;    -- DeleteDirectComplement
```

```
DeleteTriadicComplements: PUBLIC PROC [p: Palette] RETURNS [pp: Palette] ~ BEGIN
    IF (p = NIL) THEN notInitialized;   IF p.lock THEN break;
    pp ← CopyPalette [p];    p.lock ← pp.lock ← TRUE;
    FOR j: ValueAndChroma IN ValueAndChroma DO
        pp.colors[leftTriadicComplement][j] ← NIL
        ENDLOOP;
    FOR j: ValueAndChroma IN ValueAndChroma DO
        pp.colors[rightTriadicComplement][j] ← NIL
        ENDLOOP;
    p.lock ← pp.lock ← FALSE
END;    -- DeleteTriadicComplements
```

```
RestrictValue: PUBLIC PROC [p: Palette, v: IsoHueVariation] RETURNS [vv: IsoHueVariation] ~
        BEGIN
    IF (p = NIL) THEN notInitialized;   IF p.lock THEN break;    p.lock ← TRUE;
    FOR i: ValueAndChroma IN [-chromata .. chromata] DO
        IF (v[i] # NIL) THEN vv[i] ← NEW [CIELAB ← v[i]↑]
        ENDLOOP;
    p.lock ← FALSE
END;    -- RestrictValue
```

```
RestrictChroma: PUBLIC PROC [p: Palette, v: IsoHueVariation] RETURNS [vv: IsoHueVariation]
        ~ BEGIN
    IF (p = NIL) THEN notInitialized;   IF p.lock THEN break;    p.lock ← TRUE;
    vv[centerHue] ← NEW [CIELAB ← v[centerHue]↑];
    FOR i: ValueAndChroma IN [-(values+chromata) .. -chromata) DO
        IF (v[i] # NIL) THEN vv[i] ← NEW [CIELAB ← v[i]↑]
        ENDLOOP;
    FOR i: ValueAndChroma IN (chromata .. chromata+values] DO
        IF (v[i] # NIL) THEN vv[i] ← NEW [CIELAB ← v[i]↑]
        ENDLOOP;
    p.lock ← FALSE
END;    -- RestrictChroma
```

Key colors refWhite: XYZ ← ImagerColorES.Tristimulus [[0.0, 0.2425, 0.2515]];

InitKeyColorData: PROC ~ BEGIN
    *A default color and the Boynton basic colors.*
    entry: KeyColor ← NEW [KeyColorRep]; whiteY: REAL;
    white: XYZ ← [0, 0, 0];    -- *i.e., use value defined by standard*
    BEGIN OPEN entry:
        name ← $default;      lab ← NEW [CIELAB ← [90.07729, -11.92, 76.26]];
        lch ← Cylindrical [lab];   pivot ← 70
    END;
    IF NOT keyColorTable.Store [entry.name, entry] THEN break;

whiteY ← 8.27;  -- *Boynton's published luminance*
    whiteY ← 100.0;  -- *The perfect reflecting diffuser illuminated by ... $D_{65}$ yields the "white" object color stimulus with $Y_{10} = 100$ [W&S p. 513]* entry ← NEW [KeyColorRep];
    BEGIN OPEN entry;    -- *OSA -4 2 -8*    $Y_{10} = 9.49$
        name ← $red;   lab ← NEW [CIELAB];
        lab↑ ← ImagerColorES.CIELABFromXYZ [ImagerColorES.IlluminantChange
           [ImagerColorES.Tristimulus [[0.59/whiteY, 0.5132, 0.3159]]], refWhite];
        lab ← D65YxyToLab [9.72 / 75.76, 0.5341, 0.3191, white];
        lch ← Cylindrical [lab];   pivot ← 70
    END;
    IF NOT keyColorTable.Store [entry.name, entry] THEN break;

entry ← NEW [KeyColorRep];
    BEGIN OPEN entry;    -- *OSA -3 5 5*    $Y_{10} = 16.20$
        name ← $green;   lab ← NEW [CIELAB];
        lab↑ ← ImagerColorES.CIELABFromXYZ [ImagerColorES.IlluminantChange
           [ImagerColorES.Tristimulus [[1.63/whiteY, 0.3092, 0.5189]]], refWhite];
        lab ← D65YxyToLab [17.26 / 75.76, 0.2816, 0.5217, white];
        lch ← Cylindrical [lab];   pivot ← 70
    END;
    IF NOT keyColorTable.Store [entry.name, entry] THEN break;

entry ← NEW [KeyColorRep];
    BEGIN OPEN entry;    -- *OSA 4 12 0*    $Y_{10} = 64.45$
        name ← $yellow;  lab ← NEW [CIELAB];
        lab↑ ← ImagerColorES.CIELABFromXYZ [ImagerColorES.IlluminantChange
           [ImagerColorES.Tristimulus [[5.58/whiteY, 0.4584, 0.4788]]], refWhite];
        lab ← D65YxyToLab [67.72 / 75.76, 0.4423, 0.4962, white];
        lch ← Cylindrical [lab];   pivot ← 70
    END;
    IF NOT keyColorTable.Store [entry.name, entry] THEN break;

entry ← NEW [KeyColorRep];
    BEGIN OPEN entry;    -- *OSA -4 -4 4*    $Y_{10} = 10.13$
        name ← $blue;   lab ← NEW [CIELAB];
        lab↑ ← ImagerColorES.CIELABFromXYZ [ImagerColorES.IlluminantChange
           [ImagerColorES.Tristimulus [[0.59/whiteY, 0.1881, 0.2492]]], refWhite];

```
    lab ← D65YxyToLab [8.11 / 75.76, 0.1819, 0.1965, white];
    lch ← Cylindrical [lab];    pivot ← 70
    END;
IF NOT keyColorTable.Store [entry.name, entry] THEN break;

entry ← NEW [KeyColorRep];
BEGIN OPEN entry;      -- OSA 1 9 -7    Y_{10} = 31.66
    name ← $orange;        lab ← NEW [CIELAB];
    labt ← ImagerColorES.CIELABFromXYZ [ImagerColorES.IlluminantChange
       [ImagerColorES.Tristimulus [[1.85/whiteY, 0.5387, 0.4045]]], refWhite];
    lab ← D65YxyToLab [33.72 / 75.76, 0.5314, 0.4161, white];
    lch ← Cylindrical [lab];    pivot ← 70
    END;
IF NOT keyColorTable.Store [entry.name, entry] THEN break;

entry ← NEW [KeyColorRep];
BEGIN OPEN entry;      -- OSA -6 -4 -2   Y_{10} = 4.85
    name ← $purple;        lab ← NEW [CIELAB];
    labt ← ImagerColorES.CIELABFromXYZ [ImagerColorES.IlluminantChange
       [ImagerColorES.Tristimulus [[0.28/whiteY, 0.2656, 0.2044]]], refWhite];
    lab ← D65YxyToLab [4.43 / 75.76, 0.2999, 0.2032, white];
    lch ← Cylindrical [lab];    pivot ← 70
    END;
IF NOT keyColorTable.Store [entry.name, entry] THEN break;

entry ← NEW [KeyColorRep];
BEGIN OPEN entry;      -- OSA 3 -1 -5    Y_{10} = 48.76
    name ← $pink;    lab ← NEW [CIELAB];
    labt ← ImagerColorES.CIELABFromXYZ [ImagerColorES.IlluminantChange
       [ImagerColorES.Tristimulus [[3.49/whiteY, 0.3524, 0.3010]]], refWhite];
    lab ← D65YxyToLab [47.19 / 75.76, 0.3653, 0.3090, white];
    lch ← Cylindrical [lab];    pivot ← 70
    END;
IF NOT keyColorTable.Store [entry.name, entry] THEN break;

entry ← NEW [KeyColorRep];
BEGIN OPEN entry;      -- OSA -5 3 -3    Y_{10} = 8.08
    name ← $brown;    lab ← NEW [CIELAB];
    labt ← ImagerColorES.CIELABFromXYZ [ImagerColorES.IlluminantChange
       [ImagerColorES.Tristimulus [[0.54/whiteY, 0.4604, 0.3791]]], refWhite];
    lab ← D65YxyToLab [8.42 / 75.76, 0.4749, 0.3982, white];
    lch ← Cylindrical [lab];    pivot ← 70
    END;
IF NOT keyColorTable.Store [entry.name, entry] THEN break;

entry ← NEW [KeyColorRep];
BEGIN OPEN entry;      -- PMS 285
    name ← $xerox;    lab ← NEW [CIELAB];
    labt ← ImagerColorES.CIELABFromXYZ [ImagerColorES.IlluminantChange
           [ImagerColorES.Tristimulus [[12.11/78.13, 0.1981, 0.2045]]], refWhite];
    lch ← Cylindrical [lab];    pivot ← 70
    END;
IF NOT keyColorTable.Store [entry.name, entry] THEN break;
```

```
entry ← NEW [KeyColorRep];
BEGIN OPEN entry:          -- PMS 285 kept at D_65
    name ← $xerox65;       lab ← NEW [CIELAB];
    lab↑ ← ImagerColorES.CIELABFromXYZ [ImagerColorES.Tristimulus [[12.11/78.13,
            0.1981, 0.2045]], refWhite];
    lch ← Cylindrical [lab];    pivot ← 70
    END;
IF NOT keyColorTable.Store [entry.name, entry] THEN break
END;    -- InitKeyColorData KeyColorData: PROC [keyColor: ATOM] RETURNS [KeyColor] ~ BEGIN
    Breaks if key is invalid
    data: KeyColor ← NARROW [keyColorTable.Fetch[keyColor].val];
    IF (data = NIL) THEN break;    RETURN [data]
    END;    -- KeyColorData ValidKeyColor: PUBLIC PROC [keyColor: ATOM] RETURNS [BOOL] ~ BEGIN
    RETURN [keyColorTable.Fetch[keyColor].found]
    END;    -- ValidKeyColor
```

Main body

```
InitKeyColorData [];
IF published THEN InitGamut [] ELSE InitGamut40

END.    -- ProtoPaletteImpl
```

*User interface for both ProtoPalette and DigitalPalette. MetaPalette still to be merged.*

```
DIRECTORY
    Rope USING [ROPE],
    ViewerClasses USING [Column, Viewer];

ProtopaletteCommander: CEDAR DEFINITIONS ~ BEGIN

Viewer: TYPE ~ ViewerClasses.Viewer;
Column: TYPE ~ ViewerClasses.Column;    -- {static, left, right, color}
```

Main Interface

```
CreateViewer: PROC [name: Rope.ROPE, keyColor: ATOM, column: Column ← color] RETURNS
        [viewer: Viewer];
    Initializes a viewer. The state information is in the data field of the viewer. If the key color is
    empty then a digital palette is assumed, otherwise a proto-palette.

PutClientData: PROC [viewer: Viewer, type: ATOM, val: REF ← NIL];
    Allows one to add client data to the palette associated to a particular viewer.

GetClientData: PROC [viewer: Viewer, type: ATOM] RETURNS [REF]

END.    -- ProtopaletteCommander
```

*ProtopaletteCommanderImpl.mesa*
*Copyright ⓒ 1989 by Xerox Corporation. All rights reserved.*

*User interface.*

DIRECTORY
    Atom USING [EmptyAtom, MakeAtom, GetPName],
    ColorTool USING [GetRGBValue, NoColorToolViewer, SetRGBValue],
    Commander USING [CommandProc, Register],
    CommandTool USING [NextArgument],
    Convert USING [Error, RealFromRope],
    FinchSynthesizer USING [NB, SpeakText],
    FS USING [ComponentPositions, Error, ExpandName],
    FSExtras USING [GetWDir],
    Icons USING [NewIconFromFile],
    Imager USING [ClipRectangle, Context, DoSave, Font, MakeGray, MaskRectangleI,
        MaskRectangle, MaskFillTrajectory, Rectangle, ScaleT, SetColor, SetFont,
        SetPriorityImportant, SetStrokeEnd, SetStrokeJoint, SetStrokeWidth, SetXY,
        ShowRope, TranslateT, VEC],
    ImagerBackdoor USING [GetBounds],
    ImagerColorES USING [CIELABArgs, CIELABFromXYZ, Color, ColorOperator, ColorRep,
        ConstantColor, FindColor, NewColorOperatorCIELAB, OpConstantColor, RGB,
        RGBFromColor, XeroxRGBFromXYZ, XYZFromCIELAB,
        XYZFromXeroxRGB],
    ImagerColorFns USING [HSLFromRGB],
    ImagerColorMap USING [ApplyGamma, ApplyGammaInverse, GetGamma, NotifierRep,
        Register, UnRegister],
    ImagerDitherContext USING [MakeSpecialColor],
    ImagerFont USING [Find, Font, Scale, Substitution],
    ImagerInterpress USING [Close, Create, DeclareColorOperator, DeclareFont, DoPage, Ref],
    ImagerPath USING [LineTo, MoveTo, Trajectory],
    ImagerTransformation USING [Transformation],
    IO USING [DEL, ESC, int, NUL, PutFR, PutFR1, real, rope, STREAM],
    Menus USING [AppendMenuEntry, ClickProc, CopyEntry, CreateEntry, CreateMenu, Menu,
        MenuEntry],
    MessageWindow USING [Append, Blink, Clear],
    NamedColors USING [HSLToRope],
    PaletteIO USING [CL, DatabaseInfo, Error, ErrorDesc, ListDirectory, MarkEdited, PaletteInfo,
        ReadColorList, ReadProtoPalette, WriteColorList, WriteProtoPalette,
        UnmarkEdited],
    Process USING [CheckForAbort, Detach],
    Properties USING [GetProp, PropList, PutProp],
    ProtoPalette USING [analoguousHarmonies, Cartesian, centerHue, chromata, CIELAB,
        CopyPalette, CreatePalette, Cylindrical, DeleteAnaloguousHarmony,
        DeleteDirectComplement, DeleteTriadicComplements, directComplement,
        Harmony, Hue, IsoHueVariation, LAB, LCH, leftTriadicComplement,
        MakeAnaloguousHarmony, MakeDirectComplement, MakeTriadicComplements,
        Palette, RestrictChroma, RestrictValue, rightTriadicComplement, RotateNegative, RotatePositive, ValidKeyColor, ValueAndChroma, values, VaryChroma, VaryValue],
ProtopaletteCommander,
Real USING [Fix, Float, Round],
Rope USING [Cat, Concat, Equal, FromProc, IsEmpty, ROPE, Substr],
RopeFile USING [Create],
RuntimeError USING [UnboundProcedure],
Terminal USING [BitmapState, ChannelValue, ColorCursorPresentation, ColorMode, ColorValue, Current, GetColorBitmapState, GetColor, GetColorMode, SetColor, SetColorCursorPresentation, Virtual],
TypeScript USING [BackSpace, ChangeLooks, CharsAvailable, Create, Destroy, Destroyed, GetChar, PutChar, PutRope, Reset, TypeIn],
TIPUser USING [InstantiateNewTIPTable, TIPScreenCoords],
ViewerClasses USING [DestroyProc, HScrollProc, MenuLine, NotifyProc, PaintHint, PaintProc, SaveProc, ScrollProc, Viewer, ViewerClass, ViewerClassRec, ViewerFlavor, ViewerRec],
ViewerForkers USING [ForkPaint],
ViewerOps USING [BlinkViewer, CreateViewer, EnumProc, EnumerateViewers, EstablishViewerPosition, OpenIcon, PaintViewer, RegisterViewerClass, SaveViewer, SetNewVersion],
WindowManager USING [colorDisplayOn];

ProtopaletteCommanderImpl: CEDAR PROGRAM

IMPORTS Atom, ColorTool, Commander, CommandTool, Convert, FinchSynthesizer, FS, FSExtras, Icons, Imager, ImagerBackdoor, ImagerColorES, ImagerColorFns, ImagerColorMap, ImagerDitherContext, ImagerFont, ImagerInterpress, ImagerPath, IO, Menus, MessageWindow, NamedColors, PaletteIO, ProtoPalette, Process, Properties, Real, Rope, RopeFile, RuntimeError, Terminal, TypeScript, TIPUser, ViewerForkers, ViewerOps, WindowManager EXPORTS ProtopaletteCommander ~ BEGIN OPEN ProtopaletteCommander, Real;

Imported types and variables analoguousHarmonies: TYPE ~ ProtoPalette.analoguousHarmonies;
chromata: INTEGER ~ ProtoPalette.chromata;
CIELAB: TYPE ~ ProtoPalette.CIELAB;  -- *RECORD [lStar, aStar, bStar: REAL]:*
CL: TYPE ~ PaletteIO.CL; -- *LIST OF LAB, Color List*
Color: TYPE ~ ImagerColorES.Color;
ColorRep: TYPE ~ ImagerColorES.ColorRep;
Context: TYPE ~ Imager.Context;
directComplement: INTEGER ~ ProtoPalette.directComplement;
Font: TYPE ~ ImagerFont.Font;
Harmony: TYPE ~ ProtoPalette.Harmony;
Hue: TYPE ~ ProtoPalette.Hue;  *~ [-3 .. 4]:*
IsoHueVariation: TYPE ~ ProtoPalette.IsoHueVariation;

LAB: TYPE ~ ProtoPalette.LAB;       -- REF CIELAB ← NIL;
LCH: TYPE ~ ProtoPalette.LCH;       -- RECORD [lStar, c, h: REAL];
leftTriadicComplement: INTEGER ~ ProtoPalette.leftTriadicComplement;
centerHue: INTEGER ~ ProtoPalette.centerHue;
MenuEntry: TYPE ~ Menus.MenuEntry;
Palette: TYPE ~ ProtoPalette.Palette;
OpConstantColor: TYPE ~ ImagerColorES.OpConstantColor;
Rectangle: TYPE ~ Imager.Rectangle;    -- RECORD [x, y, w, h: REAL]
rightTriadicComplement: INTEGER ~ ProtoPalette.rightTriadicComplement;
RGB: TYPE ~ ImagerColorES.RGB;
ROPE: TYPE ~ Rope.ROPE;
STREAM: TYPE ~ IO.STREAM;
Trajectory: TYPE ~ ImagerPath.Trajectory;
Transformation: TYPE ~ ImagerTransformation.Transformation;
ValueAndChroma: TYPE ~ ProtoPalette.ValueAndChroma;
values: INTEGER ~ ProtoPalette.values;
VEC: TYPE ~ Imager.VEC;

Local types and variables fieldWidth: REAL ← 155.3452;       emptyAtom: ATOM ~ Atom.EmptyAtom[];
regularFace: Font ← ImagerFont.Find ["Xerox/PressFonts/Modern-MRR",
        substituteQuietly];
boldFace: Font ← ImagerFont.Find ["Xerox/PressFonts/Modern-BRR", substituteQuietly];
italicFace: Font ← ImagerFont.Find ["Xerox/PressFonts/Modern-MIR", substituteQuietly];

historySize: CARDINAL ~ 50;
History: TYPE ~ RECORD [index: CARDINAL, entry: ARRAY [0 .. historySize) OF Palette];
Wash: TYPE ~ REF WashRep;       washItems: INTEGER ~ 100;
WashRep: TYPE ~ ARRAY [0 .. washItems) OF LAB;
SelectionProto: TYPE ~ REF SelectionProtoRep ← NIL;     -- NIL means no selection
SelectionProtoRep: TYPE ~ RECORD [hue: Hue, variant: ValueAndChroma];
ChangeListProto: TYPE ~ LIST OF Hue;
SelectionDigital: TYPE ~ REF SelectionDigitalRep ← NIL;    -- NIL means no selection
SelectionDigitalRep: TYPE ~ RECORD [ch: ChannelValue, left, middle, right: LAB ← NIL];
ProtoPaletteData: TYPE ~ REF ProtoPaletteDataRep;
ProtoPaletteDataRep: TYPE ~ RECORD [palette: Palette, selection: SelectionProto];
DigitalPaletteData: TYPE ~ REF DigitalPaletteDataRep;
DigitalPaletteDataRep: TYPE ~ RECORD [palette: CL, wash: Wash ← NIL, washCache: ARRAY [0
        .. washItems) OF Color, selection: SelectionDigital ← NIL, power: CARDINAL ← 0];

State: TYPE ~ REF StateRec;
StateRec: TYPE ~ RECORD [
        paletteAndSel: REF ANY,  -- either ProtoPaletteData or DigitalPaletteData
        name, comment: ROPE,
        history: History, historyViewer: Viewer, lastInput: ROPE ← NIL,
        colors: ColorCache, subMap: ChannelValue,
        boundingBox, window: Rectangle,
        translation, titlePosition: VEC,   -- initialization imporant for caches
        scale, titleSize: REAL,

```
            bottomSB, rightSB: INTEGER ← 100,      -- caches: initialization important
            topSB, leftSB: INTEGER ← 0,            -- caches: initialization important
            resetPainting: BOOL ← TRUE,            -- initialization important for caches
            background: Color ← gray,
            abort: REF BOOL,
            verbose: BOOL ← FALSE,
            menuLine: MenuEntry,
            clientData: Properties.PropList ← NIL];
allStates: LIST OF State ← NIL;      stateCount: CARDINAL ← 0;
lastSelection: RECORD [r, g, b: ColorValue] ← [0, 0, 0];

break: SIGNAL ~ CODE;                 -- for debugging
trace: BOOL ← FALSE;       speak: BOOL ← FALSE;
lastViewer: Viewer;
lastWDir: ROPE ← NIL;      -- FSExtras.GetWDir does not always work Proto: PROC [state: State] RETURNS [ProtoPaletteData] ~ INLINE BEGIN
    RETURN [NARROW [state.paletteAndSel. ProtoPaletteData]]
    END;   -- Proto Digi: PROC [state: State] RETURNS [DigitalPaletteData] ~ INLINE BEGIN
    RETURN [NARROW [state.paletteAndSel. DigitalPaletteData]]
    END;   -- Digi
```

Interfaces.

```
CreateViewer: PUBLIC PROC [name: ROPE, keyColor: ATOM, column: Column ← color]
        RETURNS [viewer: Viewer] ~ BEGIN
    Initializes a viewer. The state information is in the data field of the viewer. If the key color is
    empty then a digital palette is assumed, otherwise a proto-palette.
    state: State ~ NEW [StateRec];

FindNamedViewer: ViewerOps.EnumProc ~ BEGIN
        IF (v.class.flavor = wheel) OR (v.class.flavor = list) THEN BEGIN
            state: State ← NARROW [v.data];
            IF state.name.Equal [name] THEN BEGIN
                IF v.iconic THEN ViewerOps.OpenIcon [v];  ViewerOps.BlinkViewer [v];
                viewer ← v;    RETURN [FALSE]
                END
            END
        END;    -- FindNamedViewer FOR s: LIST OF State ← allStates, s.rest WHILE s # NIL DO
        IF (s.first # NIL) AND name.Equal [s.first.name] THEN
            {ViewerOps.EnumerateViewers [FindNamedViewer];        RETURN}
        ENDLOOP;

BEGIN OPEN state;
        subMap ← NewSubMap [];       abort ← NEW [BOOL ← FALSE];
        scale ← 1.0;      titleSize ← 10;
        IF (keyColor = emptyAtom) THEN BEGIN
```

```
            boundingBox ← [x: -5.0, y: -65.0, w: 105.0, h: 95.0];
            window ← [x: 0.0, y: -60.0, w: 90.0, h: 90.0];
            translation ← [x: 0.0, y: -50.0];    titlePosition ← [x: 20.0, y: 40.0]
            END
        ELSE BEGIN
            boundingBox ← [x: -115.0, y: -115.0, w: 230.0, h: 230.0];
            window ← [x: -110.0, y: -110.0, w: 220.0, h: 255.0];
            translation ← [x: 80.0, y: 110.0];   titlePosition ← [x: 20.0, y: 240.0]
            END
        END;
    state.name ← name;

allStates ← CONS [state, allStates]; stateCount ← stateCount.SUCC;
    viewer ← InitializeViewer [column, state, keyColor]
    END;    -- CreateViewer PutClientData: PUBLIC PROC [viewer: Viewer, type: ATOM, val: REF ← NIL] ~ BEGIN
    Allows one to add client data to the palette associated to a particular viewer.
    state: State ~ NARROW [viewer.data];
    state.clientData ← state.clientData.PutProp [type, val]
    END;    -- PutClientData GetClientData: PUBLIC PROC [viewer: Viewer, type: ATOM] RETURNS [REF] ~ BEGIN
    state: State ~ NARROW [viewer.data];
    RETURN [state.clientData.GetProp [type]]
    END;    -- GetClientData
```

Color Map & Global State

```
ColorValue: TYPE ~ Terminal.ColorValue;    -- [0..256)
ChannelValue: TYPE ~ Terminal.ChannelValue;    -- [0..256)
transferChannel: ChannelValue ~ 128;
hueOffset: INTEGER ~ Hue.FIRST; lastHue: INTEGER ~ Hue.LAST;
vacOffset: INTEGER ~ ValueAndChroma.FIRST;    lastVac: INTEGER ~
        ValueAndChroma.LAST;
hues: INTEGER ~ lastHue - hueOffset + 1; vacs: INTEGER ~ lastVac - vacOffset + 1;
nrEntries: INTEGER ~ hues * vacs;
SubMap: TYPE ~ RECORD [free: BOOL, firstEntry: ChannelValue];
subMaps: ChannelValue ~ 2;    subMapNIL: ChannelValue ~ 0;
subMap: ARRAY [0 .. subMaps] OF SubMap;
ColorCache: TYPE ~ ARRAY [0 .. nrEntries] OF Color ← ALL [NIL];
colorMapNotifier: ImagerColorMap.NotifierRep;

InitSubMaps: PROC ~ BEGIN
    To my knowledge, the reserved entries are 0 .. 62: Imager, 128: ColorTool 63 .. 192:
    ColorGlue.
    gr: ImagerColorES.ConstantColor ~ Imager.MakeGray [0.7]; -- as in the OSA Color
        System
    subMap[0] ← [FALSE, 0];    -- no color map
    subMap[1] ← [TRUE, transferChannel + 1]; -- 129 .. 201
```

```
subMap[2] ← [TRUE, transferChannel - 1 - nrEntries];        -- 55 - 127
constantGray ← gr;      grayCh ← 202;
gray ← ImagerDitherContext.MakeSpecialColor [ordinaryColor: gr, specialPixel: [grayCh,
        null], name: "gray"];
IF Is8bit [] THEN SetColorMapEntry [grayCh, gray];
colorMapNotifier ← [NoteDisplayChangedTo8Bit, NIL]
END;    -- InitSubMaps NewSubMap: PROC RETURNS [map: ChannelValue] ~ BEGIN
    FOR i: [1 .. subMaps] IN [1 .. subMaps] DO
        IF subMap[i].free THEN {subMap[i].free ← FALSE; RETURN [i]}
    ENDLOOP;
    RETURN [subMapNIL]
    END;    -- NewSubMap DisposeSubMap: PROC [map: ChannelValue] ~ BEGIN
    IF (map # subMapNIL) THEN subMap[map].free ← TRUE;
    END;    -- DisposeSubMap ColorMapIndex: PROC [firstEntry: ChannelValue, i: Hue, j: ValueAndChroma] RETURNS
        [ChannelValue] ~ BEGIN
    Computes a color map index ( = channel value) for a given color in the palette.
    RETURN [firstEntry + ((i - hueOffset) * vacs) + (j - vacOffset)]
    END;    -- ColorMapIndex UnstructuredColorMapIndex: PROC [firstEntry: ChannelValue, i: CARDINAL] RETURNS
        [ChannelValue] ~ BEGIN
    Computes a color map index ( = channel value) for the i-th one-relative color in the color list.
    RETURN [firstEntry + i - 1]
    END;    -- UnstructuredColorMapIndex Is8bit: PROC RETURNS [BOOL] ~ BEGIN
    Returns true if the terminal is in 8 bit mode.
    t: Terminal.Virtual ~ Terminal.Current[];
    mode: Terminal.ColorMode ~ Terminal.GetColorMode [t];
    RETURN [(Terminal.GetColorBitmapState[t] # none) AND (NOT mode.full) AND
        (mode.bitsPerPixelChannelA = 8)]
    END;    -- Is8bit MakeColor: PROC [firstEntry: ChannelValue, lab: LAB, i: Hue, j: ValueAndChroma] RETURNS
        [Color] ~ BEGIN
    If the terminal is in 8 bit mode it returns a special color pointing to the appropriate color map
    entry, otherwise it returns a constant color.
    RETURN [ImagerDitherContext.MakeSpecialColor [ordinaryColor: ColorFromLAB [lab],
        specialPixel: [ColorMapIndex [firstEntry, i, j], null], name: "ProtoPalette"]]
    END;    -- MakeColor MakeUnstructuredColor: PROC [firstEntry: ChannelValue, lab: LAB, i: CARDINAL] RETURNS
        [Color] ~ BEGIN
    If the terminal is in 8 bit mode it returns a special color pointing to the appropriate color map
```

*entry, otherwise it returns a constant color.*
RETURN [ImagerDitherContext.MakeSpecialColor [ordinaryColor: ColorFromLAB [lab],
    specialPixel: [UnstructuredColorMapIndex [firstEntry, i], null], name:
    "DigiPalette"]]
END; -- *MakeUnstructuredColor*

SetColorMapEntry: PROC [ch: ChannelValue, color: Color] ~ BEGIN
    *Assume terminal is in 8 bit mode.*
    t: Terminal.Virtual ~ Terminal.Current[];
    rgb: RGB ~ ImagerColorES.RGBFromColor [color];
    gamma: REAL ~ ImagerColorMap.GetGamma [Terminal.Current[]];
    Terminal.SetColor [vt: t, aChannelValue: ch, bChannelValue: 0,
        red: ImagerColorMap.ApplyGamma [rgb.R, gamma],
        green: ImagerColorMap.ApplyGamma [rgb.G, gamma],
        blue: ImagerColorMap.ApplyGamma [rgb.B, gamma]]
END; -- *SetColorMapEntry*

NoteNewColor: PROC [state: State, i: Hue, j: ValueAndChroma] ~ BEGIN
    *Updates the color cache and if there is one, the color map.*
    color: LAB ~ Proto[state].palette.colors[i][j];
    IF (color = NIL) THEN state.colors[ColorMapIndex[0, i, j]] ← NIL
    ELSE BEGIN
        first: ChannelValue ~ subMap[state.subMap].firstEntry;
        state.colors[ColorMapIndex [0, i, j]] ← MakeColor [first, color, i, j];
        IF Is8bit [] THEN
            SetColorMapEntry [ColorMapIndex [first, i, j], state.colors[ColorMapIndex [0, i, j]]]
        END
END; -- *NoteNewColor*

NoteNewUnstructuredColor: PROC [state: State, color: LAB, i: CARDINAL] ~ BEGIN
    *Updates the color cache and if there is one, the color map.*
    IF (i > nrEntries) THEN ERROR;    -- *too many colors*
    IF (color = NIL) THEN state.colors[UnstructuredColorMapIndex[0, i]] ← NIL
    ELSE BEGIN
        first: ChannelValue ~ subMap[state.subMap].firstEntry;
        state.colors[UnstructuredColorMapIndex[0, i]] ← MakeUnstructuredColor [first, color,
            i];
        IF Is8bit [] THEN
            SetColorMapEntry [UnstructuredColorMapIndex [first, i],
                state.colors[UnstructuredColorMapIndex [0, i]]]
        END
END; -- *NoteNewUnstructuredColor*

NoteDisplayChangedTo8Bit: PUBLIC PROC [data: REF] ~ BEGIN
    *If the display is changed from full color to 8 bit color, the color map must be set.*
    IF (NOT Is8bit []) THEN RETURN;
    SetColorMapEntry [grayCh, gray];
    FOR sl: LIST OF State ← allStates, sl.rest WHILE sl # NIL DO
        IF (sl.first.subMap = subMapNIL) THEN LOOP;
        FOR i: ChannelValue IN [1 .. nrEntries] DO

```
        IF (sl.firstcolors[i] = NIL) THEN LOOP;
        SetColorMapEntry [subMap[sl.firstsubMap].firstEntry + i, sl.firstcolors[i]]
        ENDLOOP
    ENDLOOP
END;    -- NoteDisplayChangedTo8Bit
```

```
TransferSelectedColor: PROC [state: State, rgb: RGB] ~ BEGIN
    puts selected color in transfer channel for color tool
    t: Terminal.Virtual ~ Terminal.Current[];
    gamma: REAL ~ ImagerColorMap.GetGamma [t];
    ColorTool.SetRGBValue [[rgb.R, rgb.G, rgb.B] ! RuntimeError.UnboundProcedure =>
            CONTINUE; ColorTool.NoColorToolViewer => CONTINUE];
    IF Is8bit [] THEN BEGIN
        r, g, b: ColorValue ← 0;  ch: ChannelValue;        selection: BOOL;
        WITH state.paletteAndSel SELECT FROM
            proto: ProtoPaletteData => BEGIN
                selection ← proto.selection # NIL;
                IF selection THEN ch ← ColorMapIndex [state.subMap, proto.selection.hue,
                        proto.selection.variant]
                END;
            digi: DigitalPaletteData => BEGIN
                selection ← (digi.selection # NIL) AND (digi.selection.middle # NIL);
                IF selection THEN ch ← UnstructuredColorMapIndex [state.subMap,
                        digi.selection.ch]
                END;
            ENDCASE => ERROR;
        IF selection THEN [r, g, b] ← Terminal.GetColor [t, ch, 0];
        lastSelection ← [r, g, b];   Terminal.SetColor [t, transferChannel, 0, r, g, b]
        END
    ELSE lastSelection ← [ImagerColorMap.ApplyGamma [rgb.R, gamma],
            ImagerColorMap.ApplyGamma [rgb.G, gamma],
            ImagerColorMap.ApplyGamma [rgb.B, gamma]]
    END;    -- TransferSelectedColor
```

```
GetLastSelection: PROC RETURNS [LAB] ~ BEGIN
    gamma: REAL ~ ImagerColorMap.GetGamma [Terminal.Current[]];
    r, g, b: ColorValue;      rgb: RGB;          badLuck: BOOL ← FALSE;
    [[rgb.R, rgb.G, rgb.B]] ← ColorTool.GetRGBValue [! RuntimeError.UnboundProcedure,
            ColorTool.NoColorToolViewer => {badLuck ← TRUE; CONTINUE}];
    IF badLuck THEN BEGIN
        IF Is8bit [] THEN [r, g, b] ← Terminal.GetColor [Terminal.Current[], transferChannel, 0]
        ELSE [r, g, b] ← lastSelection;
        rgb.R ← ImagerColorMap.ApplyGammaInverse [r, gamma];
        rgb.G ← ImagerColorMap.ApplyGammaInverse [g, gamma];
        rgb.B ← ImagerColorMap.ApplyGammaInverse [b, gamma]
        END;
    RETURN [NEW [CIELAB ← ImagerColorES.CIELABFromXYZ
            [ImagerColorES.XYZFromXeroxRGB [rgb], [0,0,0]]]]
    END;    -- GetLastSelection
```

Colours and Palettes

```
black: Color ~ ImagerColorES.FindColor ["Xerox/Solid/Black"];
white: Color ~ ImagerColorES.FindColor ["Xerox/Solid/White"];
gray, constantGray: Color;       grayCh: ChannelValue;
cyan: Color ~ ImagerColorES.FindColor ["Xerox/Solid/Cyan"];
magenta: Color ~ ImagerColorES.FindColor ["Xerox/Solid/Magenta"];
yellow: Color ~ ImagerColorES.FindColor ["Xerox/Solid/Yellow"];
red: Color ~ ImagerColorES.FindColor ["Xerox/Solid/Red"];
green: Color ~ ImagerColorES.FindColor ["Xerox/Solid/Green"];
blue: Color ~ ImagerColorES.FindColor ["Xerox/Solid/Blue"];
labLinear: ImagerColorES.ColorOperator ~ ImagerColorES.NewColorOperatorCIELAB
        [NIL];

ColorFromLAB: PROC [lab: LAB] RETURNS [OpConstantColor] ~ BEGIN
    args: ImagerColorES.CIELABArgs;
    l: REAL ~ MAX [MIN [lab.lStar, 100], 0];
    a: REAL ~ MAX [MIN [lab.aStar, 500], -500];
    b: REAL ~ MAX [MIN [lab.bStar, 200], -200];
    color: OpConstantColor ~ NEW [ColorRep.constantop[3]];
    color.colorOperator ← labLinear;
    args ← NARROW [color.colorOperator.data, ImagerColorES.CIELABArgs];
    color.pixel[0] ← Round [args.sblack + (args.swhite-args.sblack) * l / 100.0];
    color.pixel[1] ← Round [args.sneutral + args.srange * a];
    color.pixel[2] ← Round [args.sneutral + args.srange * b];
    RETURN [color]
    END;    -- ColorFromLAB ToRGB: PROC [color: LAB] RETURNS [RGB] ~ BEGIN
    rgb: RGB;
    IF (color = NIL) THEN RETURN [[0, 0, 0]];
    rgb ← ImagerColorES.XeroxRGBFromXYZ
            [ImagerColorES.XYZFromCIELAB[color↑,[0,0,0]]];
    rgb ← [MAX [MIN [rgb.R, 1], 0], MAX [MIN [rgb.G, 1], 0], MAX [MIN [rgb.B, 1], 0]];
    RETURN [rgb]
    END;    -- ToRGB ColorName: PROC [color: LAB] RETURNS [ROPE] ~ BEGIN
    Insulates the naming procedure, which might change in the near future.
    rgb: RGB ~ ToRGB [color];
    IF (color = NIL) THEN RETURN [NIL];
    RETURN [NamedColors.HSLToRope [ImagerColorFns.HSLFromRGB [[rgb.R, rgb.G,
            rgb.B]]]]
    END;    -- ColorName LoadPalette: PROC [state: State, keyColor: ATOM] ~ BEGIN
    Tries to load from the database; if not successful, creates a new palette.
    errorDesc: PaletteIO.ErrorDesc;
    BEGIN
        ENABLE {PaletteIO.Error => {errorDesc ← error; GOTO fileError}};
```

```
IF (keyColor = emptyAtom) THEN BEGIN
    state.paletteAndSel ← NEW [DigitalPaletteDataRep];
    Digi[state].palette ← PaletteIO.ReadColorList [state.name];
    IF (Digi[state].palette = NIL) THEN BEGIN
        PutHistoryLine [state, "Could not find palette. Creating empty palette."];
        Digi[state].palette ← NIL; state.comment ← NIL
    END
END
ELSE BEGIN
    state.paletteAndSel ← NEW [ProtoPaletteDataRep];
    Proto[state].palette ← PaletteIO.ReadProtoPalette [state.name];
    IF (Proto[state].palette = NIL) THEN BEGIN
        PutHistoryLine [state, "Could not find palette. Creating new palette."];
        Proto[state].palette ← ProtoPalette.CreatePalette [keyColor];
        state.comment ← NIL
    END
    ELSE IF (Proto[state].palette.keyColor # keyColor) THEN PutHistoryLine [state,
            "Warning: palette based on different key color than expected."];
END;
WITH state.paletteAndSel SELECT FROM
    pp: ProtoPaletteData => FOR i: Hue IN Hue DO
        FOR j: ValueAndChroma IN ValueAndChroma DO NoteNewColor [state, i, j]
            ENDLOOP;
        ENDLOOP;
    dp: DigitalPaletteData => FOR l: CL ← dp.palette, l.rest WHILE l # NIL DO
        dp.power ← dp.power.SUCC; NoteNewUnstructuredColor [state, l.first,
            dp.power]
        ENDLOOP;
    ENDCASE => NULL;      -- no palette
state.comment ← PaletteIO.PaletteInfo [state.name].comment;
PutHistoryLine [state, state.comment];
EXITS
    fileError => BEGIN
        msg: ROPE;
        SELECT errorDesc.code FROM
            $noDB => msg ← "Could not find database.";
            $wrongFromat => msg ← "There already is a palette with such a name but it
                is in a different format.";
            ENDCASE => msg ← errorDesc.explanation;
        PutHistoryLine [state, msg]
        END
    END
END;    -- LoadPalette LABToLCHRope: PROC [lab: LAB] RETURNS [ROPE] ~ BEGIN
    lch: LCH ~ ProtoPalette.Cylindrical [lab];
    RETURN [IO.PutFR ["[L: %5.1f, C: %5.1f, H: %5.1f]", IO.real [lch.lStar], IO.real [lch.c], IO.real
        [lch.h]]]
END;    -- LABToLCHRope
```

AddToList: PROC [color: LAB, list: DigitalPaletteData, state: State] RETURNS
    [DigitalPaletteData] ~ BEGIN
    *Adds a new color to the color list and updates the color map cache*
    IF (list.palette = NIL) THEN BEGIN
        list.palette ← LIST [color]; NoteNewUnstructuredColor [state, color, 1]
        END
    ELSE IF (list.palette.first = NIL) THEN BEGIN
        *We want to be efficient if the user tries to find a new color to add to a palette. We do not
        try to insert it in the middle of the palette because it would make it harder for the user to
        find the new color.*
        list.palette.first ← color; NoteNewUnstructuredColor [state, color, 1]
        END
    ELSE BEGIN
        list.palette ← CONS [color, list.palette];
        *Because we add the new color in front of the palette, we have to rebuild the colors.*
        list.power ← 0;   -- *we use it as an index*
        FOR l: CL ← list.palette, l.rest WHILE l # NIL DO
            list.power ← list.power.SUCC; NoteNewUnstructuredColor [state, l.first, list.power]
            ENDLOOP;
        list.selection.ch ← list.power
        END;
    RETURN [list]
    END;   -- *AddToList*

Graphics

*swatchSize: REAL ~ 10;   -- in mm*
*swatchSize2: REAL ~ swatchSize * 1.2;      -- in mm*
*outlineSize: REAL ~ 1.1;   -- in mm*
*rectangle: Rectangle ~ [-swatchSize/2.0, -swatchSize/2.0, swatchSize, swatchSize];*
*hexagon: ARRAY [0 .. 5] OF VEC ~ [[swatchSize2/2.0, 0], [swatchSize2/4.0, swatchSize2/2.0],
    [-swatchSize2/4.0, swatchSize2/2.0], [-swatchSize2/2.0, 0], [-swatchSize2/4.0,
    -swatchSize2/2.0], [swatchSize2/4.0, -swatchSize2/2.0]];*
*octagon: ARRAY [0 .. 7] OF VEC ~ [[0.5\*swatchSize2, 0], [swatchSize2/3.0, swatchSize2/3.0], [0,
    swatchSize2/2.0], [-swatchSize2/3.0, swatchSize2/3.0], [-swatchSize2/2.0, 0],
    [-swatchSize2/3.0, -swatchSize2/3.0], [0, -swatchSize2/2.0], [swatchSize2/3.0,
    -swatchSize2/3.0]];*
*keyColorPos: ARRAY Hue OF VEC;*
*variantColorPos: ARRAY ValueAndChroma OF VEC;* swatchSize: REAL ← 10;   swatchSize2: REAL ← swatchSize * 1.2;      -- *in mm*
outlineSize: REAL ~ 1.1;   overhang: REAL ~ 5;      -- *in mm* potoSwatch, potoSwatch2, exoSwatch, exoSwatch2: REAL;
potoRectangle, exoRectangle: Rectangle;
potoHexagon, exoHexagon: ARRAY [0 .. 5] OF VEC;
potOctagon, exOctagon: ARRAY [0 .. 7] OF VEC ;
keyColorPos: ARRAY Hue OF VEC;
variantColorPos: ARRAY ValueAndChroma OF VEC;
video: BOOL ← FALSE;   videoMag: REAL ← 4.0;

InitSwatches: PROC [] ~ BEGIN
   IF video THEN swatchSize ← swatchSize * videoMag;
   swatchSize2 ← swatchSize * 1.2;
   potoSwatch ← swatchSize - overhang / 2.0;
   potoSwatch2 ← swatchSize2 - overhang / 2.0;
   exoSwatch ← potoSwatch + overhang / 2.0;
   exoSwatch2 ← potoSwatch2 + overhang / 2.0;
   potoRectangle ← [-potoSwatch/2.0, -potoSwatch/2.0, potoSwatch, potoSwatch];
   exoRectangle ← [-exoSwatch/2.0, -exoSwatch/2.0, exoSwatch, exoSwatch];
   potoHexagon← [[potoSwatch2/2.0, 0], [potoSwatch2/4.0, potoSwatch2/2.0],
        [-potoSwatch2/4.0, potoSwatch2/2.0], [-potoSwatch2/2.0, 0], [-potoSwatch2/4.0,
        -potoSwatch2/2.0], [potoSwatch2/4.0, -potoSwatch2/2.0]];
   exoHexagon ← [[exoSwatch2/2.0, 0], [exoSwatch2/4.0, exoSwatch2/2.0], [-exoSwatch2/4.0,
        exoSwatch2/2.0], [-exoSwatch2/2.0, 0], [-exoSwatch2/4.0, -exoSwatch2/2.0],
        [exoSwatch2/4.0, -exoSwatch2/2.0]];
   potOctagon ← [[0.5*potoSwatch2, 0], [potoSwatch2/3.0, potoSwatch2/3.0], [0,
        potoSwatch2/2.0], [-potoSwatch2/3.0, potoSwatch2/3.0], [-potoSwatch2/2.0, 0],
        [-potoSwatch2/3.0, -potoSwatch2/3.0], [0, -potoSwatch2/2.0], [potoSwatch2/3.0,
        -potoSwatch2/3.0]];
   exOctagon ← [[0.5*exoSwatch2, 0], [exoSwatch2/3.0, exoSwatch2/3.0], [0, exoSwatch2/2.0],
        [-exoSwatch2/3.0, exoSwatch2/3.0], [-exoSwatch2/2.0, 0], [-exoSwatch2/3.0,
        -exoSwatch2/3.0], [0, -exoSwatch2/2.0], [exoSwatch2/3.0, -exoSwatch2/3.0]];
   IF video THEN swatchSize ← swatchSize / videoMag
   END;   -- DrawRectangle DrawRectangle: PROC [context: Context, p: VEC, interior: BOOL] ~ BEGIN
   IF interior THEN context.MaskRectangle [[p.x + potoRectangle.x, p.y + potoRectangle.y,
        potoRectangle.w, potoRectangle.h]]
   ELSE context.MaskRectangle [[p.x + exoRectangle.x, p.y + exoRectangle.y, exoRectangle.w,
        exoRectangle.h]]
   END;   -- DrawRectangle DrawHexagon: PROC [context: Context, p: VEC, interior: BOOL] ~ BEGIN
   t: Trajectory;
   IF interior THEN BEGIN
      t ← ImagerPath.MoveTo [[p.x + potoHexagon[0].x, p.y + potoHexagon[0].y]];
      FOR i: [0 .. 5] IN [1 .. 5] DO
        t ← t.LineTo [[p.x + potoHexagon[i].x, p.y + potoHexagon[i].y]]
      ENDLOOP
      END
   ELSE BEGIN
      t ← ImagerPath.MoveTo [[p.x + exoHexagon[0].x, p.y + exoHexagon[0].y]];

```
        FOR i: [0 .. 5] IN [1 .. 5] DO
            t ← t.LineTo [[p.x + exoHexagon[i].x, p.y + exoHexagon[i].y]]
            ENDLOOP
        END;
    context.MaskFillTrajectory [t]
    END;    -- DrawHexagon DrawOctagon: PROC [context: Context, p: VEC, interior: BOOL] ~ BEGIN
    t: Trajectory;
    IF interior THEN BEGIN
        t ← ImagerPath.MoveTo [[p.x + potOctagon[0].x, p.y + potOctagon[0].y]];
        FOR i: [0 .. 7] IN [1 .. 7] DO
            t ← t.LineTo [[p.x + potOctagon[i].x, p.y + potOctagon[i].y]]
            ENDLOOP
        END
    ELSE BEGIN
        t ← ImagerPath.MoveTo [[p.x + exOctagon[0].x, p.y + exOctagon[0].y]];
        FOR i: [0 .. 7] IN [1 ..7] DO
            t ← t.LineTo [[p.x + exOctagon[i].x, p.y + exOctagon[i].y]]
            ENDLOOP
        END;
    context.MaskFillTrajectory [t]
    END;    -- DrawOctagon DrawRectangle: PROC [context: Context, p: VEC] ~ BEGIN
    context.MaskRectangle [[p.x + rectangle.x, p.y + rectangle.y, rectangle.w, rectangle.h]]
    END;    -- DrawRectangle DrawHexagon: PROC [context: Context, p: VEC] ~ BEGIN
    t: Trajectory ← ImagerPath.MoveTo [[p.x + hexagon[0].x, p.y + hexagon[0].y]];
    FOR i: [0 .. 5] IN [1 .. 5] DO
        t ← t.LineTo [[p.x + hexagon[i].x, p.y + hexagon[i].y]]
        ENDLOOP;
    context.MaskFillTrajectory [t]
    END;    -- DrawHexagon DrawOctagon: PROC [context: Context, p: VEC] ~ BEGIN
    t: Trajectory ← ImagerPath.MoveTo [[p.x + octagon[0].x, p.y + octagon[0].y]];
    FOR i: [0 .. 7] IN [1 .. 7] DO
        t ← t.LineTo [[p.x + octagon[i].x, p.y + octagon[i].y]]
        ENDLOOP;
    context.MaskFillTrajectory [t]
    END;    -- DrawOctagon OutlineRectangle: PROC [context: Context, p: VEC] ~ BEGIN
    Outlines a rectangle in the opponent color.
    r: Rectangle ~ [p.x + rectangle.x, p.y + rectangle.y, rectangle.w, rectangle.h];
    context.MaskVector [[r.x, r.y], [r.x + r.w, r.y]];           -- South
    context.MaskVector [[r.x + r.w, r.y], [r.x + r.w, r.y + r.h]];   -- East
    context.MaskVector [[r.x + r.w, r.y + r.h], [r.x, r.y + r.h]];   -- North
``` contextMaskVector [[r.x, r.y+r.h], [r.x, r.y]]   -- West
END:   -- OutlineRectangle OutlineHexagon: PROC [context: Context, p: VEC] ~ BEGIN
  t: Trajectory ← ImagerPath.MoveTo [[p.x+ hexagon[0].x, p.y+ hexagon[0].y]];
  FOR i: [0 .. 5] IN [1 ..5] DO
    t ← t.LineTo [[p.x+ hexagon[i].x, p.y+ hexagon[i].y]]
    ENDLOOP;
  context.MaskStrokeTrajectory [t, TRUE]
  END;   -- OutlineHexagon OutlineOctagon: PROC [context: Context, p: VEC] ~ BEGIN
  t: Trajectory ← ImagerPath.MoveTo [[p.x+ octagon[0].x, p.y+ octagon[0].y]];
  FOR i: [0 .. 7] IN [1 ..7] DO
    t ← t.LineTo [[p.x+ octagon[i].x, p.y+ octagon[i].y]]
    ENDLOOP;
  context.MaskStrokeTrajectory [t, TRUE]
  END;   -- OutlineOctagon DrawPalette: PROC [context: Context, state: State, ip: BOOL ← FALSE, changes: REF ANY] ~
  BEGIN
  palette: Palette ← Proto[state].palette;   selected: LAB;

OutlineColor: PROC [h: Hue, i: ValueAndChroma, interior: Color] RETURNS [Color] ~
    BEGIN
    IF (Proto[state].selection = NIL) OR (Proto[state].selection.hue # h) OR
        (Proto[state].selection.variant # i) THEN RETURN [interior]
    ELSE BEGIN
      outlineColor: Color;
      IF (ABS[selected.aStar] < 10) AND (ABS[selected.bStar] < 10) THEN outlineColor ←
            white
      ELSE BEGIN
        lch: LCH ← ProtoPalette.Cylindrical [selected];
        lch.lStar ← 100 - lch.lStar;        lch.h ← lch.h + 180;
        IF lch.h > 360 THEN lch.h ← lch.h - 360;
        outlineColor ← ColorFromLAB [ProtoPalette.Cartesian[lch]]
        END;
      RETURN [outlineColor]
      END
    END;   -- OutlineColor DrawHueVariants: PROC [h: Hue, p: VEC] ~ BEGIN
    variant: IsoHueVariation ~ palette.colors[h];
    color: Color;   pos: VEC;
    FOR i: ValueAndChroma IN [-(values+chromata) .. 0) DO
      IF (variant[i] = NIL) THEN color ← IF ip THEN constantGray ELSE state.background
      ELSE color ← IF ip THEN ColorFromLAB [variant[i]] ELSE
              state.colors[ColorMapIndex[0, h, i]];
      pos ← [p.x+ variantColorPos[i].x, p.y+ variantColorPos[i].y];
      context.SetColor [OutlineColor [h, i, color]]; DrawRectangle [context, pos, FALSE];
      context.SetColor [color];  DrawRectangle [context, pos, TRUE]

```
ENDLOOP;
IF (variant[0] = NIL) THEN color ← IF ip THEN constantGray ELSE state.background
ELSE color ← IF ip THEN ColorFromLAB [variant[0]] ELSE state.colors[ColorMapIndex[0,
    h, 0]];
contextSetColor [OutlineColor [h, 0, color]];
IF (h = centerHue) THEN DrawOctagon [context, p, FALSE] ELSE DrawHexagon
    [context, p, FALSE];
contextSetColor [color];
IF (h = centerHue) THEN DrawOctagon [context, p, TRUE] ELSE DrawHexagon [context,
    p, TRUE];
FOR i: ValueAndChroma IN (0 .. chromata + values] DO
    IF (variant[i] = NIL) THEN color ← IF ip THEN constantGray ELSE state.background
    ELSE color ← IF ip THEN ColorFromLAB [variant[i]] ELSE
        state.colors[ColorMapIndex[0, h, i]];
    pos ← [p.x + variantColorPos[i].x, p.y + variantColorPos[i].y];
    contextSetColor [OutlineColor [h, i, color]]; DrawRectangle [context, pos, FALSE];
    contextSetColor [color]; DrawRectangle [context, pos, TRUE]
    ENDLOOP
END;    -- DrawHueVariants DrawVideoHueVariants: PROC [h: Hue, p: VEC] ~ BEGIN
    color: Color;
    IF (palette.colors[h][0] = NIL) THEN color ← IF ip THEN constantGray ELSE
        state.background
    ELSE color ← IF ip THEN ColorFromLAB [palette.colors[h][0]] ELSE
        state.colors[ColorMapIndex[0, h, 0]];
    contextSetColor [color];
    IF (h = centerHue) THEN DrawOctagon [context, p, FALSE] ELSE DrawHexagon
        [context, p, FALSE]
    END;    -- DrawVideoHueVariants IF (palette = NIL) THEN ImportantMessage ["No palette"]
ELSE BEGIN
    IF video THEN FOR i: Hue IN Hue DO DrawVideoHueVariants [i, keyColorPos[i]]
        ENDLOOP
    ELSE BEGIN
        IF (Proto[state].selection # NIL) THEN selected ←
            palette.colors[Proto[state].selection.hue][Proto[state].selection.variant];
        WITH changes SELECT FROM
            c: ChangeListProto => FOR l: ChangeListProto ← c, l.rest WHILE l # NIL DO
                DrawHueVariants [l.first, keyColorPos[l.first]]
                ENDLOOP;
            ENDCASE => FOR i: Hue IN Hue DO DrawHueVariants [i, keyColorPos[i]]
                ENDLOOP
        END
    END
END;    -- DrawPalette
```

*Measures are in millimeters. Numbers are such that hitting is fast.*
```
    washHeight: INT ~ 30;    washWidth: INT ~ 90;
    washItemWidth: REAL ~ Float [washWidth] / Float [washItems];
``` rectHeight: INT ~ 20;    rectWidth, rectSpacing: INT ~ 10;

DrawList: PROC [context: Context, state: State, ip: BOOL ← FALSE, changes: REF ANY] ~ BEGIN
    count: CARDINAL ← 0;    palette: CL ~ Digi[state].palette;
    IF (palette = NIL) THEN ImportantMessage ["No palette"]
    ELSE BEGIN
        rect: Rectangle ← [x: 0, y: 0, w: washItemWidth, h: washHeight];
        column, line: CARDINAL;    hint: ATOM;
        WITH changes SELECT FROM
            a: ATOM => hint ← a;
            ENDCASE => hint ← NIL;
        IF (hint = $none) THEN RETURN;
        IF (hint # $wash) THEN FOR colors: CL ← palette, colors.rest WHILE colors # NIL DO
            column ← count MOD 5;    line ← 1 + (count / 5);    count ← count.succ;
            IF (colors.first = NIL) THEN context.SetColor [IF ip THEN constantGray ELSE
                    state.background]
            ELSE BEGIN
                IF ip THEN context.SetColor [ColorFromLAB [colors.first]]
                ELSE context.SetColor [state.colors[UnstructuredColorMapIndex[0, count]]]
            END;
            context.MaskRectangle [x: column * (rectWidth + rectSpacing),
                    y: - line * (rectHeight + rectSpacing),
                    w: rectWidth, h: rectHeight]
        ENDLOOP;
        IF (Digi[state].wash # NIL) AND (hint # $list) THEN FOR i: INT IN [0 .. washItems) DO
            context.SetColor [Digi[state].washCache[i]];
            rect.x ← i * rect.w;        context.MaskRectangle [rect]
        ENDLOOP
    END
END;    -- DrawList DrawEverything: PROC [context: Context, state: State, ip, clear: BOOL ← FALSE, changes: REF
        ANY ← NIL] ~ BEGIN
    *Draws everything. Window for scroll bars is not updated in the case of Interpress production.*
    context.ScaleT [state.scale];            context.TranslateT [state.translation];
    IF NOT ip THEN state.window ← ImagerBackdoor.GetBounds [context]
    ELSE BEGIN
        context.SetPriorityImportant [TRUE];
        state.window ← state.boundingBox;        context.TranslateT [[10, 45]]
    END;
    context.ClipRectangle [state.window];
    context.SetStrokeJoint [bevel];    context.SetStrokeEnd [square];
    context.SetStrokeWidth [outlineSize];
    IF state.abort↑ THEN {state.abort↑ ← FALSE;        RETURN};
    IF clear THEN BEGIN
        context.SetColor [IF ip THEN constantGray ELSE state.background];
            context.MaskRectangle [state.window]
    END;
    IF ip THEN BEGIN
        context.SetFont [ImagerFontScale [boldFace, state.titleSize]];

```
        contextSetXY [state.titlePosition]; contextSetColor [black];
        contextShowRope [state.name]
        END;
    WITH state.paletteAndSel SELECT FROM
        proto: ProtoPaletteData => DrawPalette [context, state, ip, changes];
        digi: DigitalPaletteData => DrawList [context, state, ip, changes];
        ENDCASE => NULL
    END;    -- DrawEverything
```

Viewers & Class Set-up

```
ViewerFlavor: TYPE ~ ViewerClasses.ViewerFlavor;
wheel: ViewerFlavor ~ $ColorWheel;
list: ViewerFlavor ~ $ColorList;
MenuLine: TYPE ~ ViewerClasses.MenuLine;

InitializeViewerClass: PROC ~ BEGIN
    Initializes and registers the viewer classes.
    wheelClass: ViewerClasses.ViewerClass ← NEW [ViewerClasses.ViewerClassRec];
    listClass: ViewerClasses.ViewerClass ← NEW [ViewerClasses.ViewerClassRec];
    wheelMenu: Menus.Menu ~ Menus.CreateMenu [2];
    listMenu: Menus.Menu ~ Menus.CreateMenu [1];
    abortButton: MenuEntry ~ Menus.CreateEntry [name: "Abort",
            proc: Abort,
            guarded: TRUE];
    zoomButton: MenuEntry ~ Menus.CreateEntry [name: "Zoom",
            proc: ZoomIn,
            documentation: "Left: in, right: out"];
    saveButton: MenuEntry ~ Menus.CreateEntry [name: "Save",
            proc: Housekeeping,
            clientData: $save,
            documentation: "Save palette"];
    listDirButton: MenuEntry ~ Menus.CreateEntry [name: "List",
            proc: Housekeeping,
            clientData: $list,
            guarded: FALSE,
            documentation: "List palettes"];
    renameButton: MenuEntry ~ Menus.CreateEntry [name: "Rename",
            proc: Housekeeping,
            clientData: $rename,
            guarded: FALSE,
            documentation: "Rename palette"];
    resetButton: MenuEntry ~ Menus.CreateEntry [name: "Reset",
            proc: Housekeeping,
            clientData: $reset,
            guarded: TRUE,
            documentation: "Reset transformation, SHIFT: Undo all edits"];
    historyButton: MenuEntry ~ Menus.CreateEntry [name: "History",
            proc: Housekeeping,
```

```
                documentation: "Left: undo, right: redo",
                clientData: $history];
    ipButton: MenuEntry ~ Menus.CreateEntry [name: "Hardcopy",
                proc: DoInterpress,
                documentation: "Generate Interpress master of palette",
                guarded: FALSE];
    verboseButton: MenuEntry ~ Menus.CreateEntry [name: "Verbose",
                proc: Housekeeping,
                clientData: $verbose,
                documentation: "Explain commands",
                guarded: FALSE];
    explainButton: MenuEntry ~ Menus.CreateEntry [name: "Explain",
                proc: Housekeeping,
                clientData: $explain,
                documentation: "Explain tool use",
                guarded: FALSE];
    grabButton: MenuEntry ~ Menus.CreateEntry [name: "Grab",
                proc: Housekeeping,
                clientData: $grabSelection,
                documentation: "Grab last color selection",
                guarded: FALSE];
    harmoniesButton: MenuEntry ~ Menus.CreateEntry [name: "Harmonies",
                proc: AddHue,
                clientData: $harmonies,
                documentation: "Add analoguous harmonies"];
    complementButton: MenuEntry ~ Menus.CreateEntry [name: "Complement(s)",
                proc: AddHue,
                clientData: $complement,
                documentation: "Left: triadic, middle: direct complement"];
    rotationButton: MenuEntry ~ Menus.CreateEntry [name: "ShiftHue",
                proc: RotateHue,
                documentation: "Rotate Palette colder left or right"];
    valueButton: MenuEntry ~ Menus.CreateEntry [name: "MoreValues",
                proc: Values,
                documentation: "Add values to selected color"];
    chromaButton: MenuEntry ~ Menus.CreateEntry [name: "MoreChromata",
                proc: Chromata,
                documentation: "Add chromata to selected color"];

Menus.AppendMenuEntry [wheelMenu, abortButton, 0];
Menus.AppendMenuEntry [wheelMenu, resetButton, 0];
Menus.AppendMenuEntry [wheelMenu, zoomButton, 0];
Menus.AppendMenuEntry [wheelMenu, renameButton, 0];
Menus.AppendMenuEntry [wheelMenu, listDirButton, 0];
Menus.AppendMenuEntry [wheelMenu, saveButton, 0];
Menus.AppendMenuEntry [wheelMenu, historyButton, 0];
Menus.AppendMenuEntry [wheelMenu, ipButton, 0];
Menus.AppendMenuEntry [wheelMenu, verboseButton, 0];
Menus.AppendMenuEntry [wheelMenu, explainButton, 0];
Menus.AppendMenuEntry [wheelMenu, rotationButton, 1];
Menus.AppendMenuEntry [wheelMenu, harmoniesButton, 1];
```

```
Menus.AppendMenuEntry [wheelMenu, complementButton, 1];
Menus.AppendMenuEntry [wheelMenu, valueButton, 1];
Menus.AppendMenuEntry [wheelMenu, chromaButton, 1];

Menus.AppendMenuEntry [listMenu, Menus.CopyEntry [abortButton], 0];
Menus.AppendMenuEntry [listMenu, Menus.CopyEntry [resetButton], 0];
Menus.AppendMenuEntry [listMenu, Menus.CopyEntry [zoomButton], 0];
Menus.AppendMenuEntry [listMenu, Menus.CopyEntry [renameButton], 0];
Menus.AppendMenuEntry [listMenu, Menus.CopyEntry [listDirButton], 0];
Menus.AppendMenuEntry [listMenu, Menus.CopyEntry [saveButton], 0];
Menus.AppendMenuEntry [listMenu, Menus.CopyEntry [ipButton], 0];
Menus.AppendMenuEntry [listMenu, Menus.CopyEntry [verboseButton], 0];
Menus.AppendMenuEntry [listMenu, Menus.CopyEntry [grabButton], 0];

BEGIN OPEN wheelClass:
    flavor ← wheel;
    notify ← UserEvent;
    paint ← Paint;
    destroy ← Destroy;
    save ← SaveViewer;
    scroll ← VerticalTranslation;
    hscroll ← HorizontalTranslation;
    menu ← wheelMenu;
    tipTable ← TIPUser.InstantiateNewTIPTable ["ProtoPalette.Tip"];
    icon ← Icons.NewIconFromFile ["[CedarChest7.0]<MetaPalette>CoreView.Icons", 5];
    cursor ← crossHairsCircle
    END;

BEGIN OPEN listClass:
    flavor ← list;
    notify ← UserEvent;
    paint ← Paint;
    destroy ← Destroy;
    save ← SaveViewer;
    scroll ← VerticalTranslation;
    hscroll ← HorizontalTranslation;
    menu ← listMenu;
    tipTable ← TIPUser.InstantiateNewTIPTable ["ProtoPalette.Tip"];
    icon ← Icons.NewIconFromFile ["[CedarChest7.0]<MetaPalette>CoreView.Icons", 6];
    cursor ← crossHairsCircle
    END;

ViewerOps.RegisterViewerClass [wheel, wheelClass];
ViewerOps.RegisterViewerClass [list, listClass]
END;    -- InitializeViewerClass InitializeViewer: PROC [colonna: Column, state: State, keyColor: ATOM] RETURNS [viewer:
        Viewer] ~ BEGIN
If the key color is empty then a digital palette is assumed, otherwise a proto-palette.
paletteViewer, historyViewer: ViewerClasses.ViewerRec;
class: ATOM ~ IF (keyColor = emptyAtom) THEN list ELSE wheel;

IF (colonna = color) AND (NOT WindowManager.colorDisplayOn) THEN colonna ← left;
```

```
BEGIN OPEN paletteViewer:
    label ← state.name;
    name ← IF (keyColor = emptyAtom) THEN state.name ELSE state.name.Cat [" (",
            Atom.GetPName [keyColor], ")"];
    column ← colonna;       iconic ← TRUE;
    scrollable ← TRUE;      hscrollable ← TRUE;     guardDestroy ← TRUE;
    data ← state
    END;
BEGIN OPEN historyViewer:
    label ← paletteViewer.label.Concat [" history"];
    name ← paletteViewer.name.Concat [" history"];
    column ← right; iconic ← TRUE;  data ← state
    END;
viewer ← ViewerOps.CreateViewer [class, paletteViewer];
ViewerOps.EstablishViewerPosition [viewer, viewer.wx, viewer.wy, viewer.ww, viewer.wh];
[] ← Terminal.SetColorCursorPresentation [Terminal.Current[], onesAreBlack];
state.historyViewer ← TypeScript.Create [historyViewer, FALSE];
ViewerOps.PaintViewer [state.historyViewer, all];
LoadPalette [state, keyColor];     paletteViewer.file ← PaletteIO.DatabaseInfo[].name
END;    -- InitializeViewer PutHistoryLine: PROC [state: State, rope: ROPE, italicize: BOOL ← FALSE] ~ BEGIN
    ENABLE {TypeScriptDestroyed => GOTO again};
    IF italicize THEN TypeScript.ChangeLooks [state.historyViewer, 'i];
    TypeScript.PutRope [state.historyViewer, rope.Concat["\n"]];
    IF italicize THEN TypeScript.ChangeLooks [state.historyViewer, '`];
    EXITS
        again => BEGIN
            historyViewer: ViewerClasses.ViewerRec:
            BEGIN OPEN historyViewer;
                label ← name ← state.name.Concat [" history"];
                column ← right; iconic ← FALSE; data ← state
                END;
            state.historyViewer ← TypeScript.Create [historyViewer, TRUE];
            IF italicize THEN TypeScript.ChangeLooks [state.historyViewer, 'i];
            TypeScript.PutRope [state.historyViewer, rope];
            IF italicize THEN TypeScript.ChangeLooks [state.historyViewer, '`]
            END;
    END;    -- PutHistoryLine GetHistoryLine: PROC [state: State, prompt: ROPE] RETURNS [ROPE] ~ BEGIN
    Returns NIL if the input is aborted.
    ENABLE {TypeScriptDestroyed => GOTO abort};
    buffer: ARRAY (0 .. 200) OF CHAR; index, length: [0 .. 200] ← 0;
    ch: CHAR ← IO.NUL;
    Fetch: PROC RETURNS [CHAR] ~ {index ← index.SUCC; RETURN [buffer[index]]};
    WHILE TypeScript.CharsAvailable[state.historyViewer] DO
        [] ← TypeScript.GetChar [state.historyViewer]
        ENDLOOP;
    PutHistoryLine [state, prompt];
```

```
WHILE (ch # '\n) DO
    IF state.abort THEN GOTO abort;
    ch ← TypeScript.GetChar [state.historyViewer];
    SELECT ch FROM
        IO.ESC => BEGIN
            TypeScript.TypeIn [state.historyViewer, state.lastInput];
            TypeScript.PutRope [state.historyViewer, state.lastInput]
            END;
        IO.DEL => GOTO abort;
        '\b => IF index > 0 THEN BEGIN
            index ← index.PRED;
            TypeScript.BackSpace [state.historyViewer]
            END;
        ENDCASE => BEGIN
            index ← index.SUCC;       IF index >= 200 THEN LOOP;       buffer[index] ← ch;
            TypeScript.PutChar [state.historyViewer, ch]
            END;
    ENDLOOP;
IF (index = 0) THEN RETURN [NIL];
length ← index - 1;      index ← 0;
state.lastInput ← Rope.FromProc [length, Fetch, length];      RETURN [state.lastInput];
EXITS
    abort => BEGIN
        WHILE TypeScript.CharsAvailable[state.historyViewer] DO
            [] ← TypeScript.GetChar [state.historyViewer]
            ENDLOOP;
        RETURN [NIL]
        END
END;    -- GetHistoryLine SetNewVersion: PROC [v: Viewer, state: State] ~ BEGIN
    Marks a palette edited both in the viewer and in the database.
    errorDesc: PaletteIO.ErrorDesc;
    BEGIN
        ENABLE BEGIN
            PaletteIO.Error => {errorDesc ← [error.code, error.explanation]; GOTO
                databaseError};
            END;
        ViewerOps.SetNewVersion [v];      PaletteIO.MarkEdited [state.name];
        EXITS
            databaseError => IF errorDesc.code # $noSuchPalette THEN BEGIN
                PutHistoryLine [state, errorDesc.explanation];
                ImportantMessage [errorDesc.explanation]
                END
        END
END;    -- SetNewVersion ResetNewVersion: PROC [v: Viewer] ~ BEGIN
    Does the converse operation of ViewerOps.SetNewVersion. Assume the class is correct.
    v.newVersion ← FALSE;
```

ViewerForkers.ForkPaint [viewer: v, hint: caption, clearClient: FALSE, tryShortCuts: TRUE]
END; -- *ResetNewVersion*

UserEvent: ViewerClasses.NotifyProc ~ BEGIN
    [*self: Viewer, input: LIST OF REF ANY*]
    *Input events from the class TIPTable. Mouse events get passed whenever the mouse is over the viewer, keyboard events get passed if the viewer owns the input focus (see the InputFocus interface). N.B. Called at Process.priorityForeground!*
    state: State ~ NARROW [self.data];
    xy: TIPUser.TIPScreenCoords ~ NARROW [input.first];
    pos: VEC;         invScale: REAL ← 1.0 / state.scale;
    cmd: ATOM ~ NARROW [input.rest.first];
    pos.x ← xy.mouseX * invScale;    pos.y ← xy.mouseY * invScale;
    pos.x ← pos.x - state.translation.x;  pos.y ← pos.y - state.translation.y;
    SELECT self.class.flavor FROM
        wheel => TRUSTED {Process.Detach [FORK Hit [state, self, pos, (cmd = $delete) OR
                    (cmd = $deleteLeft) OR (cmd = $deleteRight)]]};
        list => TRUSTED {Process.Detach [FORK HitList [state, self, pos, cmd]]};
        ENDCASE => NULL
    END; -- *UserEvent*

Menu Commands

Paint: ViewerClasses.PaintProc ~ BEGIN
    [*self: Viewer, context: Imager.Context, whatChanged: REF, clear: BOOL] RETURNS [quit: BOOL ← FALSE]*
    *Called by the window manager when the client should repaint the data on the screen. The context is clipped to the client screen area. whatChanged is just passed from the call to ViewerOps.PaintViewer, but will be NIL when the window manager requires a full repaint after moving a viewer on the screen. clear is a hint that the client background is white, so that the client can paint on the black bits if it so chooses. See comments for paintRectangles bit in the viewer class. Return quit~TRUE to stop without painting children.*
    state: State ~ NARROW [self.data];

state.abort↑ ← FALSE;
    state.window ← ImagerBackdoor.GetBounds [context];    -- *needed for scroll bars*

IF state.abort↑ THEN {state.abort↑ ← FALSE; RETURN [TRUE]};
    Process.CheckForAbort;

context.SetPriorityImportant [FALSE];
    IF state.resetPainting THEN BEGIN
        *Important for initialization of caches.*
        state.translation ← [-state.boundingBox.x, -state.boundingBox.y];
        state.scale ← MIN [(state.window.w / state.boundingBox.w), (state.window.h / state.boundingBox.h)];
        state.resetPainting ← FALSE;    clear ← TRUE
    END;
    DrawEverything [context: context, state: state, ip: FALSE, clear: clear, changes:
            whatChanged]
    END; -- *Paint*

SaveViewer: ViewerClasses.SaveProc ~ BEGIN
    PROC [self: Viewer, force: BOOL ← FALSE]:
        Requests client to save data structures on the disk. force should only be true when called
        from the emergency backup code on error recovery and requests that the client consider
        overriding monitors or locks that might otherwise prevent saving the data.
    errorDesc: PaletteIO.ErrorDesc;   state: State ← NARROW [self.data, State];
    BEGIN
        ENABLE {PaletteIO.Error => {errorDesc ← error; GOTO fileError}};
        IF NOT self.newVersion THEN RETURN;
        IF trace THEN PutHistoryLine [state, "Saving ..."];
        IF force THEN WITH state.paletteAndSel SELECT FROM
            proto: ProtoPaletteData => proto.palette.lock ← FALSE;
            ENDCASE => NULL;
        WITH state.paletteAndSel SELECT FROM
            proto: ProtoPaletteData => PaletteIO.WriteProtoPalette [state.name,
                    state.comment, proto.palette];
            digi: DigitalPaletteData => PaletteIO.WriteColorList [state.name, state.comment,
                    digi.palette];
            ENDCASE => NULL;
        ResetNewVersion [self];
        EXITS
            fileError => {PutHistoryLine [NARROW [self.data, State], errorDesc.explanation];
                    SetNewVersion [self, state]; ImportantMessage [errorDesc.explanation]}
        END
    END;    -- SaveViewer VerticalTranslation: ViewerClasses.ScrollProc ~ BEGIN
    [self: Viewer, op: ScrollOp, amount: INTEGER, shift, control: BOOL ← FALSE] RETURNS [top,
        bottom: INTEGER ← LAST[INTEGER]]
    ScrollOp = {query, up, down, thumb}
    Client scrolling and scrolling feedback. If op is 'query' the client should return the *percentage*
    of the scrollable document at the top and bottom of the screen, or default if unknown. If op
    is 'up' or 'down' then amount is *number of pixels* to glitch. If op is 'thumb' then amount is
    *percentage* into document to scroll. The shift and control information reflects the state of the
    shift and control keys during the up, down, and thumb ops and may be interpreted by the
    client as desired.
    state: State ~ NARROW [self.data];
    viewport: [self.cx, cy, cw, ch]

BEGIN OPEN state;
        SELECT op FROM
            query => BEGIN
                A query is performed each time the mouse is on a scroll bar, hence this must be
                faster than a bullet.
                top ← MAX [topSB, 0];    bottom ← MIN [bottomSB, 100];    RETURN
            END;
            up => IF (window.y < boundingBox.y + boundingBox.h) THEN BEGIN
                translation.y ← translation.y + (Float [amount] / Float [self.ch]) * window.h;
                Note that the cached values may exceed the diplayed values to avoid referring to the
                    window when it is moved back into the viewer.
                Note also that topSB and bottomSB cannot be computed trivially from amount.

because amount is in pixels. while I have to return a percentage.
```
        topSB ← Fix [(window.y + window.h) / (boundingBox.y + boundingBox.h) *
            100.0];
        bottomSB ← topSB + Fix [(window.h / boundingBox.h) * 100.0]
        END;
    down => IF (window.y + window.h > boundingBox.y) THEN BEGIN
        translation.y ← translation.y - (Float [amount] / Float [self.ch]) * window.h;
        topSB ← Fix [(window.y + window.h) / (boundingBox.y + boundingBox.h) *
            100.0];
        bottomSB ← topSB + Fix [(window.h / boundingBox.h) * 100.0]
        END;
    thumb => SELECT TRUE FROM
        shift AND control => ImportantMessage ["Invalid command"];
        shift => BEGIN    -- scale up (window becomes relatively smaller)
            The scroll bar is viewed as a scale from 1 to 10.
            factor: REAL ~ 10.0 / Float [amount + 10];       scale ← scale * factor;
            topSB ← Fix [((window.y + window.h) * factor) / (boundingBox.y +
                boundingBox.h) * 100.0];
            bottomSB ← topSB + Fix [(window.h / boundingBox.h) * 100.0]
            END;
        control => BEGIN        -- reset painting
            resetPainting ← TRUE;
            bottomSB ← rightSB ← 100;       topSB ← leftSB ← 0
            END;
        ENDCASE => BEGIN        -- thumb
            sign: INTEGER ← IF (boundingBox.h > window.h) THEN -1 ELSE 1;
            translation.y ← sign * (boundingBox.y + (boundingBox.h * Float [amount] /
                100.0));
            topSB ← amount;
            bottomSB ← amount + Fix [(window.h / boundingBox.h) * 100.0]
            END;
    ENDCASE => ERROR;

Trace [amount];

ViewerOps.PaintViewer [viewer: self, hint: client];    -- op <> query
    Note that the cached values may exceed the diplayed values to avoid referring to the
        window when it is moved back into the viewer.
    top ← MAX [topSB, 0];     bottom ← MIN [bottomSB, 100]
    END      -- OPEN state
    END;     -- VerticalTranslation
```

HorizontalTranslation: ViewerClasses.HScrollProc ~ BEGIN
   [self: Viewer, op: HScrollOp, amount: INTEGER, shift, control: BOOL ← FALSE] RETURNS
   [left, right: INTEGER ← LAST[INTEGER]]
   HScrollOp = {query, left, right, thumb}
   Client scrolling and scrolling feedback. If op is 'query' the client should return the <u>percentage</u>
   of the scrollable document at the top and bottom of the screen, or default if unknown. If op
   is 'up' or 'down' then amount is <u>number of pixels</u> to glitch. If op is 'thumb' then amount is
   <u>percentage</u> into document to scroll. The shift and control information reflects the state of the
   shift and control keys during the up, down, and thumb ops and may be interpreted by the

*client as desired.*
state: State ~ NARROW [self.data];

```
BEGIN OPEN state;
   SELECT op FROM
      query => BEGIN
         A query is performed each time the mouse is on a scroll bar, hence this must be
         faster than a bullet.
         right ← MIN [rightSB, 100];        left ← MAX [leftSB, 0];     RETURN
         END;
      right => IF (window.x < boundingBox.x + boundingBox.w) THEN BEGIN
         translation.x ← translation.x + (Float [amount] / Float [self.cw]) * window.w;
         leftSB ← Fix [(window.x + window.w) / (boundingBox.x + boundingBox.w) *
               100.0];
         rightSB ← leftSB + Fix [(window.w / boundingBox.w) * 100.0]
         END;
      left => IF (window.x + window.w > boundingBox.x) THEN BEGIN
         translation.x ← translation.x - (Float [amount] / Float [self.cw]) * window.w;
         leftSB ← Fix [(window.x + window.w) / (boundingBox.x + boundingBox.w) *
               100.0];
         rightSB ← leftSB + Fix [(window.w / boundingBox.w) * 100.0]
         END;
      thumb => SELECT TRUE FROM
         shift AND control => ImportantMessage ["Invalid command"];
         shift => BEGIN   -- scale down (window becomes relatively larger)
            factor: REAL ~ Float [amount + 10] / 10.0;        scale ← scale * factor;
            leftSB ← Fix [((window.x + window.w) * factor) / (boundingBox.x +
                  boundingBox.w) * 100.0];
            rightSB ← leftSB + Fix [(window.w / boundingBox.w) * 100.0]
            END;
         control => BEGIN      -- reset painting
            resetPainting ← TRUE;   bottomSB ← rightSB ← 100:        topSB ← leftSB
                  ← 0
            END;
         ENDCASE => BEGIN      -- thumb
            sign: INTEGER ← IF (boundingBox.w > window.w) THEN -1 ELSE 1;
            translation.x ← sign * (boundingBox.x + (boundingBox.w * Float [amount] /
                  100.0));
            leftSB ← amount;
            rightSB ← amount + Fix [(window.w / boundingBox.w) * 100.0]
            END;
      ENDCASE => ERROR;

Trace [amount];

ViewerOps.PaintViewer [viewer: self, hint: client];   -- op <> query
   Note that the cached values may exceed the diplayed values to avoid referring to the
      window when it is moved back into the viewer.
   right ← MIN [rightSB, 100];        left ← MAX [leftSB, 0]
END   -- OPEN state
END;   -- HorizontalTranslation
```

```
Destroy: ViewerClasses.DestroyProc ~ BEGIN
    Called when the viewer has been destroyed for some reason.
    state: State ← NARROW [self.data];
    PaletteIO.UnmarkEdited [state.name ! PaletteIO.Error => {CONTINUE}];
    TypeScript.Destroy [state.historyViewer];   DisposeSubMap [state.subMap];
    FOR sl: LIST OF State ← allStates, sl.rest WHILE sl # NIL DO
        IF (sl.first = state) THEN sl.first ← NIL
        ENDLOOP;
    state ← NIL;     lastViewer ← NIL;      stateCount ← stateCount.PRED;
    IF (stateCount = 0) THEN ImagerColorMap.UnRegister [colorMapNotifier]
    END;  -- Destroy Abort: Menus.ClickProc ~ BEGIN
    [parent: REF ANY, clientData: REF ANY ← NIL, mouseButton: MouseButton ← red, shift,
    control: BOOL ← FALSE]
    IF NOT ISTYPE [parent, Viewer] THEN ImportantMessage ["Implementation error (wrong
            viewer type)"]
    ELSE BEGIN
        state: State ~ NARROW [NARROW [parent, Viewer].data];
        IF state.verbose THEN PutHistoryLine [state, "Abort painting"];
        state.abort↑ ← TRUE
        END
    END;  -- Abort ZoomIn: Menus.ClickProc ~ BEGIN
    [parent: REF ANY, clientData: REF ANY ← NIL, mouseButton: MouseButton ← red, shift,
    control: BOOL ← FALSE]
    IF NOT ISTYPE [parent, Viewer] THEN ImportantMessage ["Implementation error (wrong
            viewer type)"]
    ELSE BEGIN
        v: Viewer ~ NARROW [parent];
        state: State ~ NARROW [v.data];
        IF state.verbose THEN PutHistoryLine [state, "Red: zoom in by 50%; blue: zoom out"];
        BEGIN OPEN state;
            scale ← SELECT mouseButton FROM
                    red => scale * 1.5,
                    blue => scale / 1.5,
                    ENDCASE => IF control THEN scale * 3 ELSE scale;
            IF control AND (mouseButton = yellow) THEN
                translation ← [translation.x - swatchSize * 3, translation.y - swatchSize * 3.2];
            ViewerOps.PaintViewer [viewer: v, hint: client];
            topSB ← Fix [(window.y + window.h) / (boundingBox.y + boundingBox.h) *
                100.0];
            bottomSB ← topSB + Fix [(window.h / boundingBox.h) * 100.0];
            leftSB ← Fix [(window.x + window.w) / (boundingBox.x + boundingBox.w) *
                100.0];
            rightSB ← leftSB + Fix [(window.w / boundingBox.w) * 100.0]
            END
        END
    END;  -- ZoomIn
```

Housekeeping: Menus.ClickProc ~ BEGIN
[parent: REF ANY, clientData: REF ANY ← NIL, mouseButton: MouseButton ← red, shift, control: BOOL ← FALSE].   MouseButton: TYPE = {red, yellow, blue}
IF NOT ISTYPE [parent, Viewer] THEN ImportantMessage ["Implementation error (wrong viewer type)"]
ELSE BEGIN
    v: Viewer ~ NARROW [parent];    state: State ~ NARROW [v.data];
    WITH clientData SELECT FROM
        a: ATOM => SELECT a FROM
            $save => ViewerOps.SaveViewer [v];
            $verbose => state.verbose ← speak ← NOT state.verbose;
            $explain => BEGIN
                lang: ROPE ~ SELECT mouseButton FROM red => "English", yellow =>
                    "Italiano", ENDCASE => "Deutsch";
                name: ROPE ~ lastWDir.Cat ["ProtoPalette-", lang, ".Tioga"];
                IF state.verbose THEN PutHistoryLine [state, "Red: explain tool; yellow:
                    spiega l'utensile; blue: erkläre das Werkzeug"];
                PutHistoryLine [state, RopeFile.Create [name: name, raw: FALSE ! FS.Error
                    => {PutHistoryLine [state, Rope.Concat ["Could not find help file
                    ", name]]; CONTINUE}], TRUE];
                PutHistoryLine [state, state.comment];
                PutHistoryLine [state, "Red/left: English; yellow/middle: Italiano;
                    blue/right: Deutsch"]
            END;
            $history => BEGIN
                changed: BOOL ← TRUE;   c: CARDINAL ← state.history.index;
                protoPalette: Palette;      -- immutably referenced by state.paletteAndSel
                WITH state.paletteAndSel SELECT FROM
                    proto: ProtoPaletteData => protoPalette ← proto.palette;
                    ENDCASE => RETURN;
                IF state.verbose THEN PutHistoryLine [state, "Red/left: redo; blue/right:
                    undo"];
                SELECT mouseButton FROM
                    red => c ← c.SUCC MOD (historySize-1);
                    blue => c ← IF (c > 0) THEN c.PRED ELSE historySize-1;
                    ENDCASE => RETURN;
                IF (state.history.entry[c] # NIL) THEN state.history.index ← c ELSE changed ←
                    FALSE;
                protoPalette ← state.history.entry[state.history.index];
                IF changed THEN ViewerOps.PaintViewer [viewer: v, hint: client]
            END;
            $rename => BEGIN
                oldName: ROPE ~ state.name;
                ImportantMessage ["Type new name in typescript."];
                IF state.verbose THEN PutHistoryLine [state, "Rename the current palette. An
                    old palette with the same name is not overwritten"];
                IF state.historyViewer.iconic THEN ViewerOps.OpenIcon
                    [state.historyViewer];
                v.label ← state.name ← GetHistoryLine [state, "Type new name"];
                IF (PaletteIO.PaletteInfo [state.name].type # NIL) THEN BEGIN

*This is not correct. It should be possible to overwrite a deleted palette.*
PutHistoryLine [state, "A palette with such a name already exists."];
ImportantMessage ["A palette with such a name already exists."]
END
ELSE BEGIN
    IF NOT state.name.Equal [oldName] THEN BEGIN
        PaletteIO.UnmarkEdited [oldName];
        v.name ← IF (v.class.flavor = list) THEN state.name ELSE
            state.name.Cat [" (",Atom.GetPName
            [Proto[state].palette.keyColor], ")"];
        state.historyViewer.name ← v.name.Concat [" history"];
        state.historyViewer.label ← v.label.Concat [" history"];
        ViewerOps.PaintViewer [viewer: v, hint: caption, clearClient: FALSE];
        ViewerOps.PaintViewer [viewer: state.historyViewer, hint: caption]
        END
    END
END;
$reset => BEGIN
    state.resetPainting ← TRUE;
    state.bottomSB ← state.rightSB ← 100;    state.topSB ← state.leftSB ← 0;
    IF state.verbose THEN PutHistoryLine [state, "Reset viewing transformation;
        SHIFT: reset palette"];
    IF shift THEN BEGIN
        key: ATOM ~ IF (v.class.flavor = wheel) THEN
            Proto[state].palette.keyColor ELSE emptyAtom;
        LoadPalette [state, key];   ResetNewVersion [v];
        v.file ← PaletteIO.DatabaseInfo[].name;    TypeScriptReset
            [state.historyViewer]
        END;
    ViewerOps.PaintViewer [viewer: v, hint: client]
    END;
$list => BEGIN
    dbname: ROPE;  palettes: INT;
    char: CHAR ~ IF (v.class.flavor = wheel) THEN 'P ELSE 'D;
    IF state.verbose THEN PutHistoryLine [state, "List palettes editable with this
        tool. SHIFT: list all palettes in database"];
    [dbname, palettes] ← PaletteIO.DatabaseInfo [];
    PutHistoryLine [state, PaletteIO.ListDirectory [IF shift THEN ` ELSE char]];
    PutHistoryLine [state, IO.PutFR ["Database: %g, palettes: %g", IO.rope
        [dbname], IO.int [palettes]]]
    END;
$grabSelection => BEGIN
    IF (v.class.flavor = list) THEN BEGIN
        state.paletteAndSel ← AddToList [GetLastSelection[], Digi[state], state];
        SetNewVersion [v, state];
        ViewerOps.PaintViewer [viewer: v, hint: client, clearClient: FALSE,
            whatChanged: $list]
        END
    END;
ENDCASE => ImportantMessage ["Implementation error (wrong housekeeping

```
                    class)"];
        ENDCASE => ImportantMessage ["Implementation error (wrong clientData type)"]
    END
END;   -- Housekeeping RotateHue: Menus.ClickProc ~ BEGIN
    [parent: REF ANY, clientData: REF ANY <- NIL, mouseButton: MouseButton <- red, shift,
    control: BOOL <- FALSE]
    IF NOT ISTYPE [parent, Viewer] THEN ImportantMessage ["Implementation error (wrong
                viewer type)"]
    ELSE BEGIN
        v: Viewer ~ NARROW [parent];    state: State ~ NARROW [v.data];
        data: ProtoPaletteData <- Proto[state];
        SetNewVersion [v, state];
        state.history.index <- state.history.index.SUCC MOD historySize;
        state.history.entry[state.history.index] <- data.palette;
        IF state.verbose THEN PutHistoryLine [state, "Red: rotate positive; blue: rotate
                negative"];
        SELECT mouseButton FROM
            red => data.palette <- ProtoPalette.RotatePositive [data.palette];
            yellow => NULL;
            blue => data.palette <- ProtoPalette.RotateNegative [data.palette];
            ENDCASE => NULL;
        FOR i: Hue IN Hue DO
            FOR j: ValueAndChroma IN ValueAndChroma DO NoteNewColor [state, i, j]
                ENDLOOP;
            ENDLOOP;
        PutHistoryLine [state, Rope.Concat ["New center color: ", LABToLCHRope
                [data.palette.colors[centerHue][0]]]];
        IF (NOT Is8bit []) THEN ViewerOps.PaintViewer [viewer: v, hint: client, clearClient:
                FALSE]
        END
END;   -- RotateHue AddHue: Menus.ClickProc ~ BEGIN
    [parent: REF ANY, clientData: REF ANY <- NIL, mouseButton: MouseButton <- red, shift,
    control: BOOL <- FALSE].  MouseButton: TYPE = {red, yellow, blue}
    IF NOT ISTYPE [parent, Viewer] THEN ImportantMessage ["Implementation error (wrong
                viewer type)"]
    ELSE BEGIN
        v: Viewer ~ NARROW [parent];    state: State ~ NARROW [v.data];
        data: ProtoPaletteData <- Proto[state];      changes: ChangeListProto <- NIL;
        WITH clientData SELECT FROM
            a: ATOM => BEGIN
                SetNewVersion [v, state];
                state.history.index <- state.history.index.SUCC MOD historySize;
                state.history.entry[state.history.index] <- data.palette;
                SELECT a FROM
                    Sharmonies => BEGIN
                        IF state.verbose THEN PutHistoryLine [state, "Add an analoguous
```

```
            harmony: CTRL: delete it"];
    data.palette <- IF control THEN ProtoPalette.DeleteAnaloguousHarmony
        [data.palette]
    ELSE ProtoPalette.MakeAnaloguousHarmony [data.palette];
    FOR i: analoguousHarmonies IN analoguousHarmonies DO
        NoteNewColor [state, i, 0]
        ENDLOOP;
    changes <- LIST [-2, -1, 0, 1, 2];
    END;
Scomplement => BEGIN
    IF state.verbose THEN PutHistoryLine [state, "Red: add direct
                    complement; yellow: add triadic complements; CTRL: delete
                    them\n\t(The complements are mutually exclusive)"];
    changes <- LIST [directComplement, leftTriadicComplement,
                    rightTriadicComplement];
    SELECT mouseButton FROM
        red => BEGIN
            data.palette <- IF control THEN
                    ProtoPalette.DeleteDirectComplement [data.palette]
                ELSE ProtoPalette.MakeDirectComplement [data.palette];
            NoteNewColor [state, directComplement, 0];
            data.palette <- ProtoPalette.DeleteTriadicComplements
                    [data.palette]
            END;
        yellow => BEGIN
            data.palette <- IF control THEN
                    ProtoPalette.DeleteTriadicComplements [data.palette]
                ELSE ProtoPalette.MakeTriadicComplements [data.palette];
            NoteNewColor [state, leftTriadicComplement, 0];
            NoteNewColor [state, rightTriadicComplement, 0];
            data.palette <- ProtoPalette.DeleteDirectComplement [data.palette]
            END;
        blue => IF shift THEN BEGIN
            data.palette <- IF control THEN
                    ProtoPalette.DeleteDirectComplement [data.palette]
                ELSE ProtoPalette.MakeDirectComplement [data.palette];
            data.palette <- IF control THEN
                    ProtoPalette.DeleteTriadicComplements [data.palette]
                ELSE ProtoPalette.MakeTriadicComplements [data.palette];
            NoteNewColor [state, leftTriadicComplement, 0];
            NoteNewColor [state, directComplement, 0];
            NoteNewColor [state, rightTriadicComplement, 0]
            END;
        ENDCASE => NULL
        END;
    ENDCASE => ImportantMessage ["Implementation error (wrong hue addition
                class)"]
    END;
ENDCASE => ImportantMessage ["Implementation error (wrong clientData type)"];
ViewerOps.PaintViewer [viewer: v, hint: client, clearClient: FALSE, whatChanged:
```

```
                    changes]
        END
END;    -- AddHue

Values: Menus.ClickProc ~ BEGIN
    [parent: REF ANY, clientData: REF ANY ← NIL mouseButton: MouseButton ← red, shift,
        control: BOOL ← FALSE]
    IF NOT ISTYPE [parent, Viewer] THEN ImportantMessage ["Implementation error (wrong
            viewer type)"]
    ELSE BEGIN
        v: Viewer ~ NARROW [parent];    state: State ~ NARROW [v.data];    hue: Hue;
        data: ProtoPaletteData ← Proto[state];
        IF (data.selection = NIL) THEN {Message ["No selection"];    RETURN};
        IF (data.selection.variant # 0) THEN {Message ["Already an atomic color"];
            RETURN};
        SetNewVersion [v, state]; hue ← data.selection.hue;
        state.history.index ← state.history.index.SUCC MOD historySize;
        state.history.entry[state.history.index] ← ProtoPalette.CopyPalette [data.palette];
        IF state.verbose THEN PutHistoryLine [state, "add 2 aequidistant high and 2 aequidistant
                low values; CTRL: delete them"];
        data.palette.colors[hue] ← IF control THEN ProtoPalette.RestrictValue [data.palette,
                data.palette.colors[hue]]
            ELSE ProtoPalette.VaryValue [data.palette, data.palette.colors[hue]];
        FOR i: ValueAndChroma IN [-(values + chromata) .. -chromata) DO NoteNewColor
                [state, hue, i] ENDLOOP;
        FOR i: ValueAndChroma IN (chromata .. chromata + values] DO NoteNewColor [state,
                hue, i] ENDLOOP;
        IF trace THEN BEGIN
            PutHistoryLine [state, "New values:"];
            FOR i: ValueAndChroma IN [-(values + chromata) .. -chromata) DO
                color: LAB ~ data.palette.colors[hue][i];
                IF (color # NIL) THEN PutHistoryLine [state, LABToLCHRope [color]]
            ENDLOOP;
            IF (data.palette.colors[hue][0] # NIL) THEN PutHistoryLine [state, LABToLCHRope
                    [data.palette.colors[hue][0]]];
            FOR i: ValueAndChroma IN (chromata .. chromata + values] DO
                color: LAB ~ data.palette.colors[hue][i];
                IF (color # NIL) THEN PutHistoryLine [state, LABToLCHRope [color]]
                ENDLOOP
            END;
        ViewerOps.PaintViewer [viewer: v, hint: client, clearClient: FALSE]
        END
END;    -- Values Chromata: Menus.ClickProc ~ BEGIN
    [parent: REF ANY, clientData: REF ANY ← NIL, mouseButton: MouseButton ← red, shift,
        control: BOOL ← FALSE]
    IF NOT ISTYPE [parent, Viewer] THEN ImportantMessage ["Implementation error (wrong
            viewer type)"]
    ELSE BEGIN
```

```
v: Viewer ~ NARROW [parent];    state: State ~ NARROW [v.data];    hue: Hue;
data: ProtoPaletteData ← Proto[state];
IF (data.selection = NIL) THEN {Message ["No selection"]; RETURN};
IF (data.selection.variant # 0) THEN {Message ["Already an atomic color"];
        RETURN};
SetNewVersion [v, state]; hue ← data.selection.hue;
state.history.index ← state.history.index.SUCC MOD historySize;
state.history.entry[state.history.index] ← ProtoPalette.CopyPalette [data.palette];
IF state.verbose THEN PutHistoryLine [state, "add 2 aequidistant vivid and 2
        aequidistant dull chromata; CTRL: delete them"];
data.palette.colors[hue] ← IF control THEN ProtoPalette.RestrictChroma [data.palette,
        data.palette.colors[hue]]
    ELSE ProtoPalette.VaryChroma [data.palette, data.palette.colors[hue]];
FOR i: ValueAndChroma IN [-chromata .. chromata] DO NoteNewColor [state, hue, i]
    ENDLOOP;
IF trace THEN BEGIN
    PutHistoryLine [state, "New chromata:"];
    FOR i: ValueAndChroma IN [-chromata .. chromata] DO
        color: LAB ~ data.palette.colors[hue][i];
        IF (color # NIL) THEN PutHistoryLine [state, LABToLCHRope [color]]
        ENDLOOP
    END;
ViewerOps.PaintViewer [viewer: v, hint: client, clearClient: FALSE]
    END
END; -- Chromata DoInterpress: Menus.ClickProc ~ BEGIN
    [parent: REF ANY, clientData: REF ANY ← NIL, mouseButton: MouseButton ← red, shift,
    control: BOOL ← FALSE]
    Produces an Interpress master.
    v: Viewer ~ NARROW [parent];    state: State ~ NARROW [v.data];
    lc: Context;    -- local context
    DoIt: PROC ~ {DrawEverything [lc, state, TRUE, TRUE]};
    DrawToIP: PROC [context: Imager.Context] ~ {lc ← context; context.DoSave [DoIt]};
    IF NOT ISTYPE [parent, Viewer] THEN ImportantMessage ["Implementation error (wrong
            viewer type)"]
    ELSE SELECT mouseButton FROM
        red => BEGIN
            master: ImagerInterpress.Ref;
            masterName: ROPE ~ IO.PutFR1 ["[]<>Temp>ProtoPalette>%g.Interpress",
                    IO.rope [state.name]];
            master ← ImagerInterpress.Create [masterName];
            master.DeclareColorOperator [labLinear]; master.DeclareFont [boldFace];
            master.DoPage [action: DrawToIP,
                    scale: ((fieldWidth / 1000.0) / state.boundingBox.w / state.scale)];
            master.Close [];
            ImportantMessage [masterName.Cat [" created"]];
            PutHistoryLine [state, Rope.Concat ["\nIPPreView ", masterName]]
            END;
        yellow => NULL;
```

```
    blue => NULL;
    ENDCASE => ERROR
END;   -- DoInterpress
```

Mouse Commands

```
Hit: PROC [state: State, v: Viewer, pos: VEC, delete: BOOL] ~ BEGIN
    Hit the current mouse position and store the target in the state.
    data: ProtoPaletteData + Proto[state];      selectedColor: LAB;
    colors: Harmony ~ data.palette.colors;      prevSel: SelectionProto ~ data.selection;
    left: REAL ~ pos.x - swatchSize / 2.0;      right: REAL ~ pos.x + swatchSize / 2.0;
    bottom: REAL ~ pos.y - swatchSize / 2.0;    top: REAL ~ pos.y + swatchSize / 2.0;
    changes: ChangeListProto + NIL;
    IF (prevSel # NIL) THEN changes + CONS [prevSel.hue, changes];
    data.selection + NIL;
    IF state.verbose THEN PutHistoryLine [state, "Selected color can be grabbed by Gargoyle; if
            there is a ColorTool, it shows the color\n\tCTRL deletes the color"];
    FOR i: Hue IN Hue DO
        FOR j: ValueAndChroma IN ValueAndChroma DO
            xy: VEC;
            xy.x + keyColorPos[i].x + variantColorPos[j].x;
            xy.y + keyColorPos[i].y + variantColorPos[j].y;
            IF (colors[i][j] # NIL) AND (xy.x > left) AND (xy.x < right) AND (xy.y > bottom) AND
                    (xy.y < top) THEN {data.selection + NEW [SelectionProtoRep + [i, j]];
                EXIT}
        ENDLOOP
    ENDLOOP;
    IF (prevSel = NIL) AND (data.selection = NIL) THEN RETURN;
    IF (data.selection = NIL) THEN BEGIN
        ViewerOps.PaintViewer [viewer: v, hint: client, clearClient: FALSE, whatChanged:
                changes];
        RETURN
        END;
    IF delete THEN BEGIN
        state.history.index + state.history.index.SUCC MOD historySize;
        state.history.entry[state.history.index] + data.palette;
        data.palette + ProtoPalette.CopyPalette [data.palette];
        data.palette.colors[data.selection.hue][data.selection.variant] + NIL;
        data.selection + NIL;    selectedColor + NEW [CIELAB + [25, 0, 0]];
        SetNewVersion [v, state]
        END
    ELSE BEGIN
        name: ROPE;
        selectedColor + colors[data.selection.hue][data.selection.variant];
        changes + CONS [data.selection.hue, changes];
        name + ColorName [selectedColor];    Message [name];
        PutHistoryLine [state, Rope.Cat [LABToLCHRope
                [data.palette.colors[data.selection.hue][data.selection.variant]], " = ", name]];
        TRUSTED {Process.Detach [FORK SpeakMessage [name]]}
```

```
        END;
    TransferSelectedColor [state, ToRGB [selectedColor]];
    ViewerOps.PaintViewer [viewer: v, hint: client, clearClient: FALSE, whatChanged: changes]
    END;   -- Hit HitList: PROC [state: State, v: Viewer, pos: VEC, cmd: ATOM] ~ BEGIN
    Hit the current mouse position and store the target in the state. If the selected color is in the
    wash, its index is nrEntries - 1.
    data: DigitalPaletteData ← Digi[state];       doWash, deletable: BOOL ← FALSE;
    colors: CL ~ data.palette;  prevSel: SelectionDigital ~ data.selection;
    selectedColor: LAB ← NIL;           name: ROPE;      changes: ATOM ← $none;
    IF state.verbose THEN PutHistoryLine [state, "Left: left side of wash; right: right side of
                wash; middle: add to palette\nMiddle-selected color can be grabbed by
                Gargoyle; if there is a ColorTool, it shows the color\n\tCTRL middle deletes the
                color"];
    IF (pos.y >= 0) THEN BEGIN
        IF (cmd = $selectMiddle) AND (data.wash # NIL) AND (pos.y <= washHeight) AND
                (pos.x >= 0) AND (pos.x < washWidth) THEN BEGIN
            A color in the wash has been selected. Add it to the palette and transfer it.
            SetNewVersion [v, state];
            IF (data.selection = NIL) THEN data.selection ← NEW [SelectionDigitalRep];
            data.selection.middle ← selectedColor ← data.wash[Round[pos.x/washItemWidth]];
            data ← AddToList [selectedColor, data, state];       changes ← $list;
            SetNewVersion [v, state]
            END   -- else no hit
        END
    ELSE BEGIN
        IF (pos.x >= 0) AND (pos.x <= washWidth) THEN BEGIN
            x: INT ← Fix [pos.x / 10];  y: INT ← - Fix [pos.y / 10];
            IF (x MOD 2 = 0) AND (y MOD 3 # 0) THEN BEGIN
                index: NAT ~ (x/2 + 1) + (y - 1)/3 * 5;
                IF (data.selection = NIL) THEN data.selection ← NEW [SelectionDigitalRep];
                selectedColor ← IthListElt [data, index];
                IF (selectedColor # NIL) THEN BEGIN
                    data.selection.ch ← index;
                    SELECT cmd FROM
                        $selectMiddle => data.selection.middle ← selectedColor;
                        $delete, $deleteLeft => BEGIN
                            data.selection.middle ← NIL;    deletable ← TRUE;
                            SetNewVersion [v, state];  changes ← $list
                            END;
                        $selectLeft => BEGIN
                            data.selection.left ← selectedColor; data.selection.middle ← NIL;
                            doWash ← TRUE;           changes ← $wash
                            END;
                        $selectRight => BEGIN
                            data.selection.right ← selectedColor; data.selection.middle ← NIL;
                            doWash ← TRUE;           changes ← $wash
                            END;
                        $deleteRight => ImportantMessage ["Use left button to delete"];
```

```
                    ENDCASE => ERROR
                END
            END     -- else no hit
        END         -- else no hit
    END;
    IF (selectedColor = NIL) THEN RETURN;
    IF doWash AND (data.selection.left # NIL) AND (data.selection.right # NIL) THEN BEGIN
        delta: CIELAB;   sel: SelectionDigital ~ data.selection;
        IF (data.wash = NIL) THEN data.wash <- NEW [WashRep];
        delta.lStar <- sel.right.lStar - sel.left.lStar;
        delta.aStar <- sel.right.aStar - sel.left.aStar;
        delta.bStar <- sel.right.bStar - sel.left.bStar;
        FOR i: INTEGER IN [0 .. washItems) DO
            t: REAL ~ Float [i] / Float [washItems-1];
            data.wash[i] <- NEW [CIELAB];
            data.wash[i].lStar <- sel.left.lStar + t * delta.lStar;
            data.wash[i].aStar <- sel.left.aStar + t * delta.aStar;
            data.wash[i].bStar <- sel.left.bStar + t * delta.bStar;
            data.washCache[i] <- ColorFromLAB [data.wash[i]]
        ENDLOOP
    END;
    name <- ColorName [selectedColor];
    IF deletable THEN BEGIN
        index: NAT <- 1;
        FOR l: CL <- data.palette, l.rest WHILE (l # NIL) DO
            IF (index = data.selection.ch) THEN {l.first <- NIL;   EXIT};
            index <- index.SUCC
        ENDLOOP
    END
    ELSE BEGIN
        Message [name];
        PutHistoryLine [state, Rope.Cat [LABToLCHRope [selectedColor], " = ", name]];
        TRUSTED {Process.Detach [FORK SpeakMessage [name]]}
    END;
    TransferSelectedColor [state, ToRGB [selectedColor]];
    ViewerOps.PaintViewer [viewer: v, hint: client, clearClient: FALSE, whatChanged: changes]
    END;    -- HitList
```

Utilities

```
IthListElt: PROC [palette: DigitalPaletteData, i: NAT] RETURNS [LAB] ~ BEGIN
    Returns the one relative i-th element of the list.
    count: CARDINAL <- 1;
    IF (i < 1) OR (i > palette.power) THEN RETURN [NIL];
    FOR list: CL <- palette.palette, list.rest WHILE (list # NIL) DO
        IF (count = i) THEN RETURN [list.first];
        count <- count.SUCC
    ENDLOOP;
    RETURN [NIL]
```

END; -- *IthListElt*

WDir: PROC RETURNS [wDir: ROPE] ~ BEGIN
  *Guarantees that the working directory is not the root.*
  wDir ← FSExtras.GetWDir [];
  IF wDir.Equal ["[]<>"] AND (NOT lastWDir.IsEmpty) THEN wDir ← lastWDir;
  IF wDir.Equal ["[]<>"] THEN wDir ← "[]<>Temp>MetaPalette>"
  END; -- *WDir*

Message: PROC [msg: ROPE] ~ BEGIN
  *Writes a message in the Message Window at the top of the LF screen.*
  MessageWindow.Clear [];        MessageWindow.Append [msg]
  END; -- *Message*

ImportantMessage: PROC [msg: ROPE] ~ BEGIN
  *Writes a message in the Message Window at the top of the LF screen and makes it blink.*
  Message [msg];  MessageWindow.Blink []
  END; -- *ImportantMessage*

SpeakMessage: PROC [msg: ROPE] ~ BEGIN
  *Speaks the message if Finch is loaded. The ra parameter is the speaking rate in words per minute. 120 < ra < 350: default 180.*
  status: FinchSynthesizer.NB;
  ctrl: ROPE ~ "■P0:0z:ra230:nb■\\ ";
  IF speak THEN status ← FinchSynthesizer.SpeakText [ctrl.Concat[msg] !
       RuntimeError.UnboundProcedure => CONTINUE]
  END; -- *SpeakMessage*

Initializations

InitKeyColorPos: PROC ~ BEGIN
  FOR i: Hue IN Hue DO
    keyColorPos[i] ← SELECT i FROM
      -3 => [-4*swatchSize, -4*swatchSize],
      -2 => [8*swatchSize, 8*swatchSize],
      -1 => [4*swatchSize, 4*swatchSize],
      -0 => [0, 0],
       1 => [-4*swatchSize, 4*swatchSize],
       2 => [-8*swatchSize, 8*swatchSize],
       3 => [4*swatchSize, -4*swatchSize],
       4 => [0, -8*swatchSize],
      ENDCASE => [0, 0]
    ENDLOOP
  END; -- *InitKeyColorPos*

InitVariantColorPos: PROC ~ BEGIN
  FOR i: ValueAndChroma IN [-(values + chromata) .. -chromata) DO
    variantColorPos[i] ← [0, Float [i + chromata] * swatchSize2]
    ENDLOOP;

```
FOR i: ValueAndChroma IN [-chromata .. 0) DO
    variantColorPos[i] ← [Float [i] * swatchSize2, 0]
    ENDLOOP;
variantColorPos[0] ← [0, 0];
FOR i: ValueAndChroma IN (0 .. chromata] DO
    variantColorPos[i] ← [Float [i] * swatchSize2, 0]
    ENDLOOP;
FOR i: ValueAndChroma IN (chromata .. chromata+values] DO
    variantColorPos[i] ← [0, Float [i - chromata] *-swatchSize2]
    ENDLOOP
END;   -- InitVariantColorPos protoDoc: ROPE ~ "is an editor for functional color palettes. Parameters: Palette name, Key
          color.\nMouse buttons: left: select, CTRL left: delete.\nRelated commands:
          DigitalPalette, NewFieldWidth, PaletteTo8Bit; and ListPalettes,
          AddPaletteComment, AddReferencePalettes, PaletteGC.";

digiDoc: ROPE ~ "is an editor for functional color palettes. Parameter: Palette name.\nMouse
          buttons: left/right: select left/right color for wash, middle: select, CTRL left:
          delete.\nRelated commands: ProtoPalette, NewFieldWidth, PaletteTo8Bit; and
          ListPalettes, AddPaletteComment, AddReferencePalettes, PaletteGC.";

ProtoCmd: Commander.CommandProc ~ BEGIN
    PROC [cmd: Handle] RETURNS [result: REF ← NIL, msg: ROPE ← NIL]
    name: ROPE ← CommandTool.NextArgument [cmd];
    keyColor: ATOM ← Atom.MakeAtom [CommandTool.NextArgument [cmd]];
    IF name.IsEmpty THEN name ← "Arlecchino";
    IF name.IsEmpty THEN BEGIN
        msg ← "Specify a palette name (use ListPalettes to list existing palettes)."; result ←
                $failure
        END
    ELSE BEGIN
        IF (keyColor = emptyAtom) THEN keyColor ← $default;
        lastWDir ← cmd.command.Substr [0, FS.ExpandName[cmd.command].cp.base.start-1];
        msg ← "Mouse buttons: left: select, CTRL left: delete.";
        IF ProtoPalette.ValidKeyColor [keyColor] THEN lastViewer ← CreateViewer [name,
                keyColor]
        ELSE {result ← $failure;   msg ← "No such key color."}
        END
END;   -- ProtoCmd DigiCmd: Commander.CommandProc ~ BEGIN
    PROC [cmd: Handle] RETURNS [result: REF ← NIL, msg: ROPE ← NIL]
    name: ROPE ← CommandTool.NextArgument [cmd];
    IF name.IsEmpty THEN BEGIN
        msg ← "Specify a palette name (use ListPalettes to list existing palettes)."; result ←
                $failure
        END
    ELSE BEGIN
        msg ← "Mouse buttons: left/right: select left/right color for wash, middle: select, CTRL
```

```
        left: delete.";
    lastWDir ← cmd.command.Substr [0, FS.ExpandName[cmd.command].cp.base.start-1];
    lastViewer ← CreateViewer [name, emptyAtom]
    END
END;   -- DigiCmd FieldWidth: Commander.CommandProc ~ BEGIN
    width: ROPE ← CommandTool.NextArgument [cmd];
    fieldWidth ← Convert.RealFromRope [width ! Convert.Error => {fieldWidth ← 155.3452;
        CONTINUE}];
    msg ← IO.PutFR1 ["Field width = %g mm.", IO.real [fieldWidth]]
END;   -- FieldWidth To8BitCmd: Commander.CommandProc ~ BEGIN
    NoteDisplayChangedTo8Bit [NIL]
END;   -- To8BitCmd VideoCmd: Commander.CommandProc ~ BEGIN
    video ← NOT video;    InitSwatches
END;   -- VideoCmd
```

Main body

*UserProfile.CallWhenProfileChanges [PaletteNameMgr]:*

InitializeViewerClass;    InitKeyColorPos;        InitVariantColorPos;
InitSwatches;    InitSubMaps;

ImagerColorMap.Register [colorMapNotifier];

Commander.Register [key: "ProtoPalette", proc: ProtoCmd, doc: protoDoc];
Commander.Register [key: "DigitalPalette", proc: DigiCmd, doc: digiDoc];
Commander.Register [key: "PaletteTo8Bit", proc: To8BitCmd,
    doc: "notices that the display device changed to 8-bit color."];
Commander.Register [key: "NewFieldWidth", proc: FieldWidth,
    doc: "sets the width of the field in mm for Interpress masters."];
Commander.Register [key: "VideoHack", proc: VideoCmd,
    doc: "does a hack for doing Abekas frames for the ProtoPalette."]

END.   -- ProtopaletteCommanderImpl

What is claimed is:

1. A system for producing a color palette data structure including a plurality of generated colors; the system comprising input means for receiving request signals from a user; the request signals including a key color request, a color function request and a save palette request;

key color selection means, responsive to the key color request received from the user, for selecting a key color from a key color source; the key color and each generated color being defined by a set of colorimetric coordinates defining a color location in a uniform color space;

color function selection means, responsive to the color function request received from the user for selecting a color function;

the color function defining a predetermined color relationship relating the color location of the key color in the uniform color space to the color locations of at least two generated colors in the uniform color space; the color function computing the set of colorimetric coordinates of the at least two generated colors using the set of colorimetric coordinates of the key color;

color generation means, responsive to the color function selection means, for generating the set of colorimetric coordinates for the at least two generated colors using the set of colorimetric coordinates of the key color according to the predetermined color relationship defined by the selected color function, and for storing in the color palette data structure the set of colorimetric coordinates for of the at least two generated colors;

display means, cooperatively associated with and responsive to the key color selection means and to the color generation means, and including a display device having a display screen, for converting the set of colorimetric coordinates of the key color and of each generated color stored in the color palette data structure to color output signals representing colors producible on the display device; the display means further displaying concurrently on the display screen the key color and each of the generated colors stored in the color palette data structure using the color output signals; and memory means for storing the color palette data structure in response to the save palette request received from the user.

2. The system of claim 1 wherein
the request signals further include a color delete request; and
the system further includes coordinated color deletion means, responsive to the color delete request received from the user, for deleting one of the generated colors from the color palette data structure.

3. The system of claim 1 wherein the set of colorimetric coordinates are cylindrical coordinates and include a hue-angle coordinate, a chroma coordinate, and a lightness coordinate.

4. The system of claim 3 wherein the color function is an analogous harmony color function relating the key color to first and second analogous harmony colors; the analogous harmony color function generating the set of colorimetric coordinates of the first analogous harmony color by incrementing the hue-angle coordinate of the key color in the uniform color space by a first angle value between 15 and 30 degrees; the analogous harmony color function further generating the set of colorimetric coordinates of the second analogous harmony color by decrementing the hue-angle coordinate of the key color in the uniform color space by the first angle value.

5. The system of claim 4 wherein the analogous harmony color function further relates the key color to third and fourth analogous harmony colors; the analogous harmony color function further generating the set of colorimetric coordinates of the third analogous harmony color by incrementing the hue-angle coordinate of the key color in the uniform color space by a third angle value equal to twice the first angle value; the analogous harmony color function further generating the set of colorimetric coordinates of the fourth analogous harmony color by decrementing the hue-angle coordinate of the key color in the uniform color space by a fourth angle value equal to twice the first angle value.

6. The system of claim 3 wherein the color function is a complement color function relating the key color to first and second complemented colors; the complement color function generating the set of colorimetric coordinates of the first complement color by incrementing the hue-angle coordinate of the key color in the uniform color space by 120 degrees; the complement color function further generating the set of colorimetric coordinates of the second complement color by decrementing the hue-angle coordinate of the key color in the uniform color space by 120 degrees.

7. The system of claim 3 wherein the color function is a chroma variation color function relating the key color to at least two chroma variation colors; the chroma variation color function generating the set of colorimetric coordinates of a first chroma variation color by incrementing the chroma coordinate of the key color in the uniform color space by a chroma change quantity determined using a line segment passing through the key color and an achromatic axis in the uniform color space; the chroma variation color function further generating the set of colorimetric coordinates of a second chroma variation color by decrementing the chroma coordinate of the key color by the chroma change quantity.

8. The system of claim 3 wherein the color function is a lightness variation color function relating the key color to at least two lightness variation colors; the lightness variation color function generating the set of colorimetric coordinates of a first lightness variation color by incrementing the lightness coordinate of the key color in the uniform color space by a lightness change quantity defined by creating an interval scale in the uniform color space; an end of the interval scale being determined from the lightness coordinate of the key color; the lightness variation color function further generating the set of colorimetric coordinates of a second lightness variation color by decrementing the lightness coordinate of the key color by the lightness change quantity.

9. A system for producing a color palette data structure including a plurality of generated colors; the system comprising input means for receiving request signals from a user; the request signals including a key color request, a color function request and a save palette request;

key color selection means, responsive to the key color request received from the user, for selecting a key color from a key color source; the key color and each of the plurality of generated colors being defined by a set of cylindrical colorimetric coordinates in a uniform color space, the set of cylindrical colorimetric coordinates including a hue-angle coordinate, a lightness coordinate, and a chroma coordinate;

color function selection means, responsive to the color function request received from the user, for selecting a color function from a plurality of color functions; each color function producing at least one of the plurality of generated colors; the plurality of color functions including, an analogous harmony color function relating the key color to an analogous harmony color; the analogous harmony color function producing the set of cylindrical colorimetric coordinates of the analogous harmony color by varying the hue-angle coordinate of the key color in the uniform color space by a first angle value; and a complement color function relating the key color to a complement color; the complement color function producing the set of cylindrical colorimetric coordinates of the complement color by varying the hue-angle coordinate of the key color in the uniform color space by a third angle value;

color generation means, responsive to the color function selection means, for generating the set of cylindrical colorimetric coordinates for the at least one generated color using the set of cylindrical colorimetric coordinates for the key color according to the selected color function, and for storing the set of cylindrical colorimetric coordinates for the at least one generated color in the color palette data structure;

display means, cooperatively associated with and responsive to the key color selection means and the color generation means, and including a display device having a display screen, for converting the set of cylindrical colorimetric coordinates of the key color and of each generated color stored in the color palette data structure to color output signals representing colors producible on the display device; the display means further displaying concurrently on the display screen the key color and each generated color stored in the color palette data structure; and memory means for storing the color palette data structure in response to the save palette request received from the user.

10. The system of claim 9
wherein the request signals received from the user further include a user selected color request indicating a user selected color selected by the user from the key color, the analogous harmony color and the complement color; and
wherein the plurality of color functions further includes
a lightness variation color function relating the user selected color to at least one lightness variation color; the lightness variation color function producing the set of cylindrical colorimetric coordinates of the at least one lightness variation color by incrementing the lightness coordinate of the user selected color by a lightness change quantity defined by creating an interval scale in the uniform color space; an end of the interval scale being determined from the lightness coordinate of the user selected color; and
a chroma variation color function relating the user selected color to at least one chroma variation color; the chroma variation color function producing the set of cylindrical colorimetric coordinates of the at least one chroma variation color by incrementing the chroma coordinate of the user selected color by a chroma change quantity determined using a line segment passing through the user selected color and an achromatic axis in the uniform color space.

11. The system of claim 10 wherein
the plurality of color functions further includes a shift hue function relating the key color to a modified key color; the shift hue function producing the set of cylindrical colorimetric coordinates of the modified key color by incrementing the hue-angle coordinate of the key color in the uniform color space by a shifted hue angle to produce a modified hue-angle coordinate; the shifted hue angle having an angle value less than the first angles value; and
when the color function selection is the shift hue function, the color generation means produces the set of cylindrical colorimetric coordinates, including the modified hue-angle coordinate, of the modified key color, and stores the modified key color in the color palette data structure.

12. The system of claim 11 wherein, when the color function selection is the shift hue function, the color generation means further produces, for each generated color generated using a prior selected color function, the set of colorimetric coordinates of a respective modified generated color according to the prior selected color function thereof, using the modified hue-angle coordinate of the modified key color; the color generation means further storing the modified generated colors in the color palette data structure.

13. The system of claim 9
wherein the first angle value is between 15 and 30 degrees; and
wherein the analogous harmony color function further relates the key color to a second analogous harmony color; the analogous harmony color function further producing the set of cylindrical colorimetric coordinates of the second analogous harmony color by varying the hue-angle coordinate of the key color in the uniform color space by a second angle value equal to twice the first angle value.

14. The system of claim 9 wherein the third angle value is 180 degrees.

15. The system of claim 9 wherein the plurality of color functions further includes a second complement color function relating the key color to first and second complement colors; the second complement color function producing the set of cylindrical colorimetric coordinates of the first complement color by incrementing the hue-angle coordinate of the key color in the uniform color space by 120 degrees; the second complement color function further producing the set of cylindrical colorimetric coordinates of the second complement color by decrementing the hue-angle coordinate of the key color in the uniform color space by 120 degrees.

16. The system of claim 9 wherein the plurality of color functions further includes a shift hue function relating the key color to a modified key color; the shift hue function producing the set of cylindrical colorimetric coordinates of the modified key color by varying the hue-angle coordinate of the key color in the uniform color space by a shifted hue angle value to produce a modified hue-angle coordinate; the shifted hue angle value being less than the first angle value.

17. The system of claim 16 wherein the shifted hue angle has an angle value equal to one half of the first angle value.

18. The system of claim 9 further including color deletion means for deleting one of the generated colors from the color palette data structure; the color deletion means being responsive to a color delete request received from the user.

19. A method of operating a machine to produce a color palette data structure including a plurality of generated colors; the machine including a user input device for providing signals indicating requests from a machine user, a processor, a display, and a memory; the method comprising the steps of
receiving a first user request signal from the user input device indicating a selection of a key color by the machine user from a key color source; the key color and each generated color being defined by a set of colorimetric coordinates defining a color location in a uniform color space;

displaying the key color on the display in response to the selection of the key color; the step of displaying the key color including converting the set of colorimetric coordinates defining the key color to color output signals representing a color reproducible on the display;

storing the set of colorimetric coordinates of the key color in the color palette data structure;

receiving a second user request signal from the user input device indicating a selection of a color function by the machine user; the color function defining a predetermined color relationship relating the color location of the key color in the uniform color space to color locations of at least two generated colors in the uniform color space; the color function computing the set of colorimetric coordinates of the at least two generated colors using the set of colorimetric coordinates for the key color;

in response to the second user request signal indicating the selection of the color function, generating the set of colorimetric coordinates for at least two generated colors using the set of colorimetric coordinates for the key color according to the predetermined color relationship defined by the color function selected;

storing the set of colorimetric coordinates of each generated color in the color palette data structure;

converting the set of colorimetric coordinates for each generated color into color output signals representing a color producible on the display, and displaying the key color and each generated color stored in the color palette data structure concurrently on the display; and storing the color palette data structure in the memory of the machine.

20. The method of claim 19, wherein the set of colorimetric coordinates in the uniform color space include a cylindrical hue-angle coordinate; and wherein the color function selected by the machine user is selected from a plurality of color functions including, an analogous harmony color function relating the key color to first and second analogous harmony colors; the analogous harmony color function producing the set of colorimetric coordinates of the first analogous harmony color by incrementing the hue-angle coordinate of the key color in the uniform color space by a first angle value; the analogous harmony color function further producing the set of colorimetric coordinates of the second analogous harmony color by decrementing the hue-angle coordinate of th. key color in the uniform color space by the first angle value; and a complement color function for relating the key color to first and second complement colors; the complement color function producing the set of colorimetric coordinates of the first complement color by incrementing the hue-angle coordinate of the key color in the uniform color space by a second angle value; the complement color function further producing the set of colorimetric coordinates of the second complement color by decrementing the hue-angle coordinate of the key color in the uniform color space by the second angle value.

21. The method of claim 20 further including receiving a third user request signal from the user input device indicating a selection by the machine user of a displayed color from the key color, the analogous harmony color and the complement color; and receiving a fourth user request signal from the user input device indicating a selection by the machine user of a second color function;

and wherein the step of generating the set of colorimetric coordinates for the generated color is further responsive to the selection of the second color function;

the set of colorimetric coordinates in the uniform color space further include a chroma coordinate and a lightness coordinate; and the plurality of color functions further includes a lightness variation color function relating the displayed color to at least two lightness variation colors; the lightness variation color function producing the set of colorimetric coordinates of a first lightness variation color by incrementing the lightness coordinate of the displayed color by a lightness change quantity defined by creating an interval scale in the uniform color space; an end of the interval scale being determined from the lightness coordinate of the displayed color; the lightness variation color function further producing the set of colorimetric coordinates of a second lightness variation color by decrementing the lightness coordinate of the displayed color by the lightness change quantity; and a chroma variation color function relating the displayed color to at least two chroma variation colors; the chroma variation color function producing the set of colorimetric coordinates of a first chroma variation color by incrementing the chroma coordinate of the displayed color by a chroma change quantity determined using a line segment passing through the displayed selection color and an achromatic axis in the uniform color space; the chroma variation color function further producing the set of colorimetric coordinates of a second chroma variation color by decrementing the chroma coordinate of the displayed color by the chroma change quantity.

22. The method of claim 21 wherein the color function indicated by the selection of the second color function further includes a shift hue function relating the key color to a modified key color; the shift hue function producing the set of colorimetric coordinates of the modified key color by varying the hue-angle coordinate of the key color in the uniform color space by a shifted hue angle value to produce a modified hue-angle coordinate; the shifted hue angle value being less than the first angle value;

when the color function indicated by the selection of the second color function is the shift hue function, the steps of generating the set of colorimetric coordinates for the generated color further includes generating the set of colorimetric coordinates of the modified key color, including the modified hue-angle coordinate, according to the shift hue function; and for each generated color generated from the color function selected by a prior selection of a color function, generating the set of colorimetric coordinates of a respective modified generated color according to the color function selected by the prior selection using the modified hue-angle coordinate of the modified key color; and the step of storing the generated color and the key color in the color palette data structure includes storing each modified generated color and the modified key color in the color palette data structure.

23. The method of claim 20 wherein the first angle value is between 15 and 30 degrees.

24. The method of claim 23 wherein the shifted hue angle value is one half of the first angle value.

25. The method of claim 20 wherein the second angle value is 120 degrees.

26. The method of claim 19 further including receiving a third request signal from the user input device indicating a color deletion request by the machine user; the color deletion request including signals indicating a selected generated color selected from the plurality of generated colors displayed on the display;

deleting the selected generated color from the display and from the color palette data structure in response to the color deletion request.

27. A method of operating a machine to produce a color palette data structure including a plurality of generated colors; the machine including a user input device for providing signals indicating requests from a machine user, a processor, a display, and a memory; the method comprising the steps of colorimetrically measuring a plurality of colors producible by the display to produce a measured color gamut for the display, and storing the measured color gamut in the memory;

receiving a first user request signal from the user input device indicating a selection by the machine user of a key color from a key color source; the key color, each generated color and the plurality of colors in the measured color gamut being defined by a set of colorimetric coordinates defining a color location in a uniform color space; the set of colorimetric coordinates for each color including a hue-angle coordinate, a chroma coordinate, and a lightness coordinate;

in response to the selection of the key color, converting the set of colorimetric coordinates defining the key color to color output signals representing a color in the measured color gamut of the display and displaying the key color on the display;

storing the set of colorimetric coordinates of the key color in the color palette data structure;

receiving a second user request signal from the user input device indicating a selection of a color function by the machine user selected from a plurality of color functions including an analogous harmony color function relating the key color to first and second analogous harmony colors; the analogous harmony color function producing the set of colorimetric coordinates of the first analogous harmony color by incrementing the hue-angle coordinate of the key color in the uniform color space by a first angle value; the analogous harmony color function producing the set of colorimetric coordinates of the second analogous harmony color by decrementing the hue-angle coordinate of the key color in the uniform color space by the first angle value;

a direct complement color function relating the key color to a direct complement color; the direct complement color function producing the set of colorimetric coordinates of the direct complement color by varying the hue-angle coordinate of the key color in the uniform color space by a second angle value;

a lightness variation color function relating an input color to at least one lightness variation color; the lightness variation color function producing the set of colorimetric coordinates of the at least one lightness variation color by varying the lightness coordinate of the input color by a lightness change quantity defined by creating an interval scale in the uniform color space; one end of the interval scale being determined from the lightness coordinate of the input color; the other end of the interval scale being at an edge of the measured color gamut;

wherein the second user request signal further indicates the input color; the input color being selected from the key color, the first and second analogous harmony colors, and the direct complement color; and a chroma variation color function relating the input color to at least one chroma variation color; the chroma variation color function producing the set of colorimetric coordinates of the at least one chroma variation color by varying the chroma coordinate of the input color by a chroma change quantity determined using a line segment passing through the input color and an achromatic axis in the uniform color space, and extending to an edge of the measured color gamut;

in response to the selection of the color function, generating the set of colorimetric coordinates for at least one generated color according to the color function;

storing the set of colorimetric coordinates of each generated color in the color palette data structure;

converting the set of colorimetric coordinates for each generated color stored in the color palette data structure into respective color output signals representing a displayable generated color in the measured color gamut of the display, and displaying the displayable generated color using the respective color output signals concurrently with the key color on the display;

receiving a third request signal indicating a save palette request by the machine user; and storing the color palette data structure in the memory of the machine in response to the save palette request.

28. The method of claim 27 further including receiving a fourth user request signal from the user input device indicating a generated color deletion request by the machine user; the generated color deletion request including a selected generated color selected from the plurality of generated colors displayed on the display;

deleting the selected generated color from the display and from the color palette data structure in response to the generated color deletion request.

29. The method of claim 27 wherein the analogous harmony color function further relates the key color to third and fourth analogous harmony colors; the analogous harmony color function producing the set of colorimetric coordinates of the third analogous harmony color by incrementing the hue-angle coordinate of the key color in the uniform color space by a second angle value equal to twice the first angle value; the analogous harmony color function further producing the set of colorimetric coordinates of the fourth analogous harmony color by decrementing the hue-angle coordinate of the key color in the uniform color space by the second angle value.

30. The method of claim 29 wherein the plurality of color functions further includes a triadic complement color function relating the key color to first and second triadic complement colors; the triadic complement color function producing the set of colorimetric coordinates of the first triadic complement color by incrementing the hue-angle coordinate of the key color in the uniform color space by 120 degrees; the triadic complement color function further producing the set of colorimetric coordinates of the second triadic complement color by decrementing the hue-angle coordinate of the key color in the uniform color space by 120 degrees.

31. The method of claim 30 wherein
the plurality of color functions further includes a shift hue function the key color to a modified key color;
the shift hue producing the set of colorimetric coordinates of the key color by varying the hue-angle coordinate of the key the uniform color space by a shifted hue angle value to a modified hue-angle coordinate; and
when the color function selected by the machine user is the function, the step of generating the set of color coordinates for the generated color in response to the of the color function includes
generating the set of colorimetric coordinates of the key color according to the shift hue function; and selection
for each generated color generated from a prior selection color function, generating the set of color coordinates of a respective modified generated according to the color function selected by selection using the modified hue-angle coordinate modified key color; and
the step of storing the generated color in the color palette data includes storing the modified key color and each generated color therein.

* * * * *